(12) United States Patent
Sullivan et al.

(10) Patent No.: US 12,006,168 B2
(45) Date of Patent: Jun. 11, 2024

(54) PALLETIZER-DEPALLETIZER SYSTEM FOR DISTRIBUTION FACILITIES

(71) Applicant: Symbotic LLC, Wilmington, MA (US)

(72) Inventors: Robert Sullivan, Wilmington, MA (US); Gregory Thronson, Wilmington, MA (US); Christopher Kiley, Wilmington, MA (US); Todd E. Kepple, Litchfield, NH (US); Jared Ploss, Wilmington, MA (US)

(73) Assignee: Symbotic LLC, Wilmington, MA (US)

( * ) Notice: Subject to any disclaimer, the term of this patent is extended or adjusted under 35 U.S.C. 154(b) by 47 days.

(21) Appl. No.: 18/055,593

(22) Filed: Nov. 15, 2022

(65) Prior Publication Data

US 2023/0073500 A1    Mar. 9, 2023

Related U.S. Application Data

(63) Continuation of application No. 17/319,779, filed on May 13, 2021, now Pat. No. 11,498,784, which is a
(Continued)

(51) Int. Cl.
*B65G 57/24* (2006.01)
*B65G 57/03* (2006.01)
*B65G 59/02* (2006.01)

(52) U.S. Cl.
CPC ............ *B65G 57/24* (2013.01); *B65G 57/03* (2013.01); *B65G 59/026* (2013.01)

(58) Field of Classification Search
CPC ......... B65B 35/50; B65B 35/52; B65G 57/00; B65G 57/005; B65G 57/02; B65G 57/03;
(Continued)

(56) References Cited

U.S. PATENT DOCUMENTS 3,219,203 A    11/1965   Jeremiah
3,389,810 A    6/1968    Wolfe et al.
(Continued)

FOREIGN PATENT DOCUMENTS

EP    2918524    9/2015
JP    2008081240    4/2008

*Primary Examiner* — Saul Rodriguez
*Assistant Examiner* — Brendan P Tighe
(74) *Attorney, Agent, or Firm* — Perman & Green, LLP

(57) ABSTRACT

An automated storage and retrieval system includes a storage array of storage locations for case units. An in-out case conveyor is capable of bi-directionally transporting case units to and from the storage array, and an in-out loaded pallet conveyor is capable of bi-directionally transporting loaded pallets towards and away from the storage array. A palletizer-depalletizer cell includes a bi-directional pallet transport system with more than one independently driven pallet transports, each with a different pallet holder independently movable relative to a cell frame. Placement of case units commissioning a pallet layer loading a pallet, and removal of case units decommissioning a pallet layer unloading another pallet are both effected at the common pallet layer interface at a predetermined level of the cell frame. The pallet transports independently index a first and a second of the different pallet holders, each independently holding the pallet loading at the common pallet layer interface.

20 Claims, 27 Drawing Sheets

Related U.S. Application Data continuation of application No. 16/844,227, filed on Apr. 9, 2020, now Pat. No. 11,008,184, which is a continuation of application No. 15/892,127, filed on Feb. 8, 2018, now Pat. No. 10,625,956.

(60) Provisional application No. 62/457,476, filed on Feb. 10, 2017.

(58) Field of Classification Search
CPC ...... B65G 57/035; B65G 57/24; B65G 57/30; B65G 57/302; B65G 57/303; B65G 57/305; B65G 57/308; B65G 59/00; B65G 59/005; B65G 59/02; B65G 59/023; B65G 59/026; B65G 59/04; B65G 59/06; B65G 59/061; B65G 59/067; B65G 59/12; B65G 60/00; B65G 1/00; Y10S 414/105; Y10S 414/106; Y10S 414/108; Y10S 414/112; Y10S 414/114

USPC ......... 414/789.5, 791.6, 792.6, 794.4, 794.7, 414/796.2, 796.5, 796.7, 797.2, 797.4, 414/797.5, 797.6, 927, 929

See application file for complete search history.

(56) References Cited

U.S. PATENT DOCUMENTS

| | | |
|---|---|---|
| 5,096,369 A | 3/1992 | Ouellette |
| 5,437,533 A | 8/1995 | Vandermeer et al. |
| 2012/0297733 A1 | 11/2012 | Pierson et al. |
| 2014/0088748 A1 | 3/2014 | Woodtli et al. |
| 2014/0369800 A1* | 12/2014 | Marks ................ B25J 9/0093 414/792.8 |
| 2015/0063970 A1* | 3/2015 | Bianchi ............... B65G 57/005 414/789.5 |
| 2015/0063971 A1* | 3/2015 | Beer .................. B65G 47/845 198/469.1 |
| 2018/0072514 A1* | 3/2018 | Heston ................. B65G 57/26 |
| 2018/0229948 A1* | 8/2018 | Kollmuss ............. B65G 57/06 |

* cited by examiner

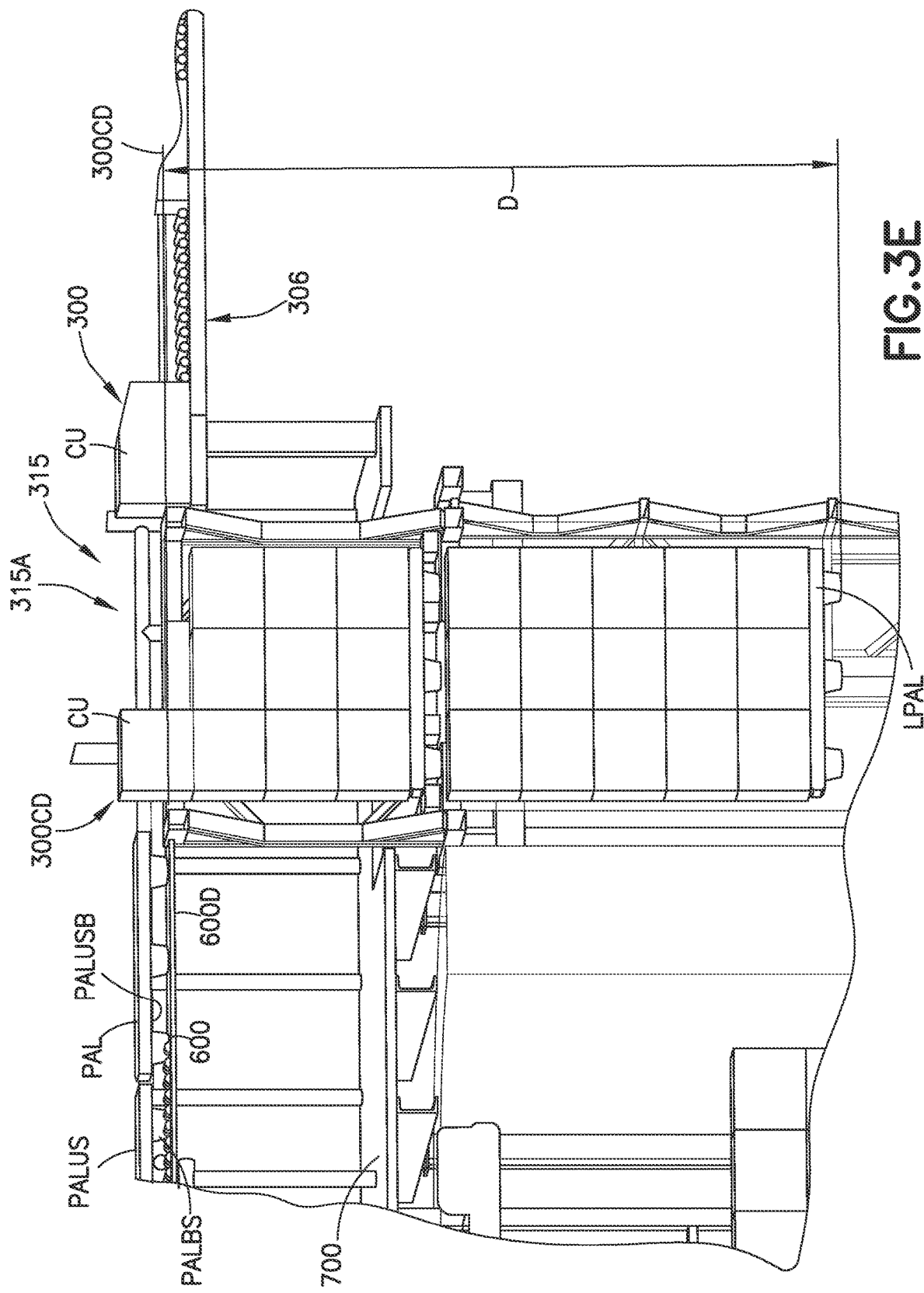

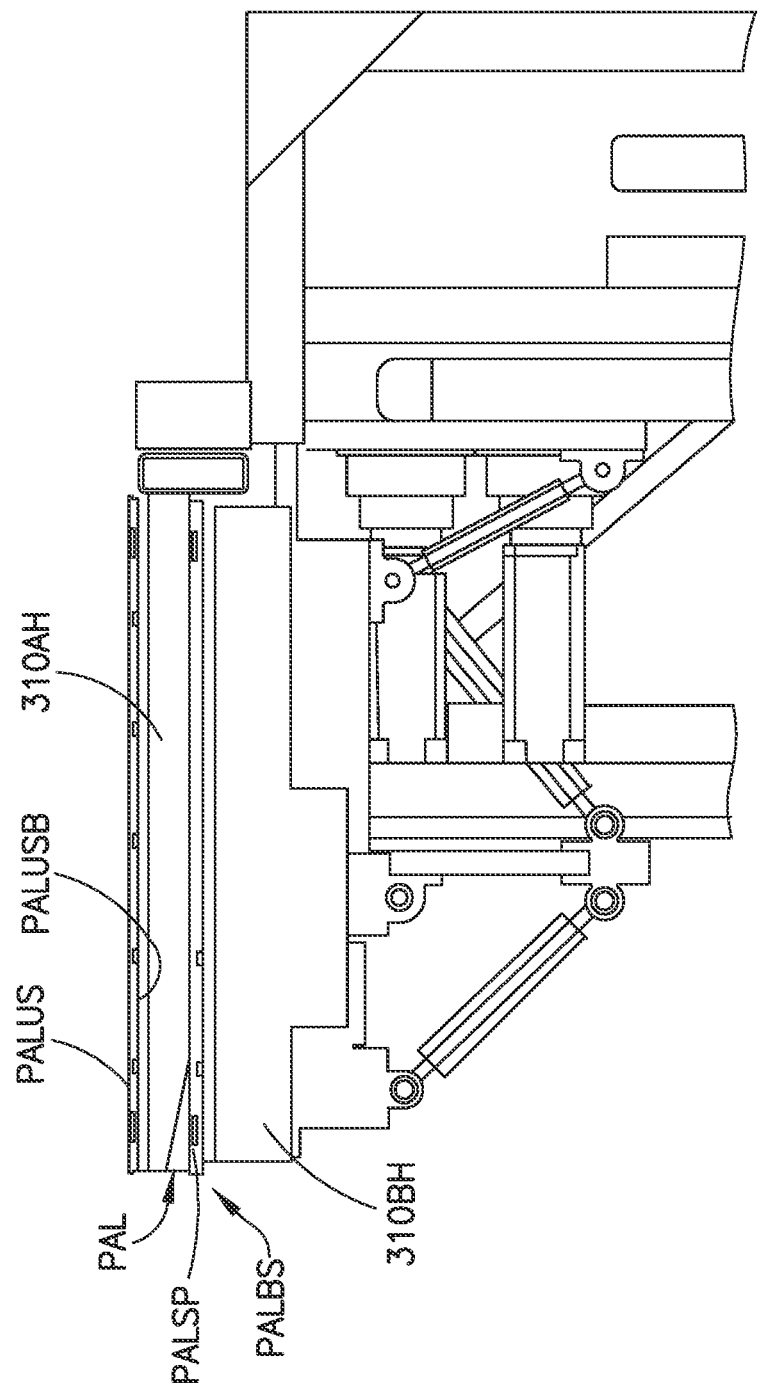

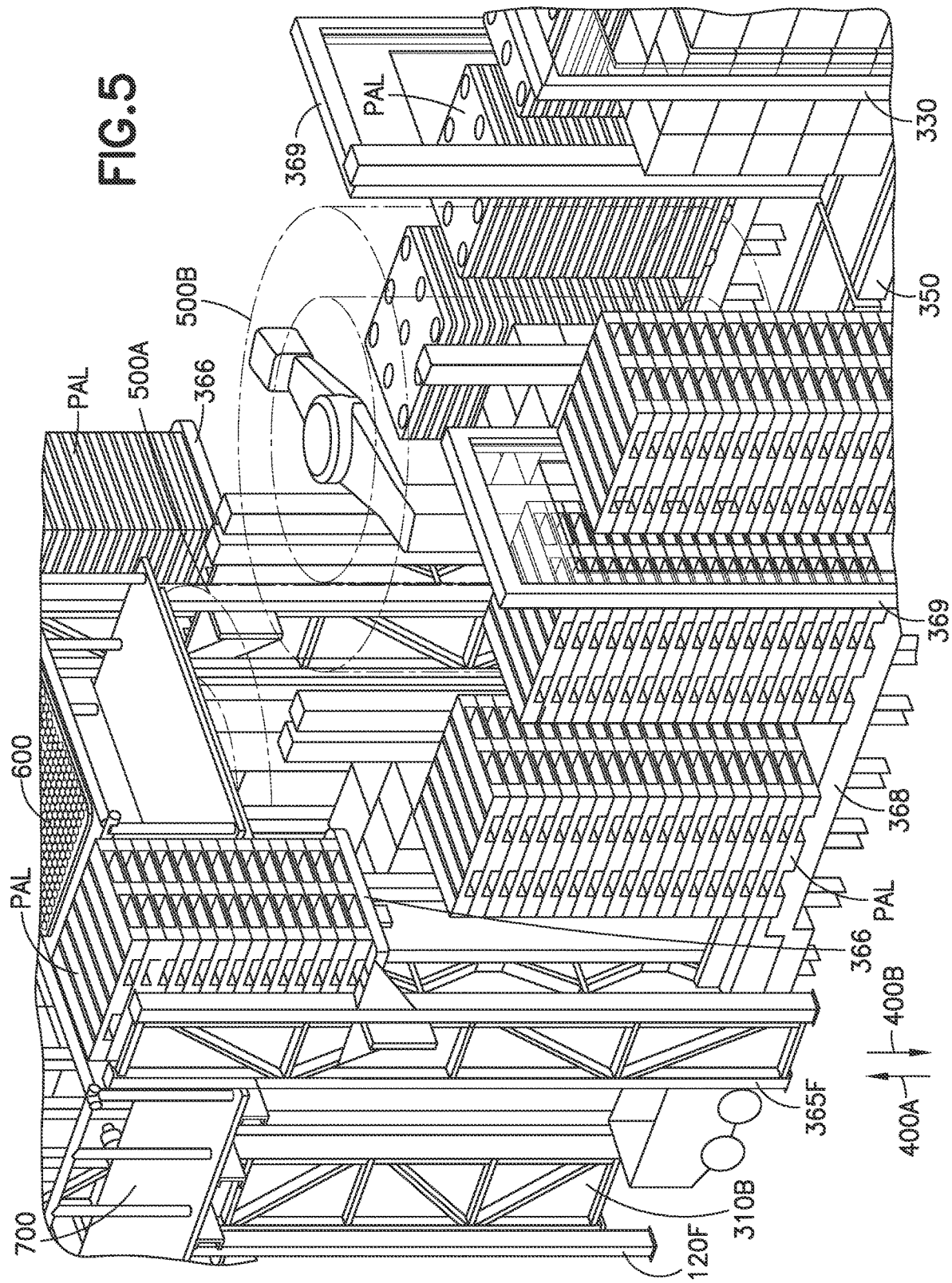

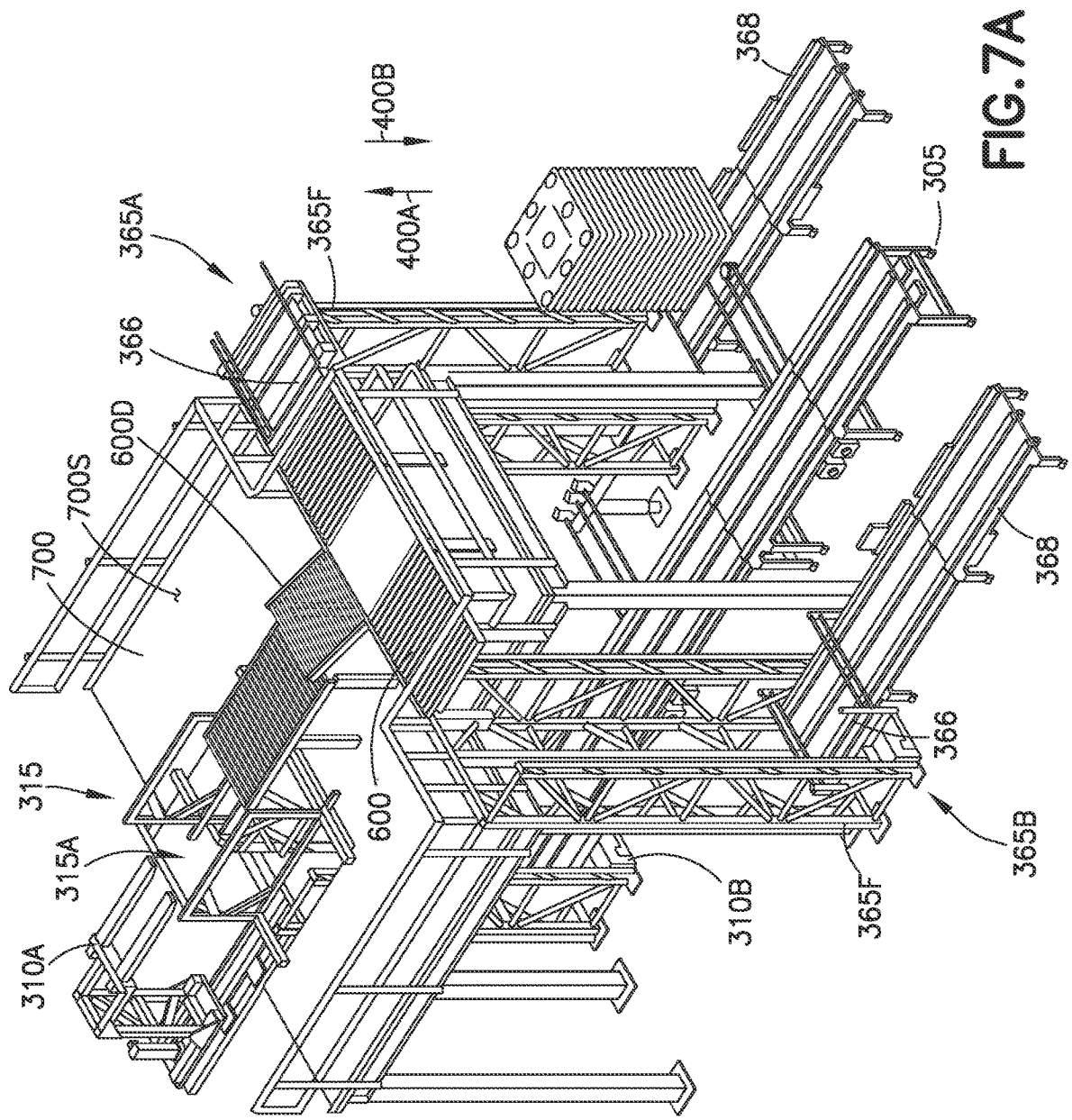

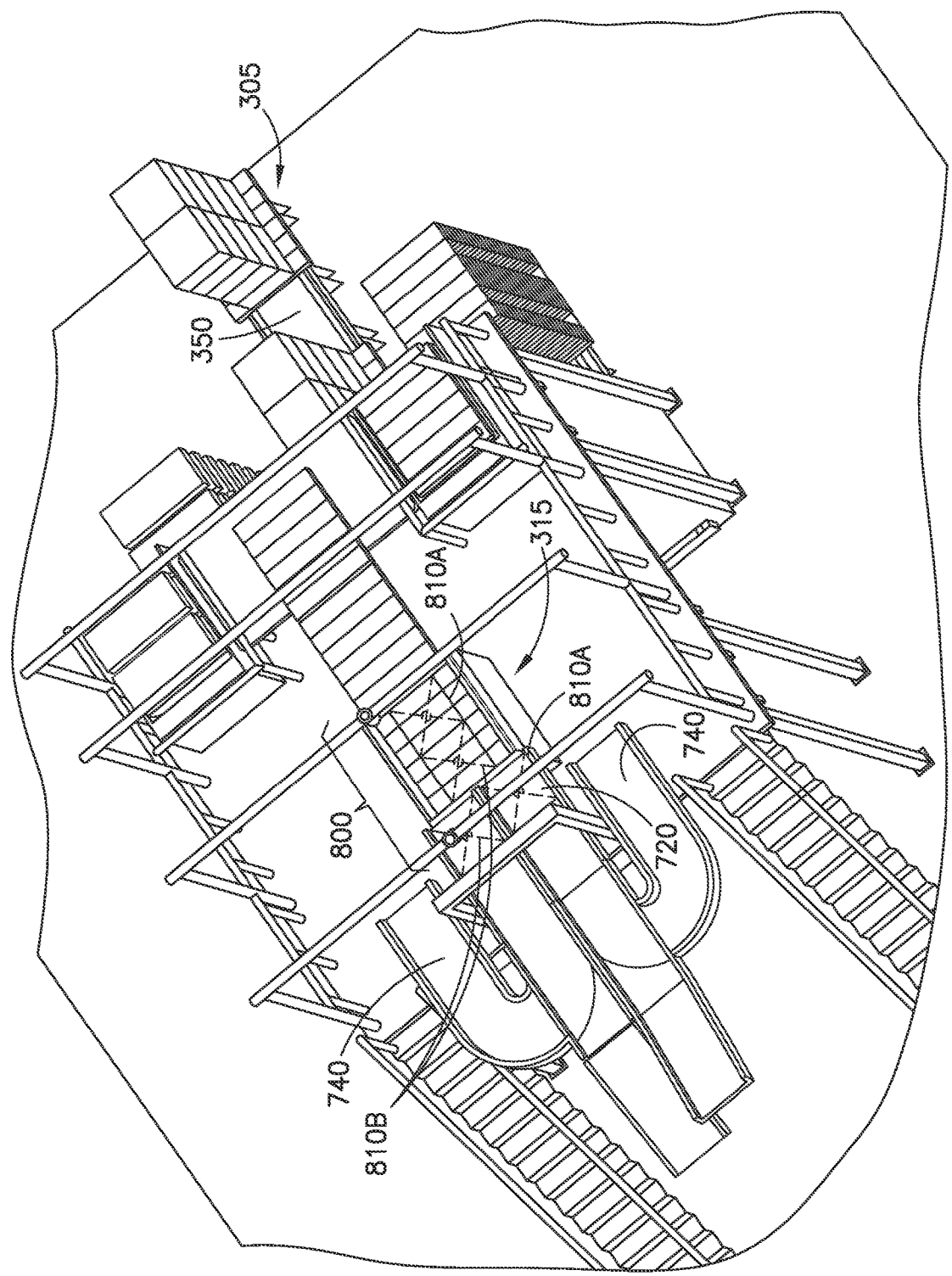

PALLETIZER-DEPALLETIZER SYSTEM FOR DISTRIBUTION FACILITIES

CROSS-REFERENCE TO RELATED APPLICATIONS

This application is a continuation of U.S. Application Ser. No. 17/319,779, filed May 13, 2021, (now U.S. Pat. No. 11,498,784), which is a continuation of U.S. application Ser. No. 16/844,227, filed Apr. 9, 2020, (now U.S. Pat. No. 11,008,184), which is a continuation of U.S. patent application Ser. No. 15/892,127, filed Feb. 8, 2018, (now U.S. Pat. No. 10,625,956), which claims the benefit of and priority to U.S. provisional Patent Application No. 62/457,476, filed Feb. 10, 2017, the disclosures of which are incorporated herein by reference in their entireties.

BACKGROUND

1. Field

The exemplary embodiments generally relate to distribution facilities and, more particularly, to palletizers and depalletizers of the distribution facilities.

2. Brief Description of Related Developments

Efficiency of automated storage and retrieval systems is manifested in store density and throughput of store articles. Achievement of high throughput may be based in part in efficiency and transport speed of the automatic distribution and retrieval transport system conveying store articles within the automated and retrieval system store. Still, the efficient and high speed transport within the automated storage and retrieval system remains dependent on efficacy of the input and output systems that respectively receive the store articles, shipped to the automated storage and retrieval system in pallet bundles, and which disassemble the pallet bundles (otherwise referred to de-palletizing) and present the store articles in article units for conveyance by the automated storage and retrieval system transport system, and on output assemble the ordered article units into pallet bundles (otherwise referred to as palletizing) suitable for shipping from the automated storage and retrieval system. As noted before store articles are shipped and arrive at the automated storage and retrieval system for input, by the input system, in pallet bundles or pallet loads and the article (s) forming the pallet loads may be cases (e.g., pressed paper, cardboard, plastic, or other non-metallic wrap casing or webbing, or ceramic or glass casing or holding framework holding one or more products (otherwise fabricated and/or cultivated) or totes, trays, configured for holding a case within or holding one or more products individually or in casing. Each case is configured so as to be arranged in a pallet bundle or load (the term "pallet load" will be used throughout for convenience).

De-palletizers (pallet unloaders that break down the pallet load into case units and feed the same into the automated storage and retrieval system transport system) that are fully automatic/semi-automatic (in that some levels of human action is involved) are known. An example of a conventional depalletizer is illustrated in FIG. 13 and disclosed U.S. Pat. No. 4,557,656 to Ouellette which discloses a materials handling device, such as a palletizer and/or depalletizer, which may be adapted to operate in either mode, has a mechanism, for feeding pallets to be loaded and ejecting pallets which have been unloaded, at the top of the device. The pallets are introduced into a bay and placed onto an elevator and sequentially indexed upwards a distance equal to each layer to be unloaded or downward a distance equal to each layer to be loaded. The pallets in the machine are indexed to a standard position. Ejection and introduction of loaded and unloaded pallets are automatically sequenced.

Another example of a conventional depalletizer is illustrated in FIG. 14 and disclosed in U.S. Pat. No. 7,033,130 to Watson et al. which discloses a depalletizer that includes an input assembly for supporting a loaded pallet loaded with at least one product, a lift assembly, and a product take-away assembly. The input assembly presents the loaded pallet to the lift assembly, which moves the loaded pallet to a product unloading elevation. The product take-away assembly is positioned for receiving a product from the pallet at the unloading elevation. The depalletizer assembly also includes a pallet take-away assembly. After the product is unloaded from the pallet, the lift assembly moves the unloaded pallet to a pallet discharge elevation, where the pallet take-away assembly is positioned to receive an unloaded pallet from the lift assembly.

Further, in accordance with convention (e.g., to apply scaling effects), the automated storage and retrieval system may be provided with several of the depalletizers, and all of which (if more than one) are similarly configured to interface and depalletize a standard pallet load, each depalletizer thus provides a separate input path of depalletized case units fed to the automated storage and retrieval system transport, the multiple input paths being integrated (such as with a storage management or warehouse management system controller) as an automated storage and retrieval system input system and each input path sharing common or similar input characteristics. In conventional systems, the presence of non-standard pallet loads (i.e., loads not suited for de-palletizing at the depalletizer) renders all such paths inoperable (with respect to such non-standard pallet load). Conventionally, such non-standard pallet loads involve special depalletizing means that are not integrated into the automated storage and retrieval system input system nor automatically interface with the automated storage and retrieval system transport system so that case units are fed into the automated storage and retrieval system and accounted for in the warehouse management system by special feed and accounting means.

Similarly to, but in opposing manner, case units output from the automated storage and retrieval system, such as in accordance with an order for stored case units or products therein, and which are retrieved by the automated storage and retrieval system transport system from storage (in accordance with an ordered sequence or to be arranged in order sequence on shipping) are shipped from the automated storage and retrieval system in what may be referred to as output pallet loads. Moreover, the case units ordered include different types and/or sizes of case units, so the resulting output pallet load has mixed cases (or mixed case pallet loads). The mixed case pallet loads are formed at a palletizer that receives output mixed case units from the automated storage and retrieval system transport system, and positions them in layers to form the pallet load output. Examples of a conventional palletizer are illustrated in FIG. 15 and disclosed in U.S. Pat. No. 8,671,649 to Schäfer, which describes a work station for packing articles to be picked onto a shipping support that includes a platform, a packing station, a platform on the platform, a shipping support station beneath the platform, a lifting device for lifting an empty or partially packed shipping support and for lowering completely packed shipping supports, and a track for transporting loose articles to be picked to the packing station dedicated to load supports which conveys the articles to be picked on load supports to the packing station or from the conveyor technique can be order-picked. As disclosed in Schäfer, convention provides several palletizers, and all (if more than one) are similarly configured, so as to handle what may be referred to as standard case units in a standard pallet load. As may be realized, mixed case pallet loads present greater difficulty so that automated palletizers may be limited in application, and semi-automatic palletizers (conventionally less efficiency with lower throughput compared to automatic versions of the palletizers) may also prove unsuited for difficult (reduced stability) mixed case pallet loads. Accordingly, such difficult mixed case pallet loads render the standard palletizer paths unsuitable, and conventionally involve special palletizing means that are not integrated into the automated storage and retrieval system output system, nor automatically interfaced with automated the storage and retrieval system transport system so that case units are output and accounted for as such by the users special output and accounting means.

BRIEF DESCRIPTION OF THE DRAWINGS

The foregoing aspects and other features of the disclosed embodiment are explained in the following description, taken in connection with the accompanying drawings, wherein:

FIGS. 3A-3E are schematic illustrations of a bi-directional automation augmented, manually assisted palletizer/depalletizer in accordance with aspects of the disclosed embodiment;

FIGS. 4A-4C are schematic illustrations of portions of the palletizer/depalletizer of FIGS. 3A-3E in accordance with aspects of the disclosed embodiment;

FIG. 5 is a schematic illustration of a portion of the palletizer/depalletizer of FIGS. 3A-3E in accordance with aspects of the disclosed embodiment;

FIGS. 7A-7D are schematic illustrations of portions of the palletizer/depalletizer of FIGS. 3A-3E in accordance with aspects of the disclosed embodiment;

FIGS. 8A-8B are schematic illustrations of portions of the palletizer/depalletizer of FIGS. 3A-3E in accordance with aspects of the disclosed embodiment;

DETAILED DESCRIPTION

Figure 1:
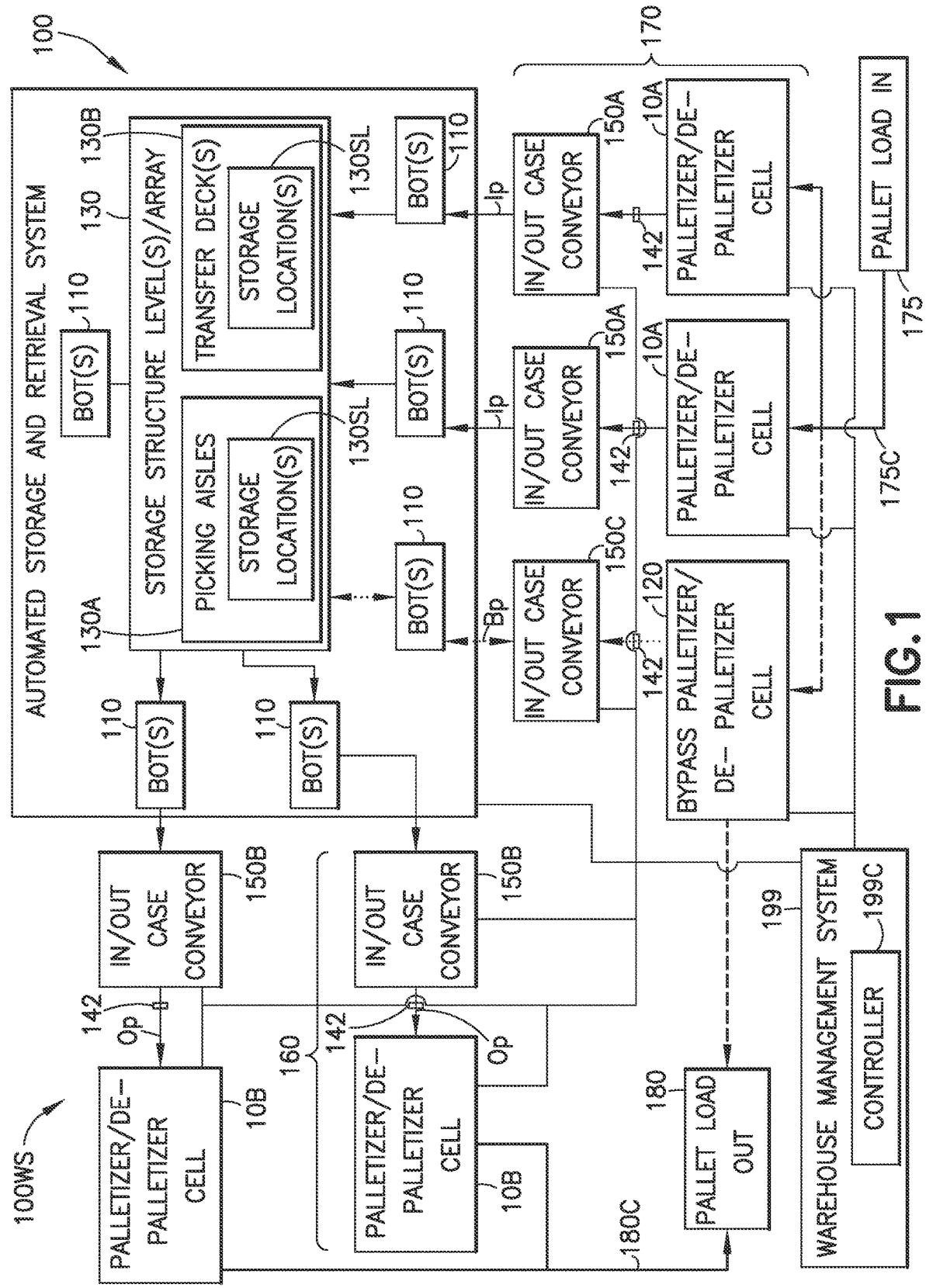
FIG. 1 is a schematic illustration of a distribution facility in accordance with aspects of the disclosed embodiment.

FIG. 1 is a schematic illustration of a warehouse system or distribution facility 100WS in accordance with aspects of the disclosed embodiment. Although the aspects of the disclosed embodiment will be described with reference to the drawings, it should be understood that the aspects of the disclosed embodiment can be embodied in many forms. In addition, any suitable size, shape or type of elements or materials could be used. It should be understood that while the distribution facility 100WS is described herein as an automated distribution facility the aspects of the disclosed embodiment are also applicable to distribution facilities having any suitable transport systems, such as both automated and manual transport systems or to wholly manual transport systems.

In accordance with aspects of the disclosed embodiment the distribution facility 100WS includes a storage and retrieval system 100 that may operate in a retail distribution center or warehouse to, for example, fulfill orders received from retail stores for case units. In one example, the case units may be cases or units of goods not stored in trays, on totes or on pallets (e.g., uncontained). In other examples, the case units may be cases or units of goods that are contained in any suitable manner such as in trays, on totes or on pallets. It is noted that the case units may include cased units of goods (e.g., case of soup cans, boxes of cereal, etc.) or individual goods that are adapted to be taken off of or placed on a pallet. In accordance with the embodiments, shipping cases for case units (e.g., cartons, barrels, boxes, crates, jugs, or any other suitable device for holding case units) may have variable sizes and may be used to hold case units in shipping and may be configured so they are capable of being palletized for shipping. It is noted that when, for example, bundles or pallets of case units arrive at the storage and retrieval system the content of each pallet may be uniform (e.g., each pallet holds a predetermined number of the same item—one pallet holds soup and another pallet holds cereal) and as pallets leave the storage and retrieval system the pallets may contain any suitable number and combination of different case units (e.g., each pallet may hold different types of case units—a pallet holds a combination of soup and cereal). In the embodiments the storage and retrieval system described herein may be applied to any environment in which case units are stored and retrieved.

The storage and retrieval system 100 may be configured for installation in, for example, existing warehouse structures or adapted to new warehouse structures. In the aspects of the disclosed embodiment, the storage and retrieval system may include one or more in-feed transfer station 170 and one or more out-feed transfer station 160, in/out case conveyors 150A, 150B, 150C (generally referred to as in/out case conveyors 150), a storage structure array 130, and a number of autonomous vehicular transport robots 110 (referred to herein as "bots"). In the aspects of the disclosed embodiment the storage and retrieval system may also include robot or bot transfer stations, as described in U.S. Pat. No. 9,096,375, issued on Aug. 4, 2015, the disclosure of which is incorporated by reference herein in its entirety. In the embodiments the bot transfer stations may provide an interface between the bots 110 and the in/out case conveyors 150 such that case units can be indirectly transferred between the bots 110 and the in/out case conveyors 150 through the bot transfer stations. In the embodiments case units may be transferred directly between the bots 110 and the in/out case conveyors 150.

The storage structure array 130 may include multiple levels of storage rack modules that form a storage array of storage locations 130SL for case units, each storage location 130SL of which is arranged for storage of at least one case unit at each storage location 130SL. In one aspect, each level of the storage structure array 130 includes respective storage/picking aisles 130A, and transfer decks 130B for transferring case units between any of the storage areas of the storage structure array 130 and any shelf of any in/out case conveyors 150. The storage aisles 130A, and transfer decks 130B are also configured to allow the bots 110 to traverse the storage aisles 130A and transfer decks 130B for placing case units into picking stock and to retrieve ordered case units, where the case units are stored or otherwise held in the storage aisles 130A and/or on the transfer deck 130B in storage locations 130SL. The bots 110 may be any suitable bots capable of carrying and transferring case units throughout the storage and retrieval system 100. Suitable examples of bots can be found in, for exemplary purposes only, U.S. Pat. No. 8,425,173, issued on Apr. 23, 2013, U.S. Pat. No. 9,561,905, issued on Feb. 7, 2017, U.S. Pat. No. 8,965,619, issued on Feb. 24, 2015, U.S. Pat. No. 8,696,010, issued on Apr. 15, 2014, U.S. Pat. No. 9,187,244, issued on Nov. 17, 2015, U.S. patent application Ser. No. 13/326,952 (which is non-provisional of U.S. provisional Patent Application No. 61/423,365 filed on Dec. 15, 2010), entitled "Automated Bot with Transfer Arm" and filed on Dec. 15, 2011, and U.S. Pat. No. 9,499,338, issued on Nov. 22, 2016, the disclosures of which are incorporated by reference herein in their entireties. The bots 110 may be configured to place case units, such as the above described retail merchandise, into picking stock in the one or more levels of the storage structure array 130 and then selectively retrieve ordered case units for shipping the ordered case units to, for example, a store or other suitable location.

The in-feed transfer stations 170 and out-feed transfer stations 160 may operate together with their respective in/out case conveyors 150A, 150B for bi-directionally transferring case units to and from one or more levels of the storage structure array 130 effecting infeed of the case units into the storage structure array 130 and output of the case units from the storage structure array 130. It is noted that while the in-feed transfer stations 170 and the outfeed transfer stations 160 (and their respective in/out case conveyors 150A, 150B and palletizer/depalletizer cells 10A, 10B) are described as being dedicated inbound (i.e., in-feed) transfer stations 170 and dedicated outbound (i.e., out-feed) transfer stations 160, in the aspects of the disclosed embodiment each of the transfer stations 170, 160 may be used for both inbound and outbound transfer of case units from the storage and retrieval system. It is noted that while in/out case conveyors are described herein, the conveyors may be any suitable conveyors (including any suitable transport path orientation, such as vertical and/or horizontal conveyor paths) or transfer/picking devices having any suitable transport path orientation.

Figure 2:
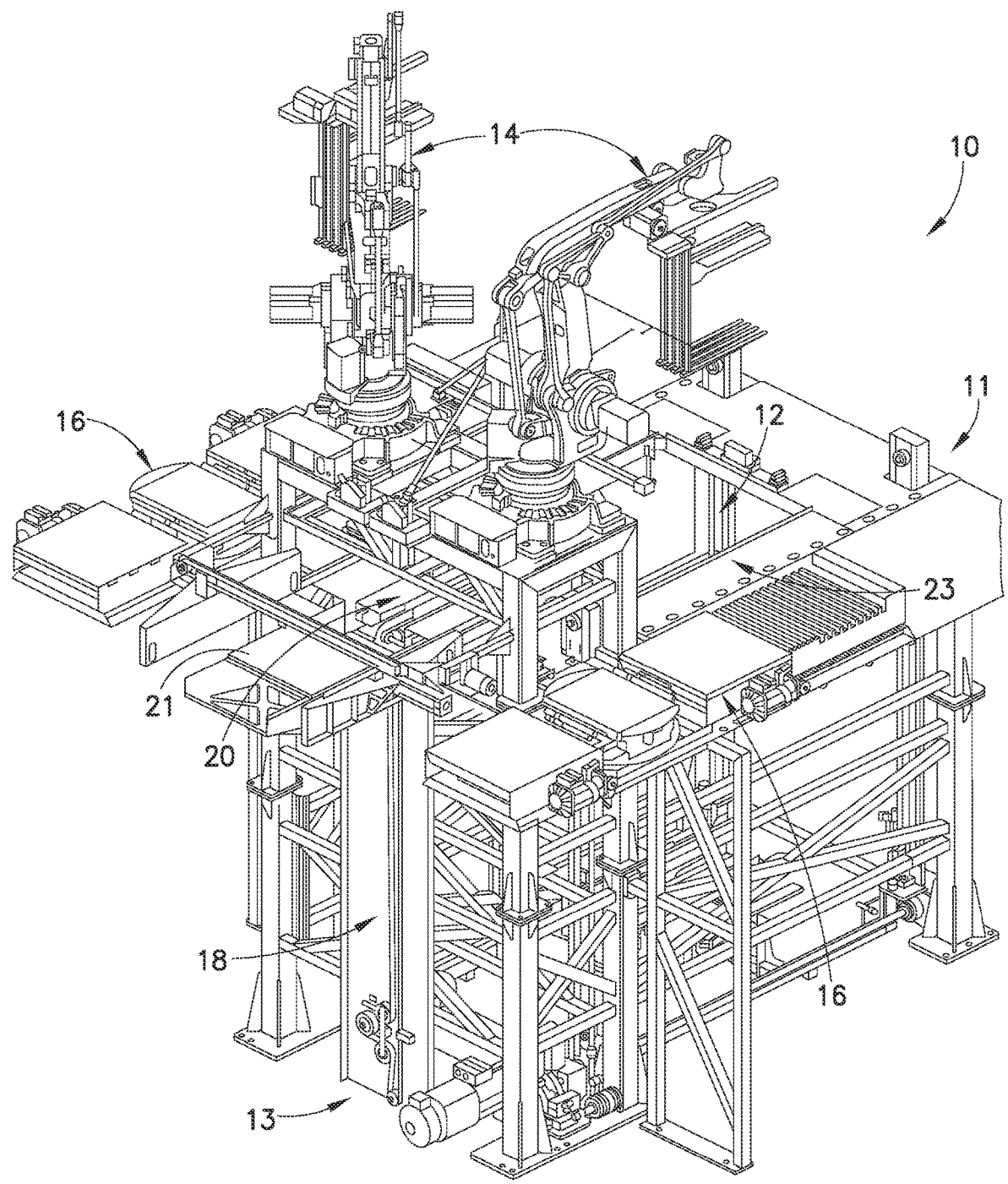
FIG. 2 is a schematic illustration of an automatic palletizer/depalletizer in accordance with aspects of the disclosed embodiment.
Figure 3:
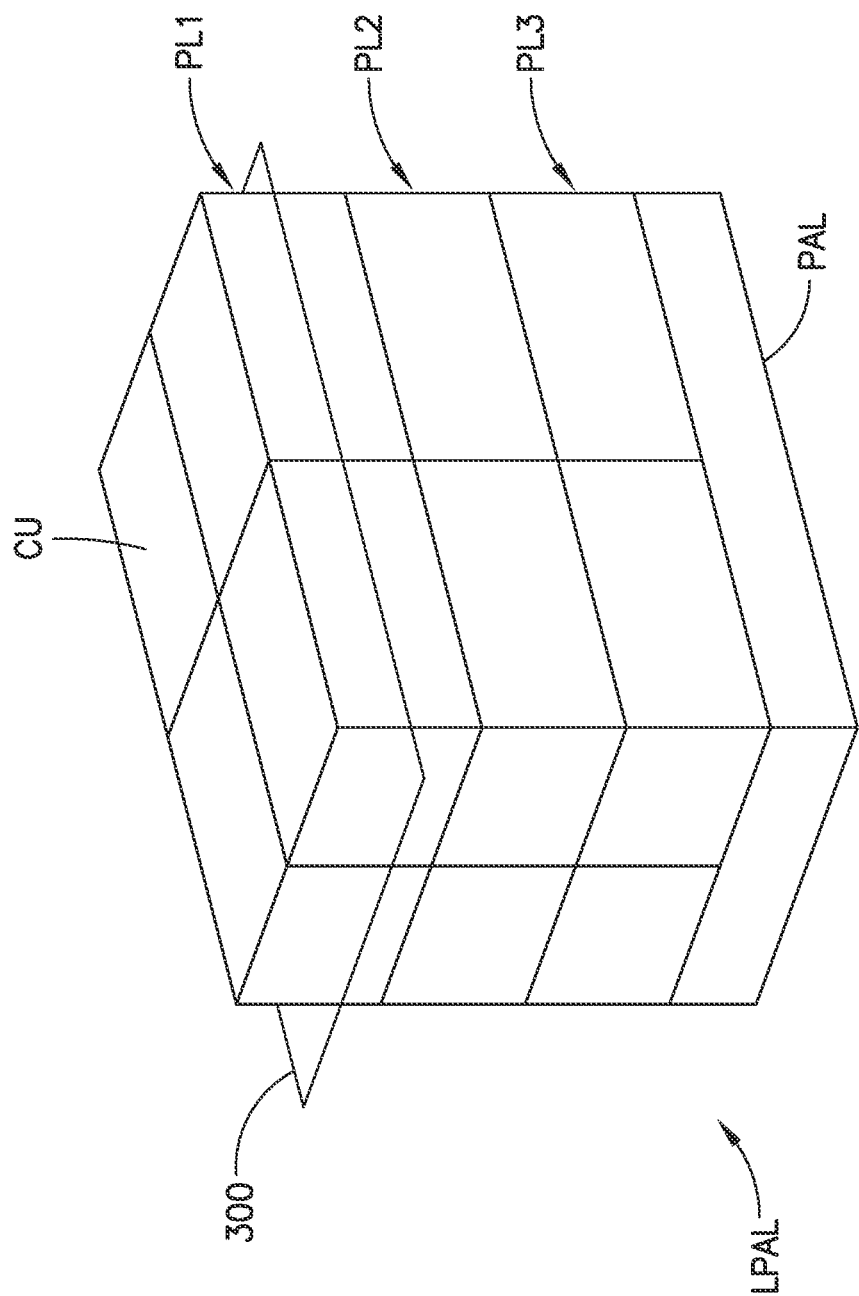
FIG. 3 is a schematic illustration of a loaded pallet in accordance with aspects of the disclosed embodiment.
Figure 3A:
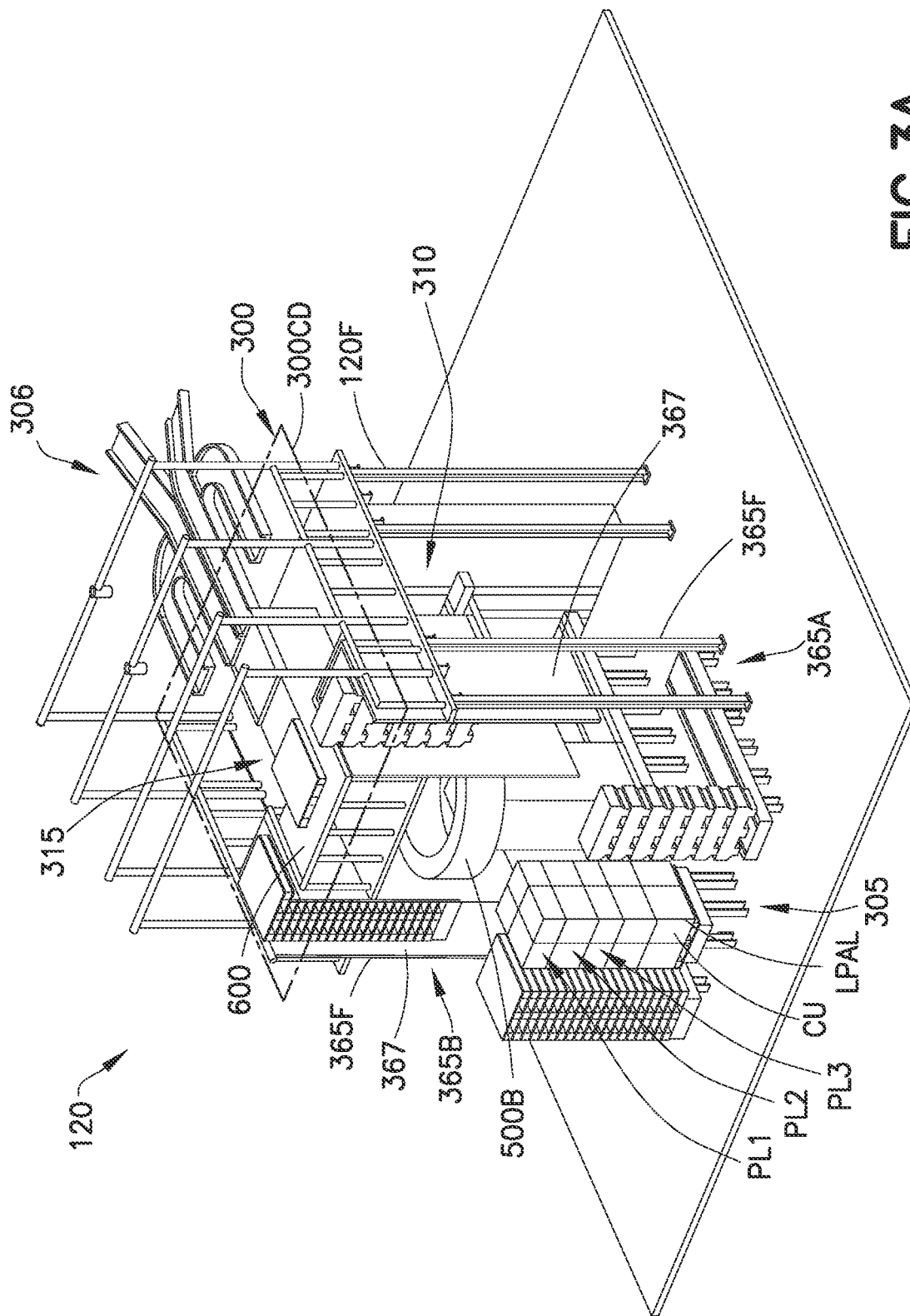
Figure 3B:
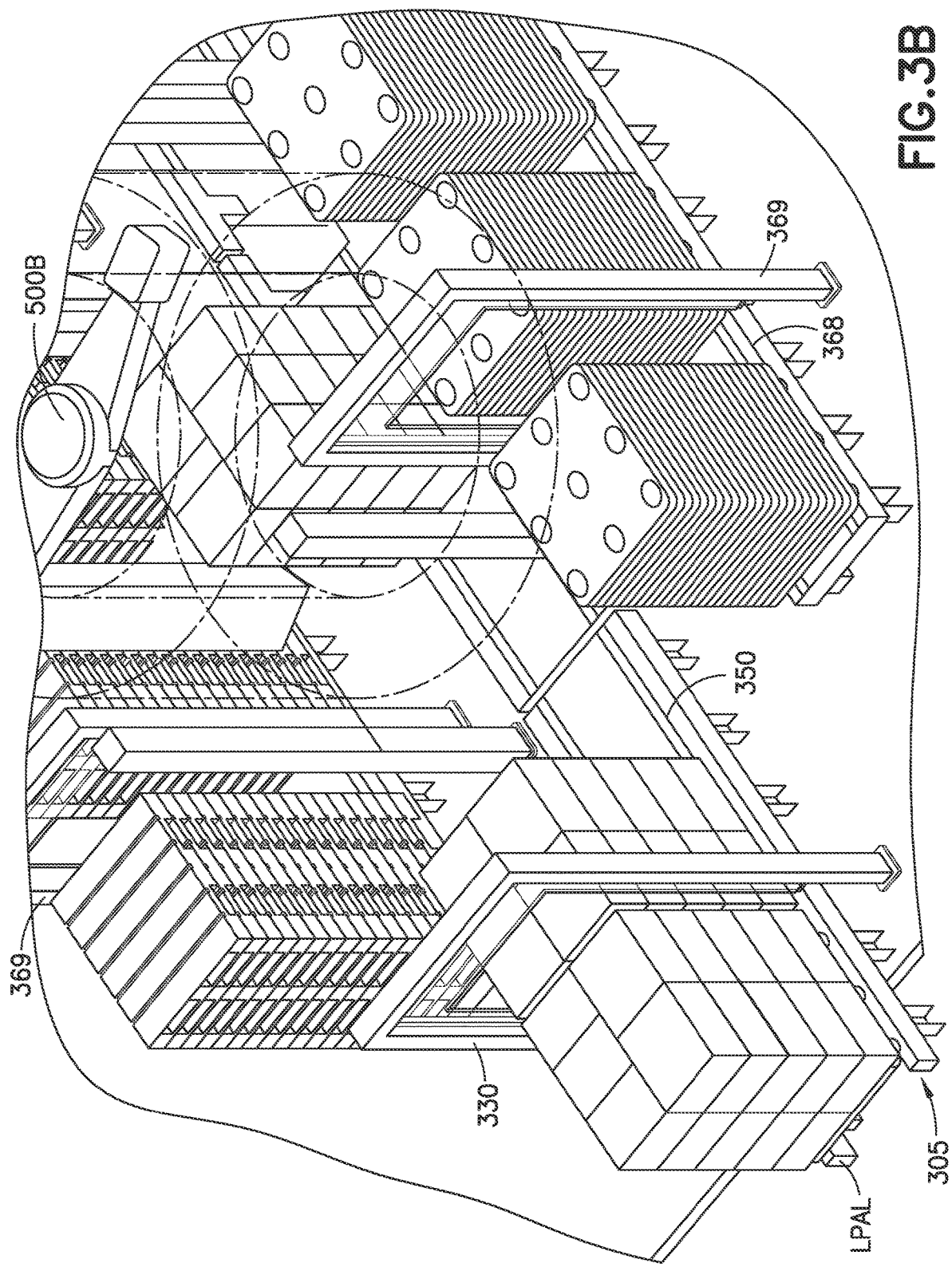
Figure 3C:
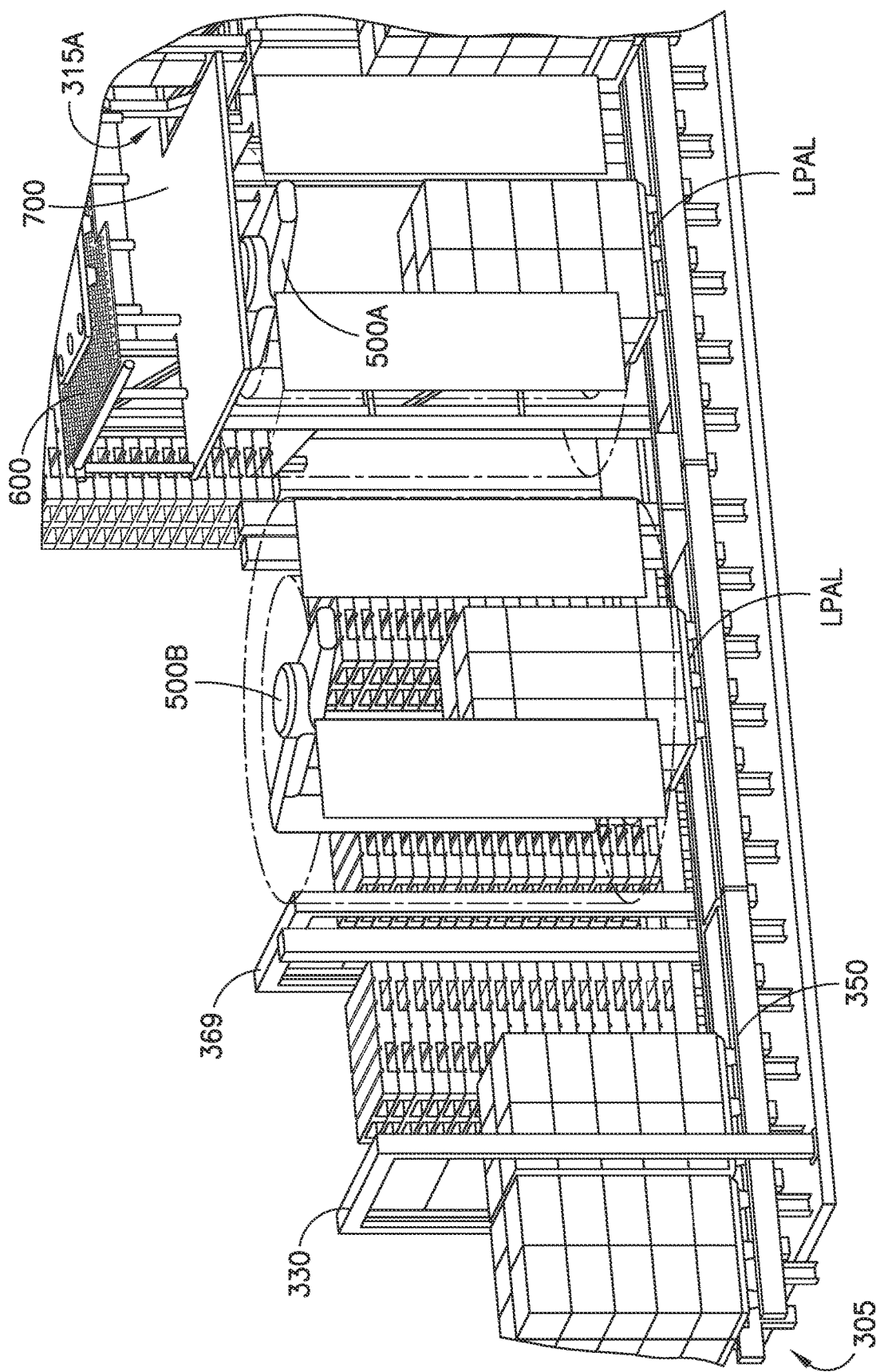
Figure 3D:
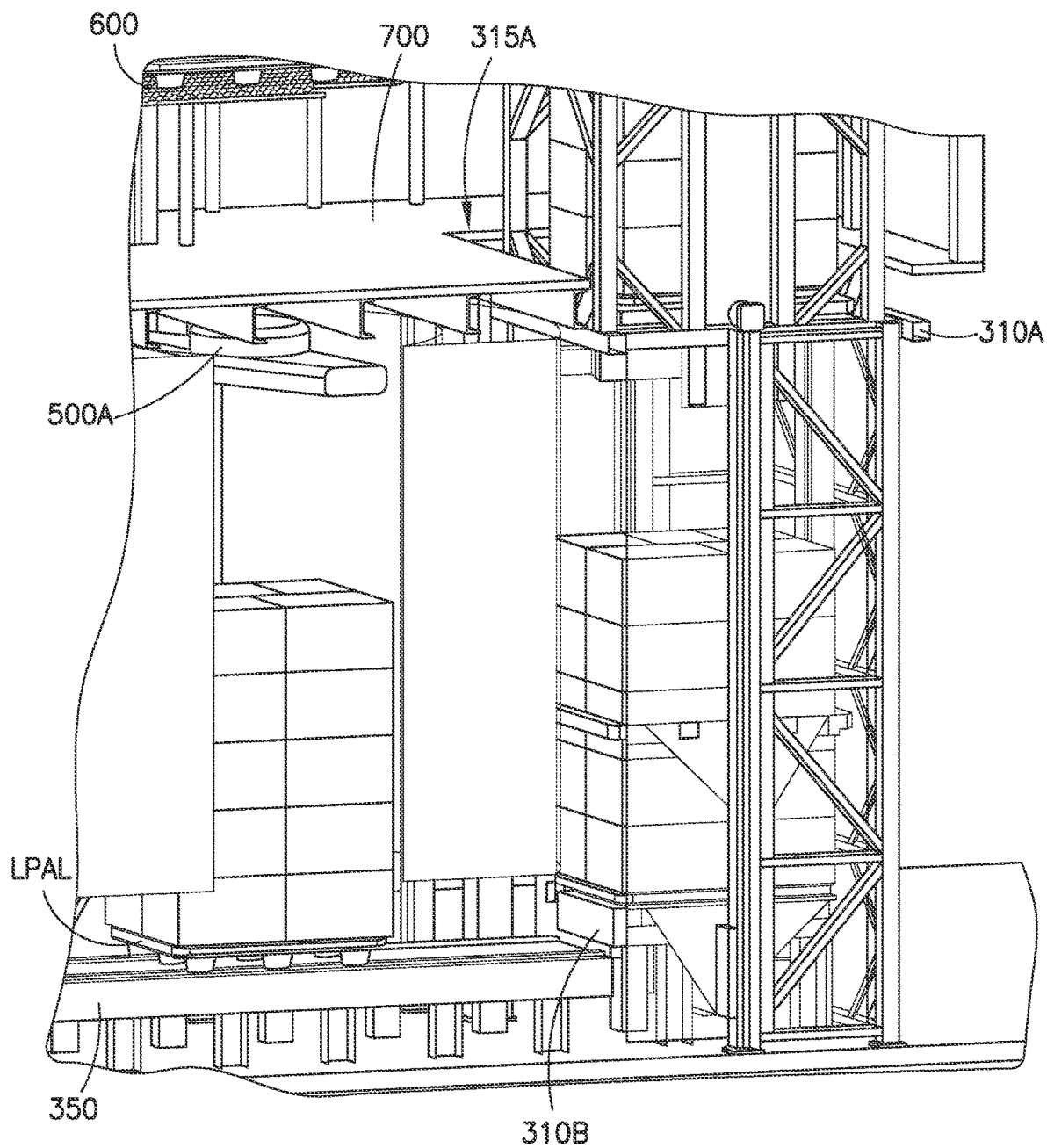

In one aspect, as described above, each of the in-feed transfer stations 170 and the out-feed transfer stations 160 include a respective in/out case conveyor 150A, 150B and a respective palletizer/depalletizer cell 10A, 10B (referred to generally herein as palletizer/depalletizer cell 10). In one aspect, referring also to FIG. 2, the palletizer/depalletizer cells 10 are automated cells each being configured to receive loaded pallets (such as with uniform or mixed case units or products) from, for example, a pallet load in 175 area which may include an in-out loaded pallet conveyor 175C (illustrated in FIG. 1 as an input conveyor) and/or build a loaded pallet (such as with uniform or mixed case units or products) for transport to, for example, a pallet load out 180 area which may include an in-out loaded pallet conveyor 180C (illustrated in FIG. 1 as an output conveyor). In one aspect, the conveyors 175C, 180C are each connected to the storage structure array 130 and are configured so as to bi-directionally transport loaded pallets in an input direction towards the storage structure array 130, and in a different output direction away from the storage structure array 130. In one aspect, the conveyors 175C, 180C may each include a conveyor arrangement with a distributed conveyor bed arranged to form a conveying path or in other aspects, the conveyors 175C, 180C may be discrete transport units such as, for example, a fork lift/pallet truck. Suitable examples of automated palletizer/depalletizer cells 10A, 10B may be found in U.S. patent application Ser. No. 15/235,254 filed on Aug. 12, 2016, and U.S. Pat. No. 8,965,559, issued on Feb. 24, 2015, the disclosures of which are incorporated herein by reference in their entireties. For example, in one aspect each palletizer/depalletizer cell 10 includes a palletizing elevator 12 for gradually lowering or indexing a pallet from a second level 11 to a first level 13 as case units are being moved thereon (or for gradually raising or indexing a pallet from the first level 13 to the second level 11 as case units are being removed therefrom), two product picking apparatuses 14, each for picking products (not shown) from an adjacent infeed conveyor 16 and for moving the products onto the pallet on the palletizing elevator 12, an empty pallet elevator 18 for supplying empty pallets (not shown) to the second level 11; and an empty pallet conveying mechanism 20 between the empty pallet elevator 18 and the palletizing elevator 12 for moving empty pallets 21 from the second level of the empty pallet elevator 18 to the palletizing elevator 12.

Where the palletizer/depalletizer cell 10 functions in an output role as a palletizer, case units (not shown in FIG. 2), that can be of various sizes, arrive via the infeed/outfeed conveyors 16 and are picked by one of the product picking apparatuses 14 and placed at a palletizing/depalletizing area 23, which corresponds to the portion of the palletizing elevator 12 on the upper level 11. Simultaneously to this operation, the empty pallet elevator 18 brings an empty pallet 21 to the empty pallet conveying mechanism 20. The mechanism 20 transfers the empty pallet 21 from the empty pallet elevator 18 to the palletizing area 23. The elevator 12 takes over the pallet 21 and lowers the pallet 21 as the case units are being palletized. Where the palletizer/depalletizer cell 10 functions in an output role as a palletizer, a full pallet (not shown) made from a variety of case units is ready to be picked up by a forklift or else is disposed at the lower portion of the palletizing elevator 12 for conveyance to a pallet load out 180 area. Where the palletizer/depalletizer cell 10 functions in an input role as a depalletizer, a full pallet (not shown) made from a variety of case units is transferred to the palletizing elevator 12 in any suitable manner, such as a fork lift, from a pallet load in 175 area. The elevator 12 raises the pallet 21 as the case units are being depalletized by the product picking apparatus 14 and are transferred to the infeed/outfeed conveyors 16. The mechanism 2 may transfer the empty pallet (e.g., after depalletization) from the palletizing area 23 to the empty pallet elevator 18.

In one aspect, each in-feed transfer station 170 forms, a case input path Ip where the palletizer/depalletizer cell 10A depalletizes case units, layer by layer, or otherwise depalletizes the case units into single case units from standard pallets (e.g., homogenous pallets having a stability suitable for automatic engagement of a pallet layer by an automatic layer interface unit, such as the product picking apparatus 14). The palletizer/depalletizer cell 10A is in communication with a transport system of the automated storage and retrieval system 100, such as an in/out case conveyor 150A so as to form an integral input system (e.g., the in-feed transfer station 170) that feeds case units to the automated storage and retrieval system 100. Each in-feed transfer station 170 defines the case input path Ip that is integrated with the automated storage and retrieval system 100 and warehouse management system 199, where the warehouse management system 199 includes any suitable controller 199C configured with any suitable non-transitory program code and memory to manage, at least, case unit input to the storage structure array 130B, case unit storage distribution within the storage structure array 130B and case unit retrieval from the storage case structure array 130B, unit inventory/replenishment and case unit output.

In one aspect, each case unit input path Ip includes at least one corresponding case unit inspection cell 142 in communication with the warehouse management system 199. In one aspect, the at least one corresponding case unit inspection cell 142 may be any suitable inspection cell including any suitable volumetric inspection, such as with a multi-dimensional light curtain, imaging systems and/or any other suitable sensing/sensor arrangement configured to detect case unit defects and identify the case units for, e.g., inventory, transport sequencing, storage distribution and sequencing the case unit for output from the storage structure array 130B.

In one aspect, as noted above, the palletizer/depalletizer cell 10A may be fully automatic so as to break down or decommission layer (s) from a pallet unloading at the palletizer/depalletizer cell 10A. It is noted that, referring to FIG. 2, the term decommission refers to the removal of a pallet layer PL1, PL2, PL3 (in whole or in part) from a pallet PAL so that each case unit CU is removed from the layer PL1, PL2, PL3 at a predetermined level 300 (which may correspond to a decommissioning/commissioning level or transfer plane) of the pallet PAL so that the pallet PAL is indexed to a next level of the pallet PAL for removal of the next layer PL2, PL3 (in whole or in part) corresponding to the next level of the pallet PAL.

In one aspect, the palletizer/depalletizer cell 10A is configured to decommission the layers PL1, PL2, PL3 so that the decommissioning is synchronous or otherwise harmonized (i.e., matched with) by the warehouse management system 199 with a predetermined rate of case unit flow or feed rate, established by the warehouse management system 199, in the automated storage and retrieval system 100. For example, in one aspect, the warehouse management system 199 is configured to set and/or monitor a predetermined rate of case unit flow within the automated storage and retrieval system 100. For example, the warehouse management system 199 monitors and manages the automated systems of the automated storage and retrieval system 100 (such as, e.g., the in/out case conveyors 150A, 150B, bots 110 and palletizer/depalletizer cells 10A, 10B), where each of the automated systems, or one or more of automated systems have a given transaction time (such as a time/period to effect a basic unit of transport or transfer of cases, e.g., to transfer a case unit on/off the in/out case conveyor to a pick/place station, or lift a case unit a predetermined distance, or bot transfer pick/place on a storage location, a time to transfer a pallet layer to or from a pallet, etc.) that in effect, singularly or in combination define, under control of the warehouse management system 199 or any other suitable controller of the automated storage and retrieval system 100 (e.g., bot controllers, conveyor controllers, palletizer/depalletizer controllers, etc.), the predetermined rate of case unit flow in the automated storage and retrieval system 100 established by the warehouse management system 199. For example, the controller 199C of the warehouse management system 199 is communicably connected to the in-out case conveyor (s) 150A, 150B so that the in-out case conveyor (s) 150A, 150B bi-directionally transport the case units to and from the storage structure array 130 at a predetermined case feed rate. The controller 199C may also be communicably connected to a palletizer-depalletizer cell 10A, 10B corresponding to the in-out case conveyor (s) 150A, 150B so that the layer commissioning and decommissioning of the palletizer/depalletizer cell 10A, 10B, which are respectively substantially continuous, matches the predetermined case feed rate. While the aspects of the disclosed embodiment are described herein with respect to a distribution facility 100WS having automated storage and retrieval system 100 with automated transport systems, the aspects of the disclosed embodiment are also applicable to distribution facilities having any suitable transport systems such as both automated and manual transport systems or to wholly manual transport systems, where both the automated transport transactions and the manual transport transactions each have respective transaction times where the commissioning and decommissioning of case units to and from pallets may be matched to the transaction times in a manner substantially similar to that described herein.

In one aspect, each out-feed transfer station 160 forms, a case output path Op where the palletizer/depalletizer cell 10B palletizes case units, layer by layer onto pallets PAL such as with an automatic layer interface unit, such as the product picking apparatus 14. In one aspect, the pallets PAL may be formed as standard pallets (e.g., homogeneous case units) or as mixed pallets, such as described in U.S. patent application Ser. No. 14/997,920, filed on Jan. 18, 2016, the disclosure of which is incorporated herein by reference in its entirety. In one aspect, the warehouse management system 199 is configured to establish a pallet solution, with mixed case units, that provides a stable pallet load stack suitable for an end effector of the product picking apparatus 14 to transfer as a layer. As described above, a suitable example, of the palletizer/depalletizer cell 10B may be found in U.S. patent application Ser. No. 15/235,254, filed on Aug. 12, 2016, the disclosure or which was previously incorporated herein by reference in its entirety.

In one aspect, the palletizer/depalletizer cell 10B is in communication with transport system of the automated storage and retrieval system 100, such as an in/out case conveyor 150B so as to form an integral output system (e.g., the out-feed transfer station 160) that receives case units from the automated storage and retrieval system 100 for placement on pallets according to any suitable case out order sequence. For example, as described above, the palletizing elevator 12 of the palletizer/depalletizer cell 10B may be incrementally positioned so that case units routed to the product picking apparatus 14 are transferred to the pallet PAL by the end effector of the product picking apparatus, with the output case units being arranged in a predetermined sequence established by the warehouse management system 199, layer by layer (noting that the layer may cover the pallet in whole or in part) to form a standard output pallet load.

Each out-feed transfer station 160 defines the case output path Op that is integrated with the automated storage and retrieval system 100 and warehouse management system 199, where the warehouse management system 199 includes any suitable controller 199C configured with any suitable non-transitory program code and memory to manage the operation of the distribution facility 100WS, including case unit output from the storage structure array 130B, as described herein. In one aspect, each case unit output path Op includes at least one corresponding case unit inspection cell 142 (as described above) in communication with the warehouse management system 199. In one aspect, as noted above, the palletizer/depalletizer cell 10B may be fully automatic so as to build or commission layer (s) to a pallet loading at the palletizer/depalletizer cell 10B. It is noted that, referring to FIG. 2, the term commission refers to the construction of a pallet layer PL1, PL2, PL3 (in whole or in part) to a pallet PAL so that each case unit CU is inserted to the layer PL1, PL2, PL3 at a predetermined level 300 (which may correspond to a decommissioning/commissioning level or transfer plane) of the pallet PAL until the pallet layer PL1, PL2, PL3 is formed so that the pallet PAL is indexed to a next level of the pallet PAL for building of the next layer PL1, PL2 (in whole or in part) corresponding to the next level of the pallet PAL. In one aspect, the palletizer/depalletizer cell 10B is configured to commission the layers PL1, PL2, PL3 so that the commissioning is synchronous or otherwise harmonized (i.e., matched with) by the warehouse management system 199 with a predetermined rate of case unit flow or feed rate, established by the warehouse management system 199, in the automated storage and retrieval system 100 in a manner substantially similar to that described above with respect to the decommissioning of the layers PL1, PL2, PL3, where the warehouse management system 199 manages case unit retrieval order and the sequence of mixed case unit output to loadout sequence of the mixed case unit pallet load, and other associated aspects of such output as inventory reconciliation.

In one aspect, the input paths Ip and output paths Op defined by the respective automatic palletizer/depalletizer cells 10A, 10B may be unsuited to depalletize or palletize non-standard pallet load configurations that may be presented respectively thereto, and consequently the corresponding input paths IP or output paths Op may be inoperable relative to such non-standard pallet load configurations. In one aspect, the non-standard pallet load configurations include any suitable predetermined conditions, such as, with respect to inbound case units, an unstable inbound pallet, damaged inbound pallet wrap, case units in pallet layer being unsuitable for automatic depalletizing, inoperability of the at least one automatic depalletizer cell, inoperability of a depalletizer component and inoperability of the in-out case conveyor in an infeed direction; and, with respect to outbound case units, a determined mixed case pallet solution being identified as potentially unstable, the case units being unsuitable for automatic palletizing, inoperability of the at least one automatic palletizer cell, inoperability of a palletizer component and inoperability of the in-out case conveyor in an out-feed direction.

Referring still to FIG. 1 as well as FIGS. 3A-3E, the automated storage and retrieval system 100 includes a bidirectional palletizer-depalletizer cell 120 connected to and disposed between the in-out case conveyor 150C and the loaded pallet conveyor 175C, 180C. The palletizer-depalletizer cell 120 is arranged (as will be described herein) to interface with non-standard and/or standard pallet loads, inbound to the automated storage and retrieval system 100 (and which case units are to be input in the automated storage and retrieval system 100) and outbound pallet loads, outbound from the automated storage and retrieval system 100, and in one aspect, provides a throughput of about 1800 transactions per hour. The palletizer-depalletizer cell 120 interfaces with the non-standard and/or the standard pallet loads with a common palletizer and depalletizer interface for both the non-standard and standard pallet loads, for both inbound and outbound pallet loads (including mixed case pallet loads) as will be described further below. In one aspect, the palletizer-depalletizer cell 120 defines an automation augmented manual palletizer-depalletizer cell of the automated storage and retrieval system 100. In one aspect, any suitable controller of the distribution facility 100WS, such as controller 199C, is configured to identify the predetermined conditions (described above) that renders one of the palletizer/depalletizer cells 10A (or any other suitable component of the in-feed transfer station 170) or the palletizer/depalletizer cells 10B (or any other suitable components of the out-feed transfer station 160) incompatible for respectively automatic palletizing or automatic depalletizing and in response to such identification generate a bypass path Bp, bypassing the output path Op or input path Ip with the incompatible palletizer/depalletizer cell 10A, 10B, through the augmented manual palletizer/depalletizer cell 120.

In one aspect, the palletizer-depalletizer cell 120 defines the bypass path Bp to both inoperable or otherwise unavailable input paths Ip and output paths Op. It should be understood that while the automated storage and retrieval system 100 is illustrated as having one palletizer-depalletizer cell 120 forming a single bypass path Bp, in other aspects, the automated storage and retrieval system 100 may include more than one palletizer-depalletizer cell 120 each forming a respective or separate bypass path Bp. The bypass path Bp defined by the palletizer-depalletizer cell 120 is an automation augmented manual palletizer-depalletizer cell, where the automated augmentation serves (as will be described herein) so that each bypass path Bp is integrated with the automated storage and retrieval system 100. For example, the automated augmentation automatically communicates with the automated storage and retrieval system 100 transport systems to feed input case units depalletized from pallets PAL, and receive output cases (which may be mixed cases) to be palletized on pallets PAL, where the bypass path Bp is a common bidirectional path to both feed the input case units and to receive the output case units, and where the warehouse management system 199 manages case unit input to the storage structure array 130B, case unit storage distribution within the storage structure array 130B, case unit retrieval order and the sequence of mixed case unit output to loadout sequence of the mixed case unit pallet load, and other associated aspects of output such as inventory reconciliation, as described above with respect to the input paths IP and output paths Op.

In one aspect, the bidirectionality of the respective bypass paths Bp facilitates selection of a direction (e.g., an input direction) along the common path, formed by the respective bypass path Bp, such as to supplement (and/or replace if desired) designated input paths Ip. The bidirectionality of the respective bypass paths Bp also facilitates selection of the opposite direction (e.g., the output direction) on the common path, formed by the respective bypass path Bp, to supplement (and/or replace if desired) designated output paths Op. Upon determination (e.g., from indication or information from any suitable sensors of the automated storage and retrieval system, such as case unit sensors) that one or more respective input path IP and/or output path Op are inoperable or otherwise unavailable, the warehouse management system 199 is configured to generate the input/output path associated with the bidirectional palletizer-depalletizer cell 120 as the bypass path Bp that is operable to serve both as an input bypass path and an output bypass path along a common path. The automated augmentation provided by the bidirectional palletizer-depalletizer cell 120 to human operators further serves to harmonize (i.e., match) the case flow, whether inbound or outbound along a respective common bypass path Bp, providing a substantially continuous flow (as described herein) of input cases (e.g., depalletized) fed to the automated storage and retrieval system 100 and a substantially continuous flow of output cases (e.g., palletization of the outbound cases) in an output pallet load, that matches the predetermined rate of case flow of the automated storage and retrieval system that is established by the warehouse management system 199.

As can be seen in FIGS. 3A-3E and FIGS. 4A-4C, the palletizer-depalletizer cell 120 includes a cell frame 120F, a bi-directional pallet transport system 310 and more than one independently driven pallet transports 310A, 310B (also referred to as load pallet lifts) connected to the cell frame 120F, where each of the transports 310A, 310B has a respective lift 310AL, 310BL, each defining a different pallet holder 310AH, 310BH that is independently movable relative to the cell frame 120F. In one aspect, the cell frame 120F defines a loaded pallet transfer interface 305 and a case transfer interface 306. The loaded pallet transfer interface 305 is communicably connected to the in-out loaded pallet conveyor 175C, 180C and the case transfer interface 306 is communicably connected to the in-out case conveyor 150C. In one aspect, the in-out case conveyor 150C bi-directionally transports the case units CU to and from the case transfer interface 306 dependent on a predetermined case transfer rate between the case transfer interface 306 and the in-out case conveyor 150C, where the layer commissioning and decommissioning, which are respectively substantially continuous, determine the predetermined case transfer rate.

In one aspect, the loaded pallet transfer interface 305 is configured to interface with the in-out loaded pallet conveyor 175C, 180C in any suitable manner for transferring loaded pallets LPAL between in-out loaded pallet conveyor 175C, 180C and the loaded pallet transfer interface 305. In one aspect, the loaded pallet transfer interface 305 includes any suitable conveyor 350 on which the loaded pallets LPAL are placed. The conveyor 350 is configured to transport the loaded pallet LPAL between the in-out loaded pallet conveyor 175C, 180C and the second pallet holder 310BH of the transport 310B, where the transport 310B transports the loaded pallet LPAL to the common pallet layer interface 315 of the palletizer-depalletizer cell 120 for commissioning or decommissioning of the pallet layers PL1, PL2, PL3 of the loaded pallet LPAL. In one aspect, the in-out loaded pallet conveyor 175C, 180C bi-directionally transports loaded pallets to and from the loaded pallet transfer interface 305 dependent on a predetermined loaded pallet transfer rate between the loaded pallet transfer interface 305 and the in-out loaded pallet conveyor 175C, 180C, where the layer commissioning and decommissioning, which are respectively substantially continuous, determine the predetermined loaded pallet transfer rate. In one aspect, the loaded pallet interface 305 includes any suitable loaded pallet inspection station 330 that is connected to the controller 199C of the warehouse management system 199 and includes any suitable sensors, such as a multidimensional light curtain, cameras, etc. configured to sense a shape and size of the loaded pallet, damage to the wrapping of the pallet, crushed case units on the pallet, etc. As an example, where the palletizer/depalletizer cell functions in an output role, upon detection of a defect in the loaded pallet the loaded pallet inspection station may provide an aural, visual or other suitable indication to an operator to attend to the defective loaded pallet. In one aspect, the loaded pallet inspection station 330 may be disposed along the conveyor 350 so that as the loaded pallets travel along the conveyor 350 the loaded pallets pass through the loaded pallet inspection station 330. In one aspect, the palletizer/depalletizer cell 120 also includes one or more wrapper stations 500A, 500B which may be disposed along the conveyor 350 adjacent the first lift and the second lift so that loaded pallets are transferred from the second lift to the wrapper station such that as the loaded pallets travel along the conveyor 350 the wrapper stations 500A, 500B wrap the loaded pallets with, for example, plastic wrap to stabilize the pallet load.

Figure 4A:
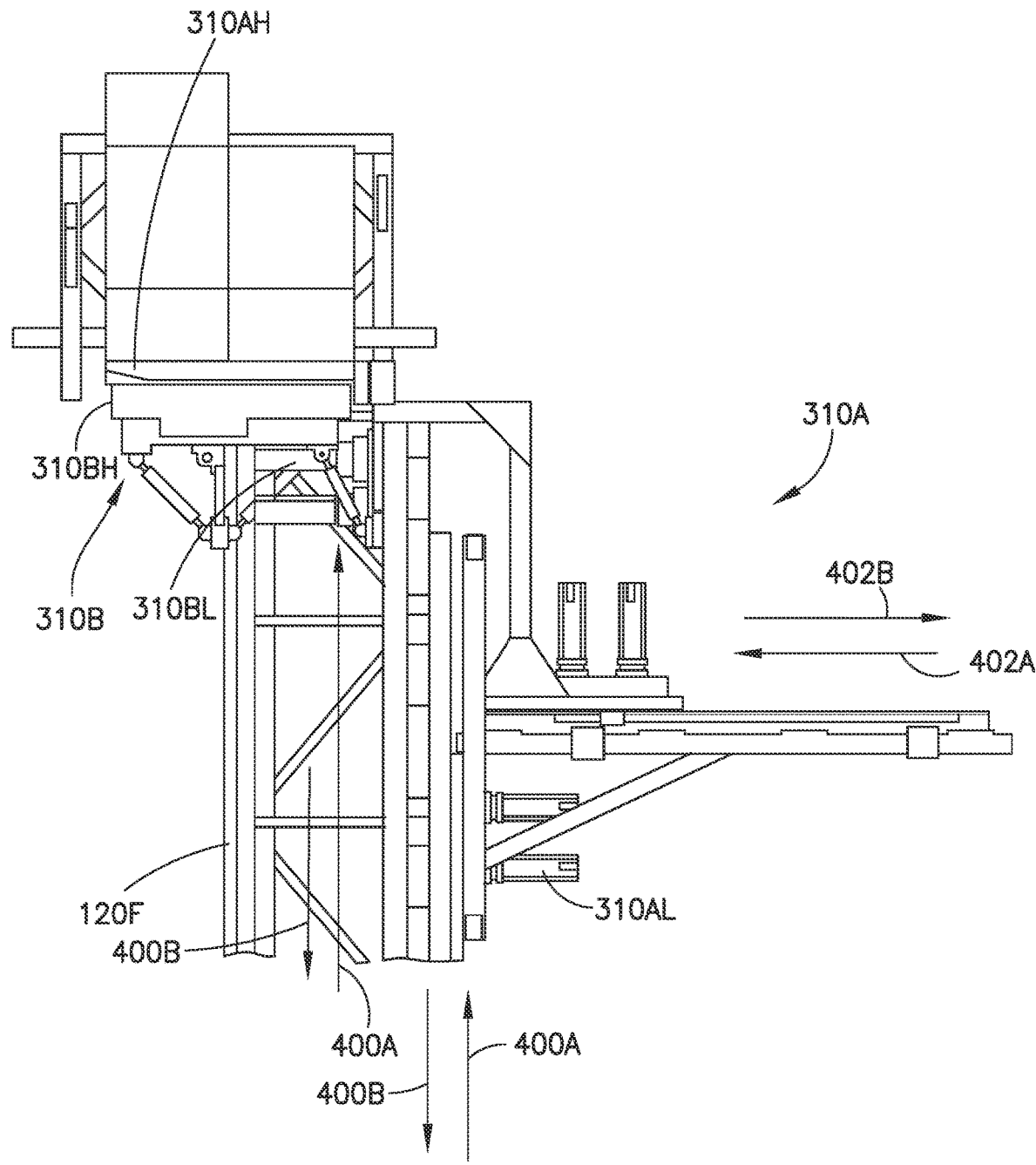
Figure 4B:
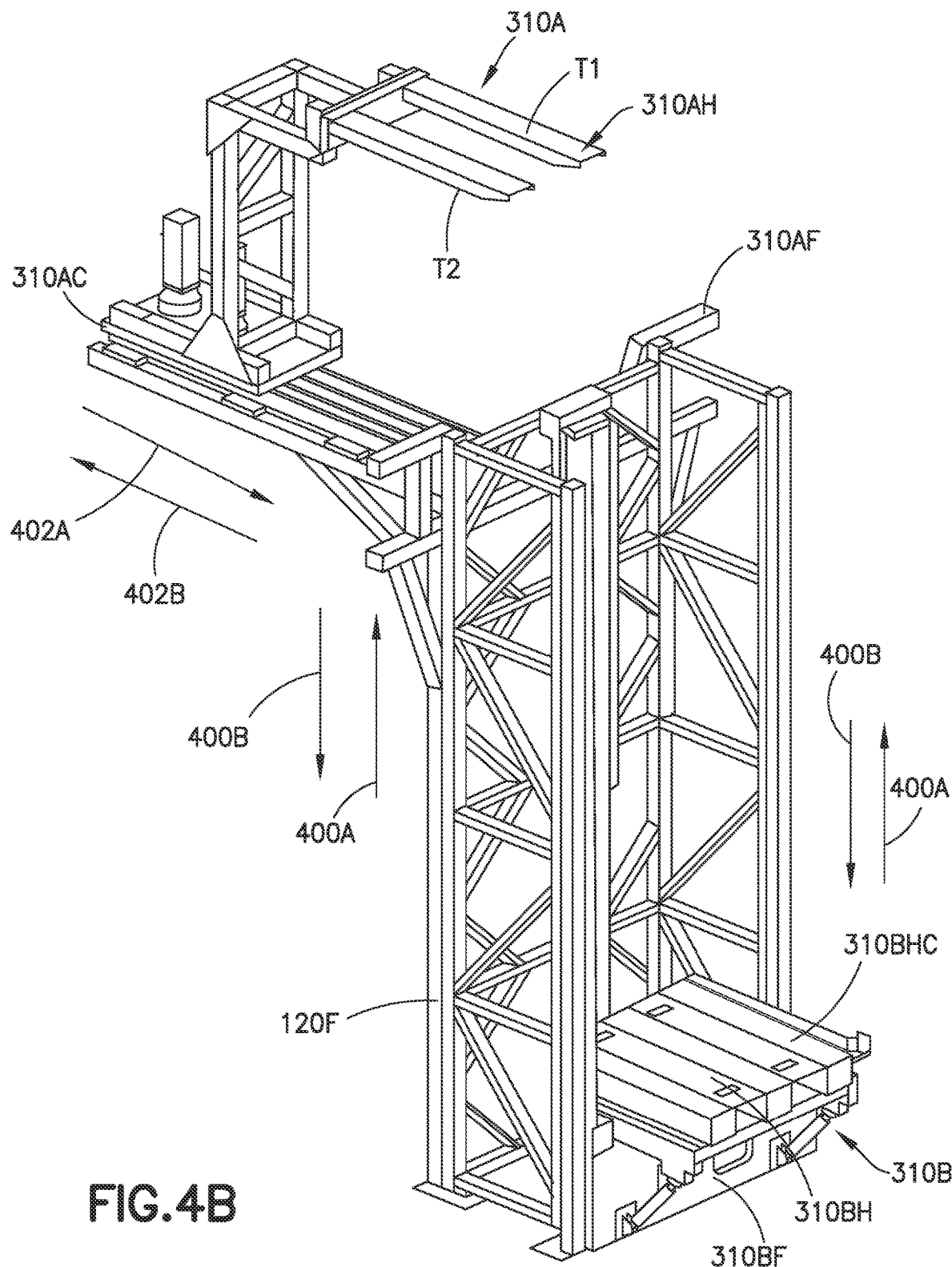
Figure 6:
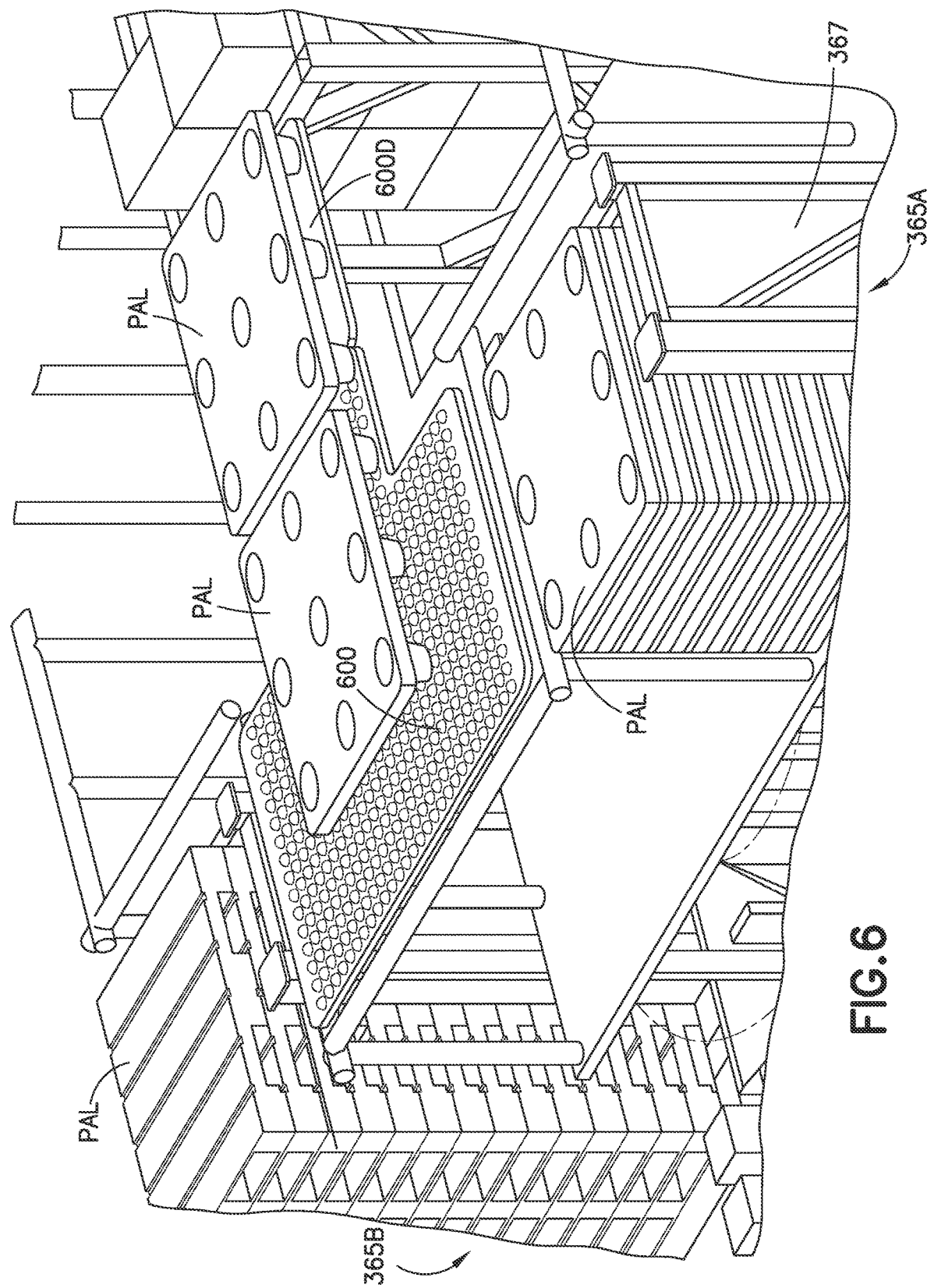
FIG. 6 is a schematic illustration of a portion of the palletizer/depalletizer of FIGS. 3A-3E in accordance with aspects of the disclosed embodiment.
Figure 7B:
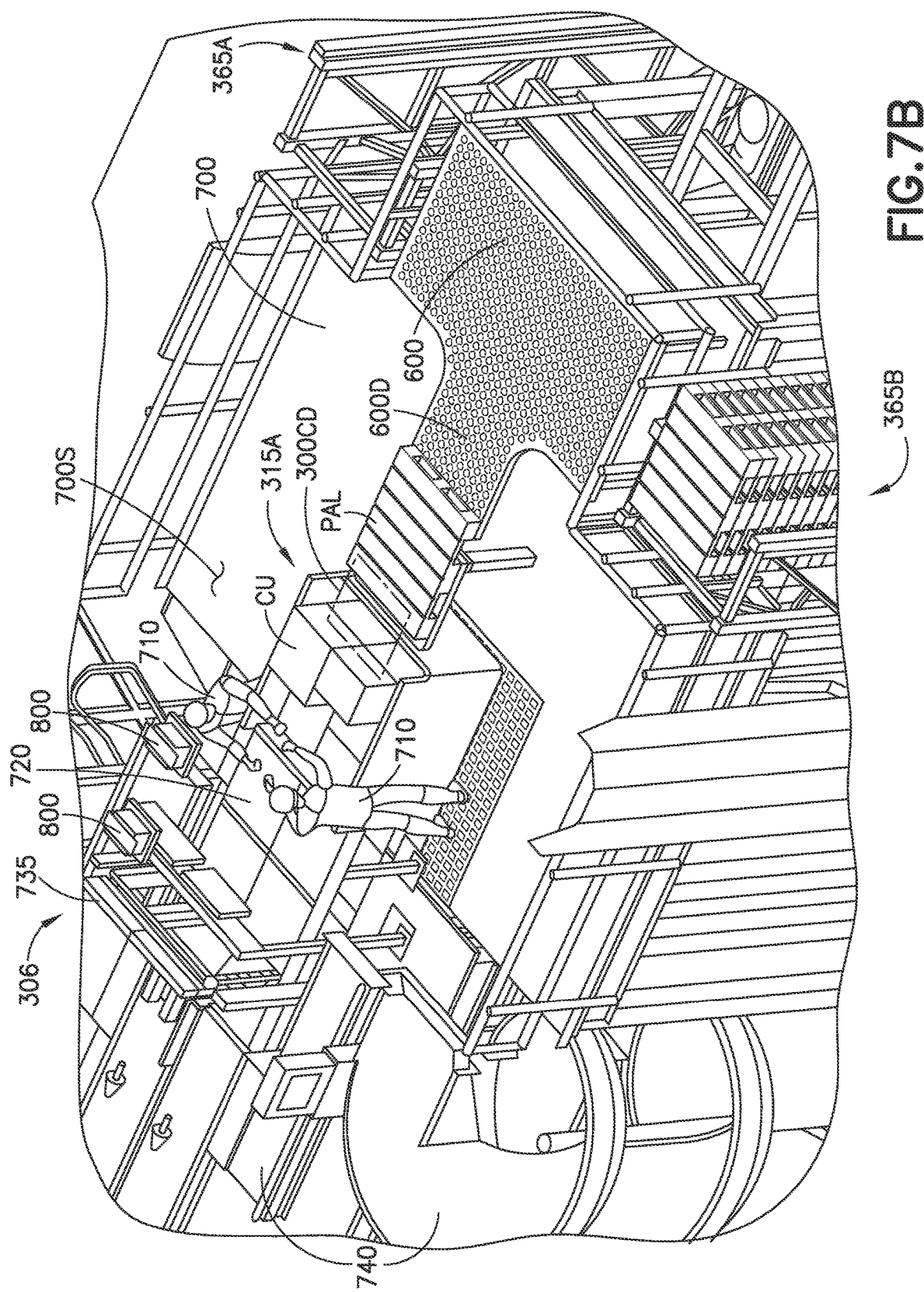
Figure 7C:
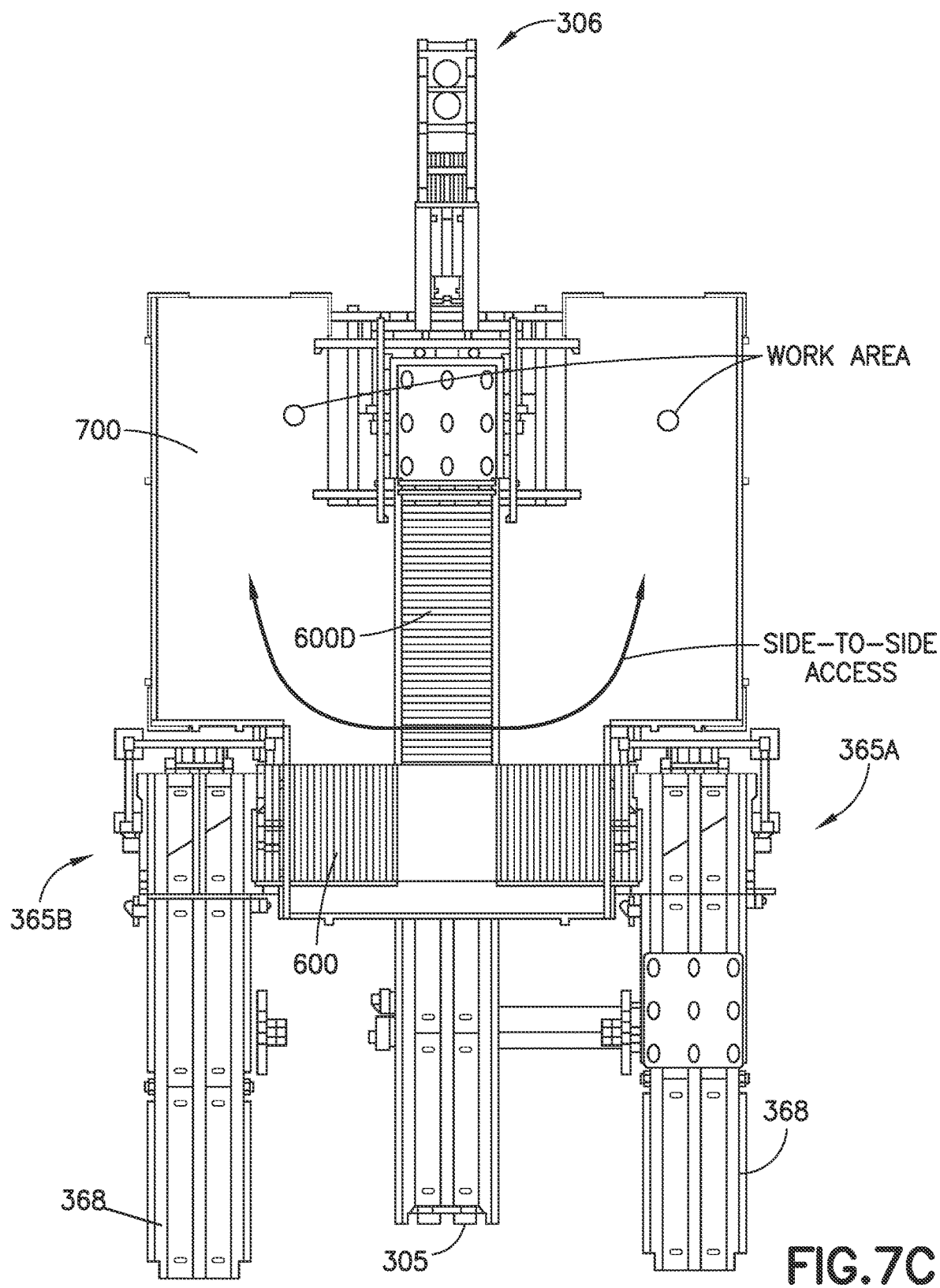
Figure 7D:
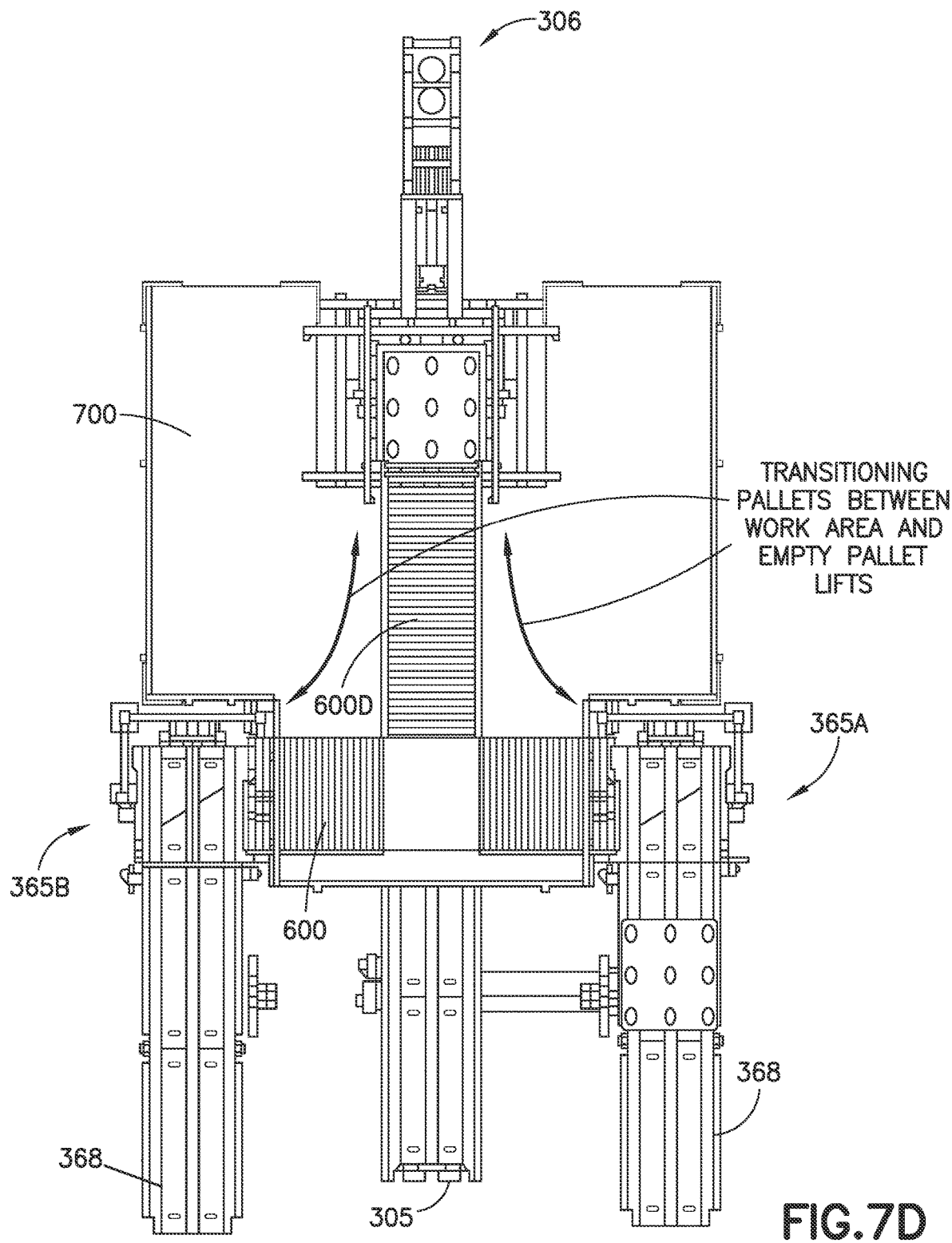

As can be seen best in FIGS. 4A-4B the pallet transport 310B includes a frame 310BF and a pallet holder 310BH (referred to herein as a second pallet holder) connected to the frame 310BF. In one aspect the frame 310BF may be integral with the cell frame 120F while in other aspects, the frame 310BF may be connected to the cell frame 120F in any suitable manner. In still other aspects, the frame 310BF may be a standalone frame that is positioned relative to the cell frame 120F to transport pallets as described herein. In one aspect the pallet holder 310BH is configured to interface with the conveyor 350 in any suitable manner. For example, the second pallet holder 310BH may include a conveyor 310BHC or any suitable low friction surface where when the palletizer-depalletizer cell 120 serves an input or depalletizing role, the loaded pallet LPAL is transferred from the conveyor 350 to the conveyor 310BHC (where conveyor 310BHC actively transfers the loaded pallet LPAL with the conveyor 350) or low friction surface (where the conveyor 350 pushes the loaded pallet onto the passive low friction surface). When the palletizer-depalletizer cell 120 serves an output or palletizing role, the loaded pallet LPAL is transferred from the conveyor 310BHC to the conveyor 350 (where conveyor 310BHC actively transfers the loaded pallet LPAL with the conveyor 350) or from the low friction surface (where the conveyor 350 pulls the loaded pallet from the passive low friction surface). In one aspect, the pallet transport 310B includes any suitable drive motor and transmission for moving or indexing the second pallet holder 310BH in directions 400A, 400B to raise or lower (i.e., index) a pallet held on the second pallet holder 310BH to effect commissioning or decommissioning of the pallet layers PL1, PL2, PL3. In one aspect, the second pallet holder 310BH is configured to engage a bottom surface PALBS of the pallet such that the bottom surface PALBS of the pallet PAL rests on the second pallet holder 310BH.

In one aspect, the pallet transport 310A includes the pallet holder 310AH (referred to herein as the first pallet holder) that is different from the second pallet holder 310BH. The pallet transport 310A also includes a frame 310AF that is integral to or connected to the cell frame 120F in any suitable manner. In one aspect, the pallet transport 310A includes a carriage 310AC that is movably mounted to the frame 310AF in any suitable manner so as to traverse in directions 400A, 400B for raising or lowering (i.e., indexing) first pallet holder 310AH (and the loaded pallet PLAL thereon) to effect commissioning or decommissioning of the pallet layers PL1, PL2, PL3. In one aspect, the carriage 310AC provides the first pallet holder 310AH with movement in directions 402A, 420B to effect engagement and disengagement between the first pallet holder 310AH and the loaded pallet LPAL.

For example, the pallet PAL includes a lower or bottom support surface PALBS (on which the pallet rests when placed on a support surface such as a floor) and an upper support surface PALUS (on which case units are placed). In one aspect, spacers PALSP are provided between the bottom support surface PALBS and the upper support surface PALUS so that apertures or channels or formed into which the first pallet holder 310AH is inserted (e.g., in a similar manner in which the fork tines of a fork lift are inserted into the apertures or channels of a pallet). Here the first pallet holder 310AH includes fork tines T1, T2 that are configured for insertion into and removal from (e.g., in directions 402A, 402B) the apertures or channels formed between the bottom support surface PALBS and the upper support surface PALUS so that the fork tines T1, T2 (when moved in directions 400A, 400B) engage or disengage a bottom portion PALUSB of the upper support surface PALUS. The carriage 310AC includes any suitable motors and transmissions that move the first pallet holder 310AH in directions 402A, 402B for inserting and removing the fork tines T1, T2 of the first pallet holder into the apertures or channels of the loaded pallet LPAL (or a pallet PAL in general, whether loaded or unloaded). The first pallet holder 310AH being configured to engage the bottom portion PALUSB of the upper support surface PALUS and the second pallet holder 310BH being configured to engage the bottom surface PALBS of the loaded pallet LPAL provides a three axis pallet handling robot with overlapping work envelops for substantially simultaneous but independent holding of the loaded pallet LPAL for handing off the loaded pallet LPAL between the first and second pallet holders 310AH, 310BH and/or for commissioning or decommissioning the pallet layers LP1, LP2, LP3.

In one aspect, the cell frame 120F defines a common pallet layer interface 315 that is common to both pallet layer loading and pallet layer unloading. The common pallet layer interface 315 is arranged so that placement of case units CU commissioning a pallet layer loading (e.g., which in one aspect includes case units corresponding to a single layer of the pallet being loaded) of a pallet PAL and the removal of case units CU decommissioning a pallet layer unloading (e.g., which in one aspect includes case units corresponding to a single layer of the pallet being unloaded) of another pallet PAL are both effected at the common pallet layer interface 315 at a predetermined level 300 of the cell frame 120F defining a layer commission-decommission level 300CD respectively of the pallet layer loading and of the other pallet unloading.

In one aspect, referring to FIGS. 6 and 7A-7D the cell frame 120F of the palletizer-depalletizer cell 120 has an operator platform 700 positioned proximate the common pallet layer interface 315 and disposed for operator 710 access effecting loading and unloading case units CU respectively commissioning and decommissioning pallet layers from the corresponding pallet layer loading (where the palletizer-depalletizer cell 120 serves in an output role) and pallet layer unloading (where the palletizer-depalletizer cell 120 serves in an input role) at the layer commission-decommission level 300CD. In one aspect, the operator platform includes an operator support surface 700S on which the operator(s) 710 walk. In one aspect, the cell frame 120F defines the case transfer interface 306 that includes one or more conveyors 720 disposed adjacent the common pallet layer interface 315 where the one or more conveyors 720 are configured to transport case units between the common pallet layer interface 315 and the in/out case conveyor 150C. In one aspect, a case inspection station 735 is disposed at the case transfer interface 306 and includes any suitable sensor, such as a multidimensional light curtain, cameras, etc. configured to sense a shape and size of the case units and an identity of the case units. The case inspection station 735 is connected to the controller 199C in any suitable manner and in one aspect, is configured to inspect outbound case units CU for predetermined criteria including identification, shape conformance and damage, such that where the predetermined criteria are satisfied the case inspection station routes the outbound case units to the common pallet layer interface 315, and where the predetermined criteria are not satisfied the inspection station 735 routes the outbound case units to a rejection conveyor 740; while in other aspects, the case inspection station 735 is configured to inspect inbound case units for predetermined criteria including identification, shape conformance and damage, such that where the predetermined criteria are satisfied the case inspection station 735 routes the inbound case units to the in-out case conveyor 150C, and where the predetermined criteria are not satisfied the inspection station routes the inbound case units to the rejection conveyor 740. In one aspect, the case inspection station 735 includes any suitable any suitable inspection cell, such as described above, including any suitable volumetric inspection, such as with a multi-dimensional light curtain, imaging systems and/or any other suitable sensing/sensor arrangement configured to detect case unit defects and identify the case units for, e.g., inventory, transport sequencing, storage distribution and sequencing the case unit for output from the storage structure array 130B.

Figure 8B:
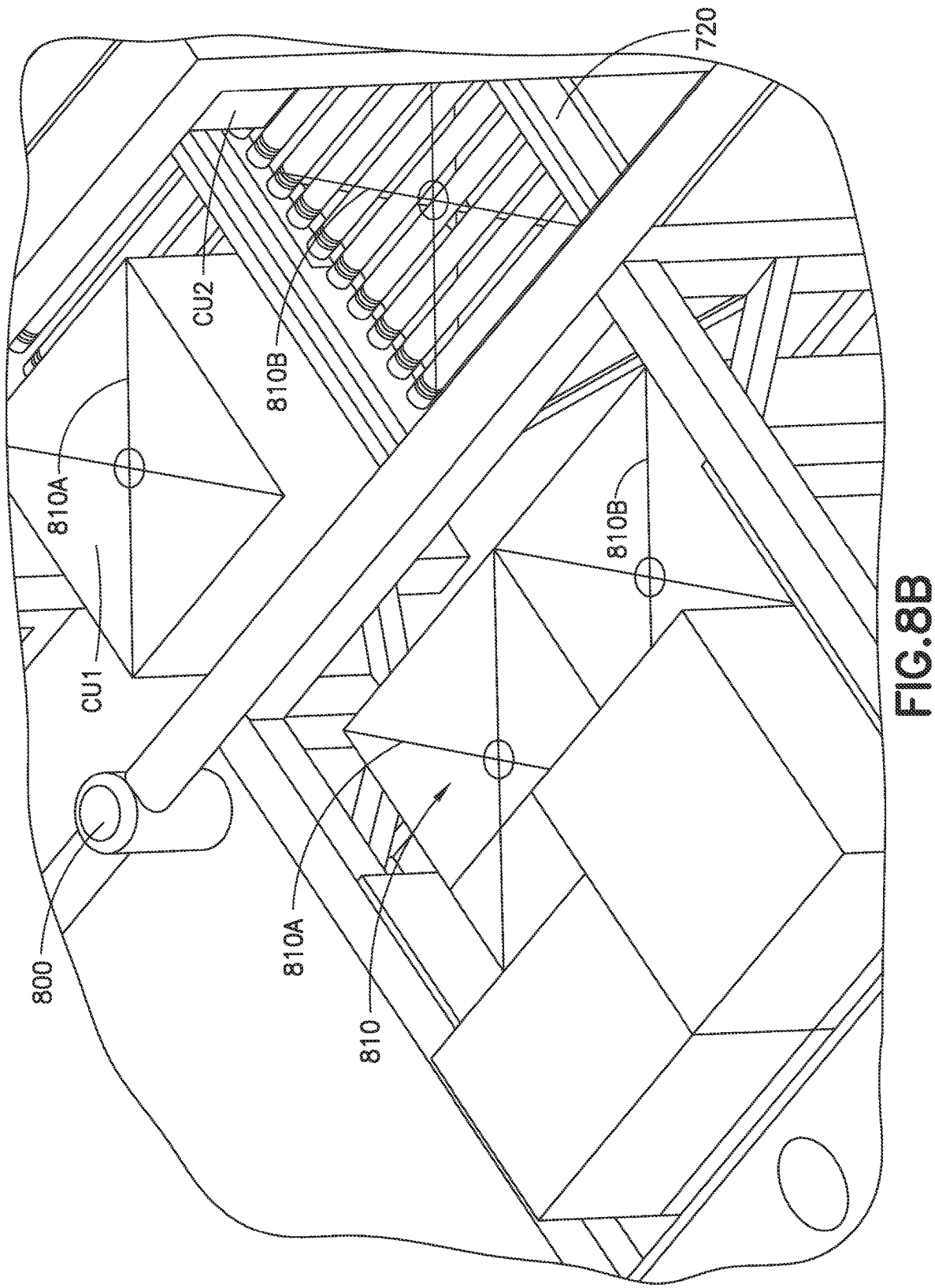

In one aspect, referring also to FIGS. 8A and 8B, such as when the palletizer-depalletizer cell 120 operates as a palletizer the palletizer-depalletizer cell 120 includes a case mapper 800 disposed at the operator platform 700. The case mapper 800 is connected to the controller 199C and is configured to map case unit CU locations at the common pallet layer interface 315, and determine positions of the case units CU being loaded commissioning the pallet layer. For example, the case mapper 800 may receive information from the case inspection station 735, such as through the controller 199C or the controller may provide any suitable command signals to the case mapper 800 so that the case mapper 800 correlates, in any suitable manner, a position of a case unit on the one or more conveyors 720 with a position at which the case unit is to be placed in the pallet layer. For example, in one aspect, the case mapper may project a first predetermined pattern 810 on one or more of the case units disposed on the one or more conveyors 720 and may also project that same first predetermined pattern at the common pallet layer interface 315 in a position in which the one or more case units are to be placed. For example, a first predetermined pattern 810A may be projected on case unit CU1 disposed on the conveyor 720 for placement in the position indicated by the first predetermined pattern 810A projected at the common pallet layer interface 315. Similarly a second predetermined pattern 810B may be projected on case unit CU2 disposed on the conveyor 720 for placement in the position indicated by the second predetermined pattern 810B projected at the common pallet layer interface 315. While the case mapper is described as indicating pick and place positions of the case units using projected patterns, in other aspects, any suitable indicator may be used such as, e.g., colors, display screens 800D, any other visual or aural indicators and/or a combination thereof.

In one aspect, referring to FIGS. 3A, 5, 6, 7A-7D and 8A, the palletizing/depalletizing cell 120 includes one or more bi-directional empty pallet storage lifts 365A, 365B configured to deliver empty pallets to the operator platform 700 or remove empty pallets from the operator platform 700. In one aspect, the one or more empty pallet storage lifts 365A, 365B are connected to frame in any suitable manner, where the one or more bi-directional empty pallet storage lifts 365A, 365B are each communicably connected with the common pallet layer interface 315 by an empty pallet transport conveyor 600. In one aspect, empty pallet storage lifts 365A, 365B and the respective empty pallet conveyor 368 may be substantially similar to the loaded pallet interface 305 (and its loaded pallet conveyor 350) and the pallet transport 310B. For example, each empty pallet lift includes a frame 365F that, in one aspect, is integral with the cell frame 120F, or in other aspects connected to the cell frame 120F in any suitable manner. Each empty pallet storage lift 365A, 365B includes a pallet holder 366 that is movably mounted to the frame 365F for movement in directions 400A, 400B. For example, each empty pallet lift may include any suitable motor and transmissions for moving the pallet holder 366 in directions 400A, 400B along the frame 365F. In one aspect, the frame 365F includes any suitable pallet guide members 367 to guide the pallets when carried by the pallet holder 366 during movement in direction 400A, 400B. Each empty pallet storage lift 365A, 365B may also include an empty pallet conveyor 368 configured queue pallets (which may be in stacks) for transferring the pallets to and from the pallet holder 366. In one aspect, the palletizer-depalletizer cell 120 includes a pallet inspection station 369 (FIG. 5) connected to controller 199C, where the pallet inspection station 369 is configured to identify one or more of damaged pallets, disfigured pallets and pallets that are unsuited for automatic depalletizing or palletizing. There may be a pallet inspection station 369 disposed along each of the empty pallet conveyors 368 where each pallet inspection station includes any suitable sensors, such as a multi-dimensional light curtain, cameras, etc. configured to detect the damaged pallets, disfigured pallets and pallets that are unsuited for automatic depalletizing or palletizing. Upon detection of a defective pallet the pallet inspection station 369 may be configured to provide any suitable aural, visual or other suitable indicator to an operator so that the operator may attend to the defective pallet (such as by removing the defective pallet from the empty pallet storage lifts 365A, 365B.

In one aspect, the empty pallet storage lifts 365A, 365B are configured to index the pallets, one by one, to a transfer level corresponding to a pallet conveyor 600 disposed on the operator platform 700. In one aspect, the pallet conveyor 600 may be any suitable conveyor such as a roller conveyor that is configured to allow an operator to slide empty pallets between the common pallet layer interface 315 and each of the empty pallet storage lifts 365A, 365B without picking up the pallets (see FIG. 7D; e.g., the pallet conveyor 600 is disposed at the predetermined level 300 of the cell frame defining the layer commission-decommission level 300CD and each of the pallet holders 366 indexes each of the pallets for transfer at the layer commission-decommission level 300CD). In one aspect, the pallet conveyor 600 includes a movable portion 600D that is pivotable between a deployed position (illustrated in, e.g., FIG. 7B) and an open position (see FIG. 7A which illustrates the movable portion in a partially open configuration). In one aspect, the movable portion 600D is pivotable relative to another portion of the pallet conveyor 600 between the deployed and open positions to provide operators 710 on the operator platform 700 substantially unrestricted mobility along the operator platform 700 (see FIG. 7C where when in the open position the movable portion 600D allows the operators 710 to transition from one side of the operator platform to another side of the operator platform).

Figure 9:
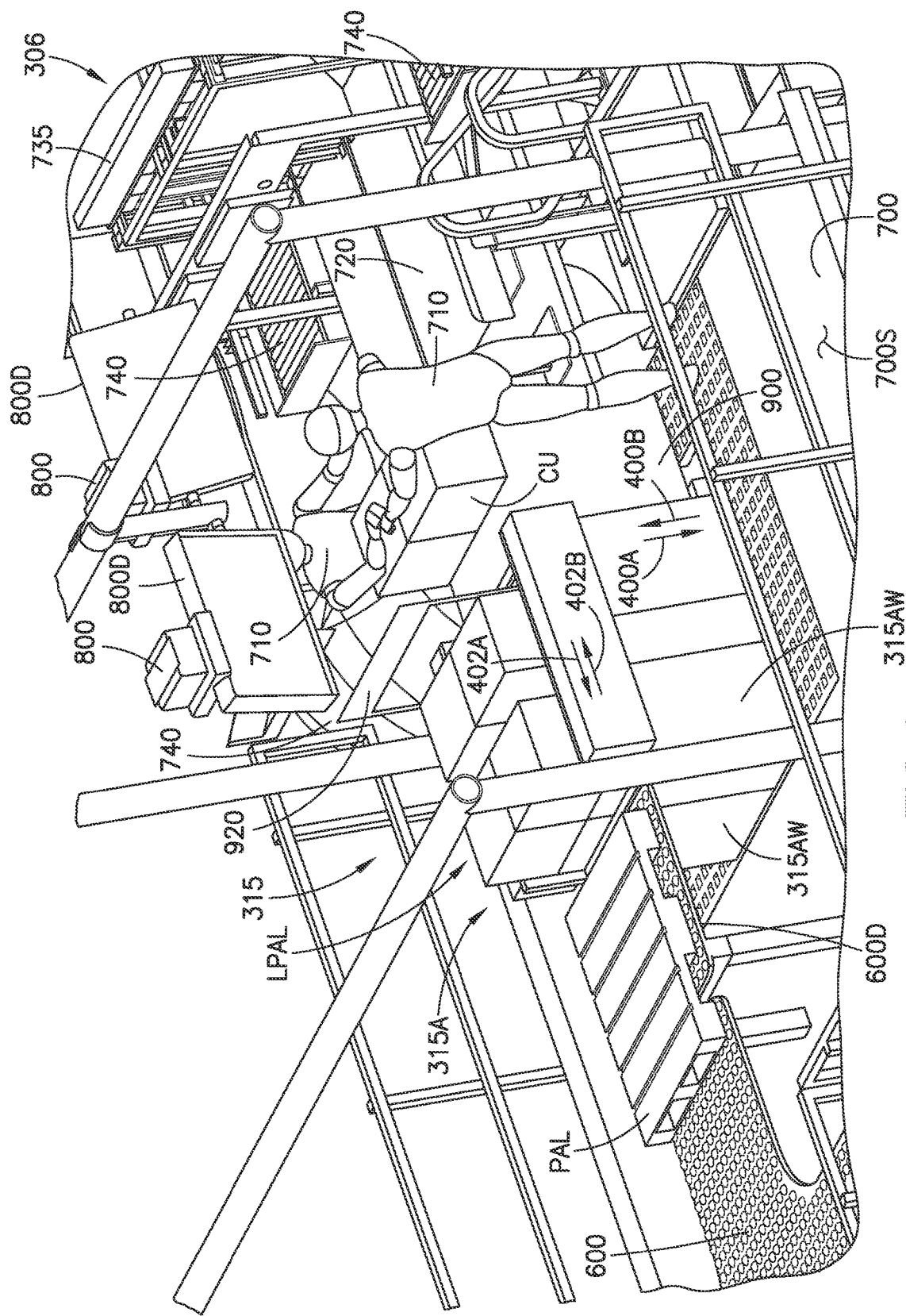
FIG. 9 is a schematic illustration of a portion of the palletizer/depalletizer of FIGS. 3A-3E in accordance with aspects of the disclosed embodiment.

In one aspect, referring to FIG. 9, an operator work station 900 may be disposed between the common pallet layer interface 315 and the one or more conveyors 720 disposed adjacent the common pallet layer interface 315. The work station 900 is configured such that operators 710 may clear faults, monitor the lifts 310A, 310B, 365A, 365B (or other automated components of the palletizer/depalletizer cell 120) and align case units CU in a manner that enable automation to lift and move the case units to and from the pallet PAL on which the case units CU are placed. The operator work station 900 may be disposed at an ergonomic height for operator 710 access which in one aspect is at the predetermined level 300 of the cell frame 120F defining a layer commission-decommission level 300CD.

In one aspect, the common pallet layer interface 315 includes an aperture 315A (see also FIG. 7A) through which the loaded pallet LPAL passes (e.g., the pallet transports 310A, 310B lift or lower the loaded pallet LPAL through the aperture 315A to place the case units at the predetermined level 300 of the cell frame 120F defining the layer commission-decommission level 300CD). In one aspect, a size of the aperture 315A may be variable to fill any gap formed between the loaded pallet LPAL and the operator work station 900. For example, the aperture may include any suitable walls 315AW that may be movable along one or more axes to open or close the aperture (in a manner similar to an iris). In one aspect, movement of the walls 315AW may be automatically controlled by the controller 199C and any suitable sensors measuring a distance between the walls 315AW and the loaded pallet LPAL or controlled manually by the operator 710.

In one aspect, any suitable automated case pusher (s) 920 may be disposed at or adjacent the common pallet layer interface 315 for pulling or pushing one or more case units CU between the loaded pallet LPAL and the operator work station 900 (e.g., to commission or decommission a pallet layer). In one aspect, the automated case pusher (s) 920 may be substantially similar to those described in U.S. Pat. No. 9,475,649, issued on Oct. 25, 2016, the disclosure of which is incorporated herein by reference in its entirety. For example, the case pusher (s) 920 may be connected to the controller 199C which effects movement, in combination with any suitable motors, of the case pusher (s) 920 along one or more axes (e.g., such as along one or both of a first axis defined by directions 400A, 400B and along a second axis defined by directions 402A, 402B) so that the case pusher (s) 920 may be inserted between or behind (or in front of) one or more case units CU for pushing or pulling the case units between the common pallet layer interface 315 includes an aperture 315A and the operator work station 900. Where the palletizer/depalletizer cell 120 operates in an inbound role the case pusher (s) 920 pull or push an single case unit, a row of case units or an entire pallet layer off of the loaded pallet LPAL and moves it toward the operators 710. The operators 710 align the case units CU at the operator work station 900 with substantially no lifting or stretching by the operator 710. Where the palletizer/depalletizer cell 120 operates in an outbound role, the operators 710 align one or more case units on the operator workstation 900 adjacent the case pusher (s) 920 where the case pusher (s) 920 transfers the case unit (s) from the operator work station 900 to predetermined location(s) on the loaded pallet LPAL (e.g., case units are transferred either case by case, one row of cases at a time, or as entire pallet layer). In one aspect, the case pusher (s) 920 may also be configured to push or pull empty pallets from the common pallet layer interface 315 onto the conveyor 600 for transfer to the respective empty pallet storage lifts 365A, 365B; while in other aspects, the case pusher (s) 920 may be configured to push or pull empty pallets to the common pallet layer interface 315 from the conveyor 600. In one aspect, the case pusher (s) 920 may be operated automatically (e.g., such as when any suitable case sensors, such as the case mapper 800, sense cases removed from the workstation, in an inbound role, or sense cases placed on the workstation, in an outbound role) and/or on demand under command of the operator 710 such as by voice command or other control selector that is ergonomically placed at the operator work station 900. In one aspect, any suitable assisted lifting device may be provided to move the case units between the pallet layer and the conveyors. For example, any suitable gantry device or arm device may be used to grip and assist the operator with lifting and transporting (e.g., by bearing some or all of the weight of the case unit being transferred) the case units. In one aspect, the common pallet layer interface 315 may be configured as described herein so that the transaction rate of case unit transfer between the conveyors and the pallet layer provides for building (i.e., commissioning) or deconstruction (i.e., decommissioning) of, for example, a 100 case pallet load in about 3 minutes; while in other aspects a 100 case pallet load may be commissioned or decommissioned in about 6 minutes; while in still other aspects a 100 case pallet load may be commissioned or decommissioned in more than 6 minutes or less than about 3 minutes.

In one aspect, any suitable interference sensors may be placed adjacent the case pusher (s) 920 to detect a positon of the operators 710 during movement of the case pusher (s) 920. For example, the sensors may include one or more of any suitable pressure pads disposed on or within the surface 700S of the operator platform 700, light curtains may be disposed adjacent the case pusher (s) 920, and/or cameras (which may be integrated with the case mapper 800) may be disposed to monitor operator movement relative to the case pusher (s) 920. In one aspect, such as where cameras are used, the controller 199C may be configured to detect or otherwise identify a position of the operator's 710 hands or other non-case shaped object within a path of movement of the case pusher (s) 920.

Figure 10A:
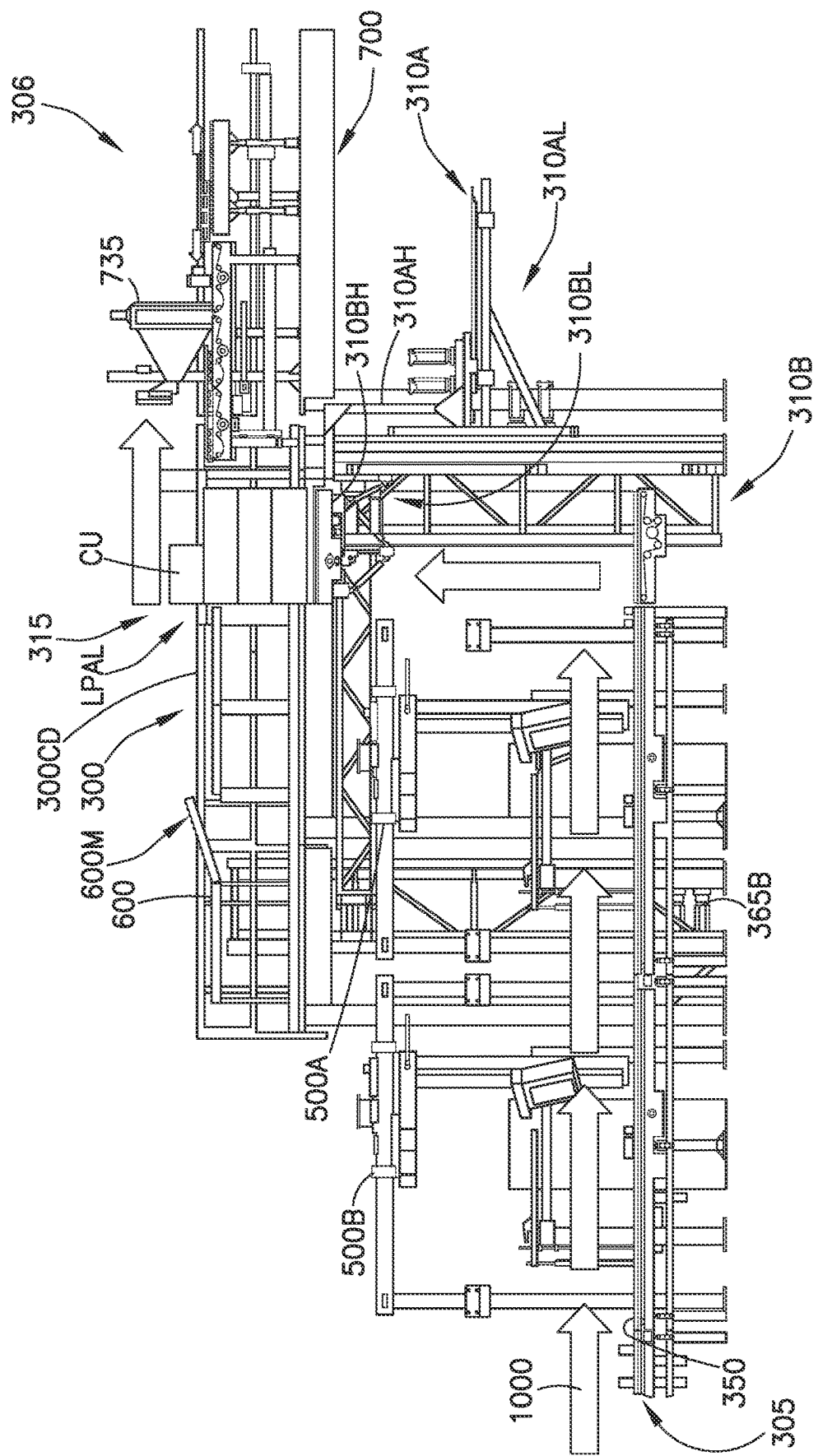
FIGS. 10A-10B are schematic illustrations of portions of the palletizer/depalletizer of FIGS. 3A-3E in accordance with aspects of the disclosed embodiment.
Figure 10B:
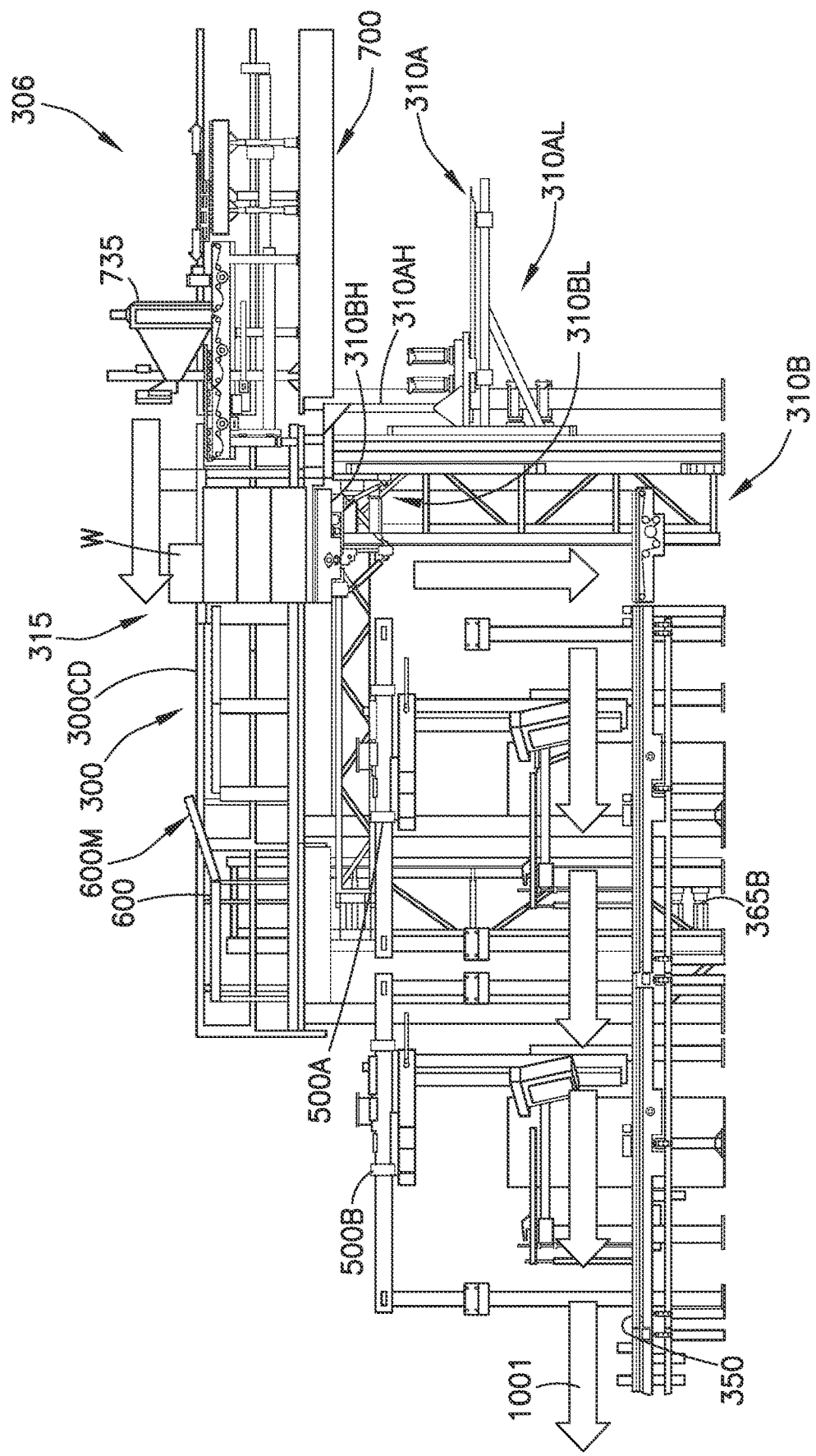
Figure 11:
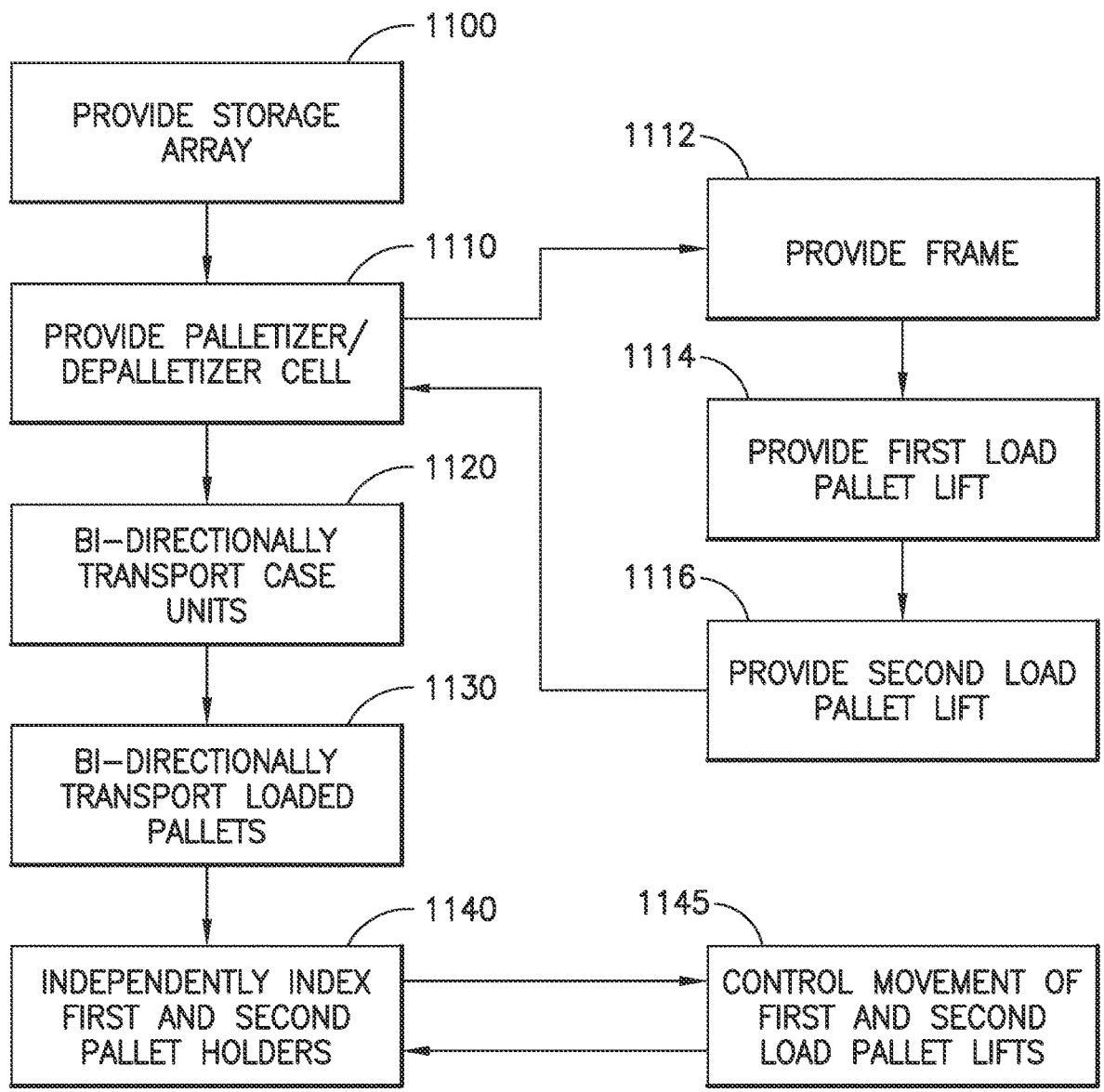
FIG. 11 is a flow diagram in accordance with aspects of the disclosed embodiment.

Referring now to FIGS. 10A and 10B as well as FIGS. 3A-3E and 4A-4C an exemplary operation of the palletizer/depalletizer cell 120 will be described. In one aspect, the storage structure array 130 of storage locations 130SL for case units is provided (FIG. 11, Block 1100), each storage location 130SL of which is arranged for storage of at least one case unit at each storage location. The bi-directional palletizer/depalletizer cell 120 is also provided (FIG. 11, Block 1110) where the palletizer/depalletizer cell 120 is connected to and disposed between the in-out case conveyor 150C and the in-out loaded pallet conveyor 175C, 180C. In one aspect, the frame 120F of the palletizer/depalletizer cell 120 is provided (FIG. 11, Block 1112) so as to form the common pallet layer interface 315. In one aspect, the first and second pallet transports 310A, 310B (also referred to as the first load pallet lift and the second load pallet lift) are provided (FIG. 10, Blocks 1114 and 1116) so as to be movably mounted to the frame 120F as described herein.

In one aspect, referring to FIG. 10A, with the palletizer/depalletizer cell 120 in an inbound role, inbound case units disposed on loaded pallets are transferred from the conveyor 175C and placed on the conveyor 350 for transport to the pallet holder 310BH of the second pallet transport 310B. Referring to FIG. 10B, with the palletizer/depalletizer in an outbound role, loaded pallets are transferred to the conveyor 350 from the pallet holder 310BH of the second pallet transport 310B and wrapped by the wrapper station (s) 500A, 500B as the loaded pallets are transported to the loaded pallet interface 305 for transfer to the conveyor 180C. As described above, the loaded pallets LPAL are bi-directionally transported (FIG. 11, Block 1130) (the direction depending on an inbound or outbound role of the palletizer/depalletizer cell 120) with the conveyor 350 in an input direction 1000 towards the storage structure array 130, and in a different output direction 1001 away from the storage structure array 130. In one aspect, the case units are also bi-directionally transported (FIG. 11, Block 1120) (the direction depending on an inbound or outbound role of the palletizer/depalletizer cell 120) with the in-out case conveyor 150C to and from the storage structure array 130 effecting infeed of the case units in direction 1000 into the storage structure array 130 and output of case units in direction 1001 from the storage structure array 130.

In one aspect, to transport the loaded pallet LPAL between the common pallet layer interface 315 and the conveyor 350, the pallet transports 310A, 310B independently index the first pallet holder 310AH and the second pallet holder 310BH (FIG. 11, Block 1140) the different pallet holders 310AH, 310BH, each independently holding the pallet layer loading at the common pallet layer interface 315 so that the pallet layer loading is held by the first pallet holder 310AH and the second pallet holder 310AH independent of each other. For example, each of the first pallet holder 310AH and the second pallet holder 310BH independently hold the other pallet layer unloading at the common pallet layer interface 315 so that the pallet layer unloading is held by the first pallet holder 310AH and the second pallet holder 310BH independent of each other, and the first and the second different pallet holders 310AH, 310BH are indexed in a common direction (e.g., directions 400A, 400B) relative to the cell frame 120F so that the respective layer commission-decommission level is substantially constant, for both the pallet layer loading and the pallet layer unloading.

In one aspect, the controller 199C is communicatively coupled to the first and second pallet transports 310A, 310B and is configured to control movement thereof (FIG. 11, Block 1145) so that the first and second pallet holders 310AH, 310BH are indexed in the common direction (either direction 400A for inbound case units or direction 400B for outbound case units) with the respective layer commission-decommission level 300CD substantially constant so that layer commissioning and decommissioning are respectively substantially continuous. As described above, each of the 310A, 310B include a first lift 310AL defining the first pallet holder 310AH, and a second lift 310BL defining the second pallet holder 310BH, where each of the first and second lifts are configured to bi-directionally index the first and second pallet holders 310AH, 310BH in directions 400A, 400B independent of each other. In one aspect, the first lift 310AL is configured so as to index the pallet layer loading (e.g., a level of the loaded pallet LPAL being commissioned) maintaining the respective layer commissioning-decommissioning level 300CD substantially constant at the predetermined level 300 of the cell frame 120F for each successive layer PL1, PL2, PL3 loaded onto the pallet layer loading. Similarly, the first lift 310AL is configured so as to index the pallet layer unloading (e.g., a level of the loaded pallet LPAL being decommissioned) maintaining the layer commissioning-decommissioning level 300CD substantially constant at the predetermined level 300 of the cell frame 120F for each successive layer PL1, PL2, PL3 unloaded from the pallet layer unloading. In one aspect, the controller 199C is communicably connected to the in-out case conveyor 150C so that the in-out case conveyor 150C bi-directionally transports the case units CU to and from the storage structure array 130 at a predetermined case feed rate (which in one aspect, is about 1800 case transactions an hour and in other aspects the case feed rate may be more or less than 1800 case transactions an hour), and is communicably connected to the palletizer-depalletizer cell 120 so that the layer commissioning and decommissioning, which are respectively substantially continuous, matches the predetermined case feed rate (of about 1800 transaction per hour, in one aspect). In one aspect, the controller 130 is communicably connected to the in-out case conveyor 150C so that the in-out case conveyor 150C transports case units to output cases from the storage structure array 130 at a predetermined case output rate respectively, and is communicably connected to the palletizer-depalletizer cell 120 so that the layer commissioning and decommissioning, which are respectively substantially continuous, matches the predetermined case output rate.

In one aspect, as described above, the first lift 310AL (and its pallet holder 310AH) is located above the second lift 310BL (and its pallet holder 310BH) and at least one of the first lift 310AL and the second lift 310BL is indexed with respect to the other of the of the first lift 310AL and the second lift 310BL effecting pallet transfer therebetween (e.g., at least one of the first and second pallet holders 310AH, 310BH is indexed with respect to the other of the of the first and second pallet holder 310AH, 310BH effecting pallet transfer therebetween). As described herein, the pallet transports 310A, 310B are configured so as to bi-directionally index the first and second pallet holders 310AH, 310BH independent of each other. For example, the first and second pallet holders 310AH, 310BH are arranged so that the pallet layer loading, held by each of the first and second pallet holders 310AH, 310BH at the common pallet layer interface 315 with the layer commissioning-decommissioning level 300CD substantially constant, is transferred between the first pallet holder 310AH to the second pallet holder 310BH. In one aspect, both of the first and second pallet holders 310AH, 310BH are indexed in opposite directions (e.g., directions 400A, 400B) with respect to the cell frame 120F effecting pallet transfer. In one aspect, the pallet layer loading transfer between the first pallet holder 310AH to the second pallet holder 310BH is effected with the pallet layer loading held static at the respective commission-decommission level 300CD. In one aspect, the first and second pallet holders 310AH, 310BH are arranged so that the pallet layer unloading, held by each of the first and second pallet holders 310AH, 310BH at the common pallet layer interface 315 with the layer commissioning decommissioning level 300CD substantially constant, is transferred between the first pallet holder 310AH to the second pallet holder 310BH.

In one aspect, the controller 199C includes operator 710 command input (such as through any suitable control device including foot pedals, switches, etc.) providing semi-automatic control of at least one of a respective pallet transport 310A, 310B of the first and second pallet holders 310AH, 310BH indexing the pallet layer loading so as to maintain the layer commissioning-decommissioning level 300CD constant at the predetermined level 300. In one aspect, the actuation of the foot pedals, switches, etc. (e.g., the operator command input) provides indexing of the pallet layer loading (or unloading) by any suitable amount, such as in one aspect about 6 inches to about 12 inches; while in other aspects the indexing amount may be more than about 12 inches or less than about 6 inches; while in still other aspect, the indexing amount may be variably set or commanded by the operator 710. In one aspect, the controller is configured so that automatic transfer of the pallet loading from one pallet holder 310AH to the other pallet holder 310BH is effected substantially coincident with semi-automatically controlled indexing of the respective pallet loading and pallet unloading. In one aspect, the controller 199C is configured so that another of the second pallet transports 310A, 310B is automatically positioned so that indexing of the at least one of the first and second pallet transports 310A, 310B under semi-automatic index control automatically effects transfer of the respective pallet loading and pallet unloading between the first and second pallet transports 310A, 310B.

For example, when the palletizer/depalletizer cell 120 is in an output role, the controller 199C is configured so as to automatically index the respective pallet transport 310A, 310B of at least another of the first and second pallet holders 310AH, 310BH effecting transfer of the pallet layer loading from the first pallet holder 310AH to the second pallet holder 310BH. In one aspect, the controller 199C is configured to effect automatic transfer of the pallet layer loading from the first pallet holder 310AH to the second pallet holder 310BH in response to the operator command input initiating semi-automatic indexing of the at least one of the respective pallet transport 310A, 310B of the first and second pallet holders 310AH, 310BH; while in other aspects, the controller 199C is configured to effect automatic transfer of the pallet layer loading from the first pallet holder 310AH to the second pallet holder 310BH independent of the operator command input initiating semi-automatic indexing of the at least one of the respective pallet transport 310A, 310B of the first pallet holder and the second pallet holder 310AH, 310BH.

When the palletizer/depalletizer cell 120 is in an input role, the controller 199C is configured so that the operator command input provides the semi-automatic control of the at least one of the respective pallet transport 310A, 310B of the first and second pallet holders 310AH, 310BH indexing the pallet layer unloading so as to maintain the layer commissioning-decommissioning level 300CD constant at the predetermined level 300. In one aspect, the controller 199C is configured so as to automatically index the respective pallet transport of at least the other of the first and second pallet holders 310AH, 310BH effecting transfer of the pallet layer unloading from the second pallet holder 310BH to the first pallet holder 310AH. In one aspect, the controller 199C is configured to effect automatic transfer of the pallet layer unloading from the second pallet holder 310BH to the first pallet holder 310AH in response to the operator command input initiating semi-automatic indexing of the at least one of the respective pallet transport of the first pallet holder and the second pallet holder.

In one aspect, the transfer of the pallet may be made between the first pallet holder 310AH and the second pallet holder 310BH when the pallet is at any suitable predetermined distance D (see FIG. 3E) from the predetermined level 300. For example, in one aspect the predetermined distance D may be about 42 inches while in other aspects the predetermined distance D may be more or less than about 42 inches. In one aspect, on depalletization, the second pallet transport 310B indexes up semi-automatically, and as a pallet corresponding to the pallet unloading approaches a predetermined pallet transfer height D, the controller pre-positions the first load pallet lift along one or more axes of motion relative to the pallet. In one aspect, the controller 199C moves the first pallet transport 310A in a direction transverse to an indexing direction (e.g., a direction defined by directions 402A, 402B), in which the first and second pallet transports 310A, 310B are indexed to effect transfer of the respective pallet loading and pallet unloading between the first and second load pallet lifts, to preposition the first pallet transport 310A under the pallet unloading so that in response to a next semi-automatic index command the first pallet transport 310A is indexed in the indexing direction (e.g., defined by directions 400A, 400B) to automatically pick the pallet, off of the second pallet transport 310B, and continues indexing in the indexing direction to maintain the layer commission-decommission level 300CD constant at the predetermined level 300, all in a common motion. In one aspect, the controller 199C holds movement of the first pallet transport 310A in the direction transverse (e.g., directions 402A, 402B) to an indexing direction (e.g., directions 400A, 400B), in which the first and second load pallet are indexed to effect transfer of the respective pallet loading and pallet unloading between the first and second pallet transports 310A, 310B, until a next semi-automatic index command so that movement of the first pallet transport 310A in the direction transverse to the indexing direction is effected automatically in response to the next semi-automatic index command with serial indexing of the first pallet transport 310A in the indexing direction that automatically picks the pallet, off of the second pallet transport 310B, and continues indexing in the indexing direction to maintain the layer commission-decommission level constant at the predetermined level, all in a common motion.

In one aspect, on palletization, the first pallet transport 310A indexes down semi-automatically in the indexing direction, and as a pallet corresponding to the pallet loading approaches the predetermined pallet transfer height D, the controller 199C pre-positions the second pallet transport 310B by moving the second pallet transport 310B towards the first pallet transport 310A so that the pallet contacts and is substantially supported by the second pallet transport 310B. In one aspect, in response to a next semi-automatic indexing command, the controller 199C moves the first pallet transport 310A in the direction transverse (e.g., directions 402A, 402B) to the indexing direction (e.g., directions 400A, 400B), in which the first and second pallet transports 310A, 310B are indexed to effect transfer of the respective pallet loading and pallet unloading between the first and second pallet transports 310A, 310B, so that the first pallet transport is removed from under the pallet loading to automatically pick the pallet, off of the first pallet transport 310A, and continues indexing the second pallet transport 310B in the indexing direction to maintain the layer commission-decommission level 300CD constant at the predetermined level 300, all in a common motion. In one aspect, the controller 199C holds movement of the first pallet transport 310A in the direction transverse to the indexing direction, in which the first and second pallet transports 310A, 310B are indexed to effect transfer of the respective pallet loading and pallet unloading between the first and second pallet transports 310A, 310B, until a next semi-automatic index command so that movement of the first pallet transport 310A in the indexing direction is effected automatically in response to the next semi-automatic index command with serial movement of the first pallet transport 310A in the direction transverse to the indexing direction to remove the first pallet transport 310A from underneath the pallet loading. In one aspect, on palletization, the first and second pallet transport 310A, 310B may index the pallet held thereby to maintain the layer commission-decommission level 300CD constant at the predetermined level 300 by any suitable increment, which in one aspect, may be determined from a case height as sensed by one or more case sensors, or in other aspects with operator command input through any suitable operator controls as described herein.

Figure 12:
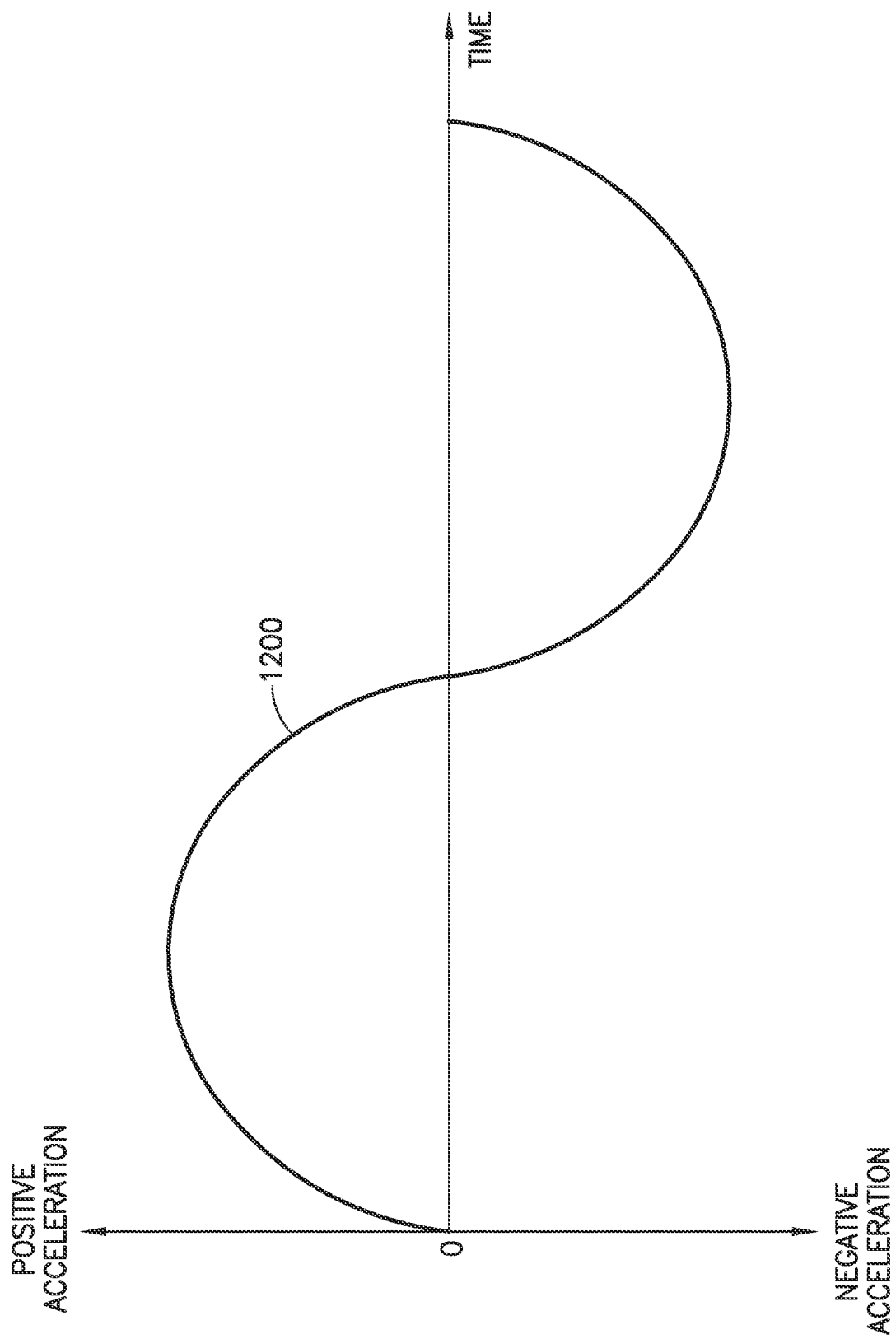
FIG. 12 is a schematic illustration of a motion trajectory in accordance with aspects of the disclosed embodiment.
Figure 13:
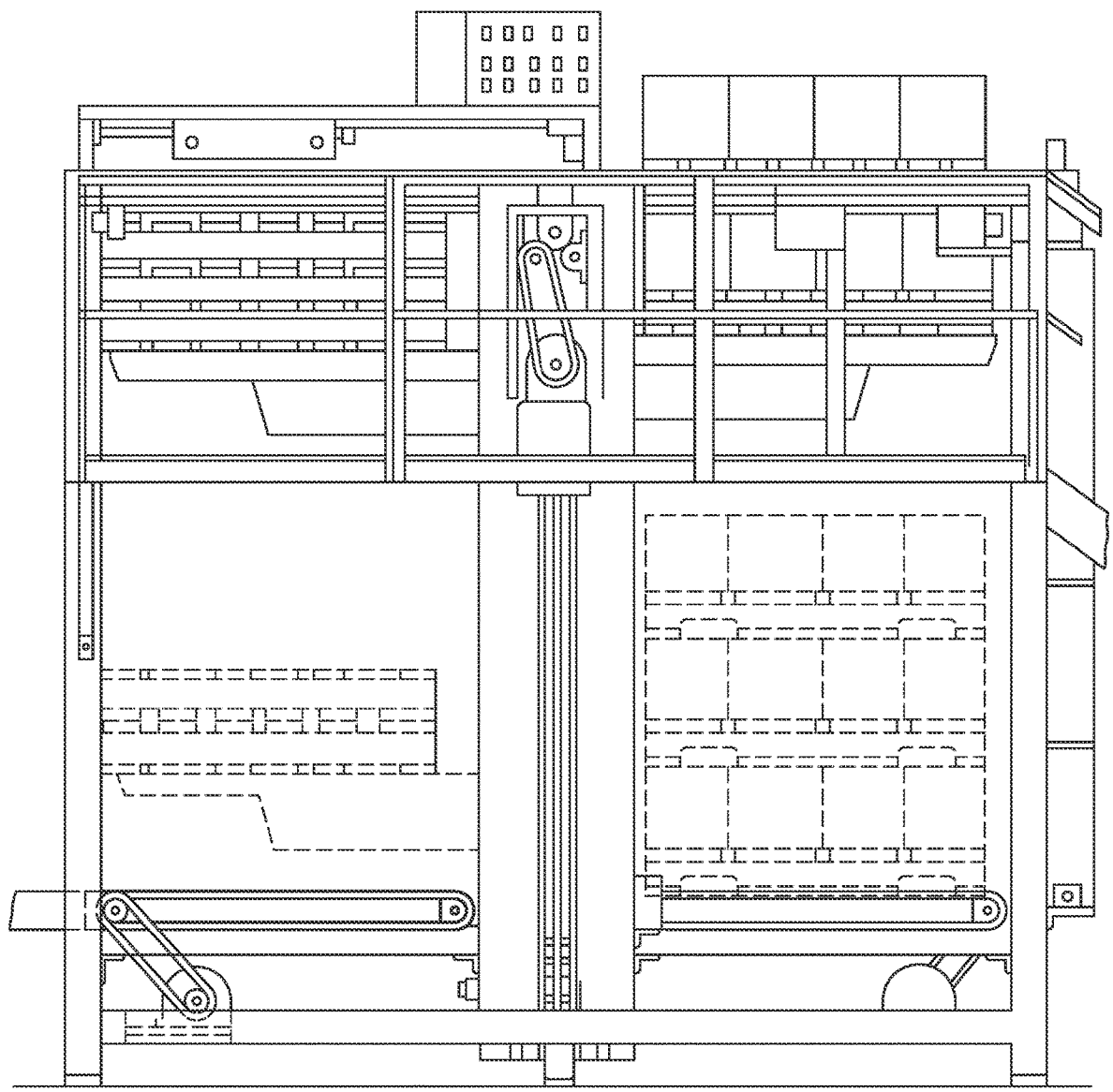
FIG. 13 is a schematic illustration of a conventional depalletizer.
Figure 14:
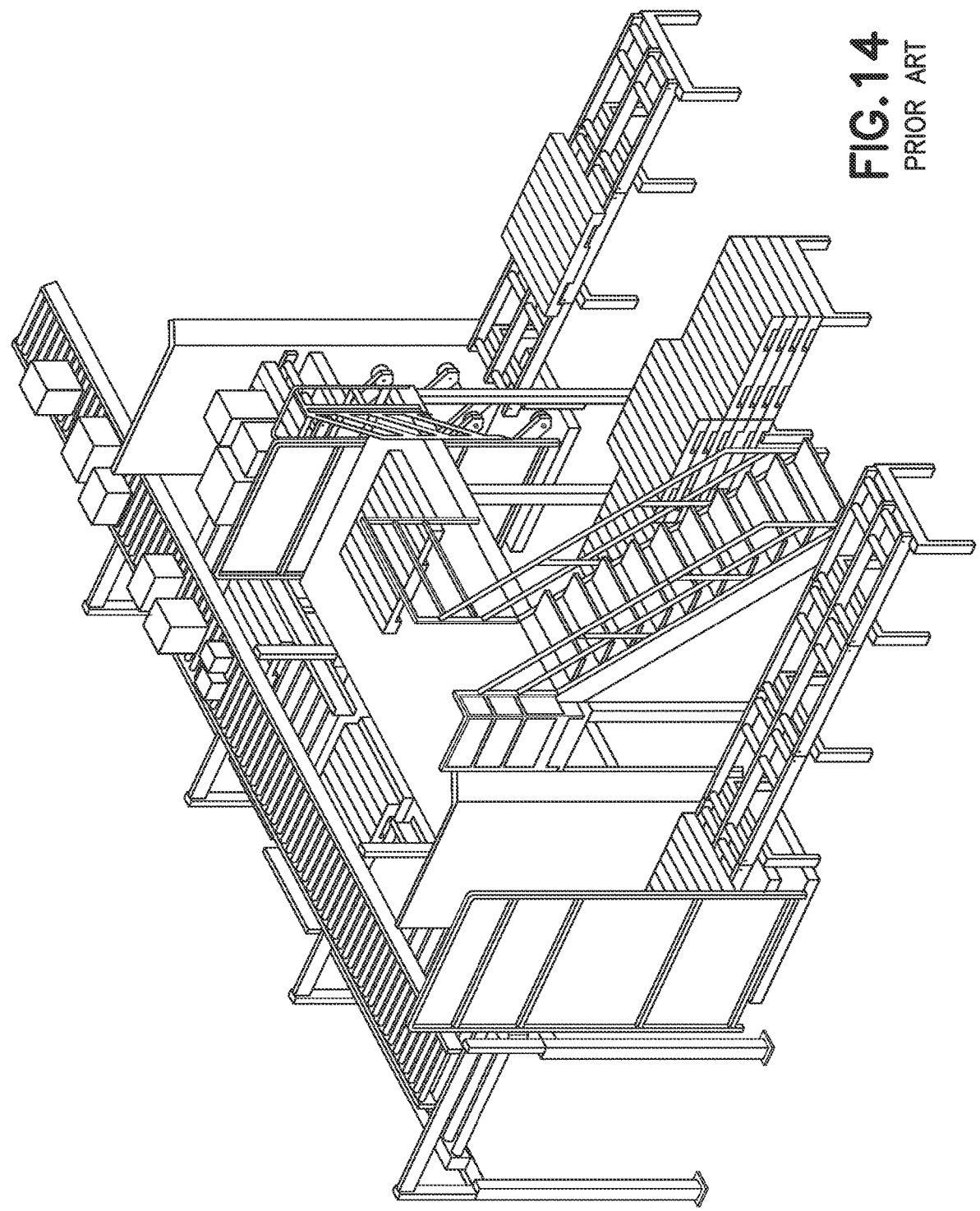
FIG. 14 is a schematic illustration of a conventional depalletizer.
Figure 15:
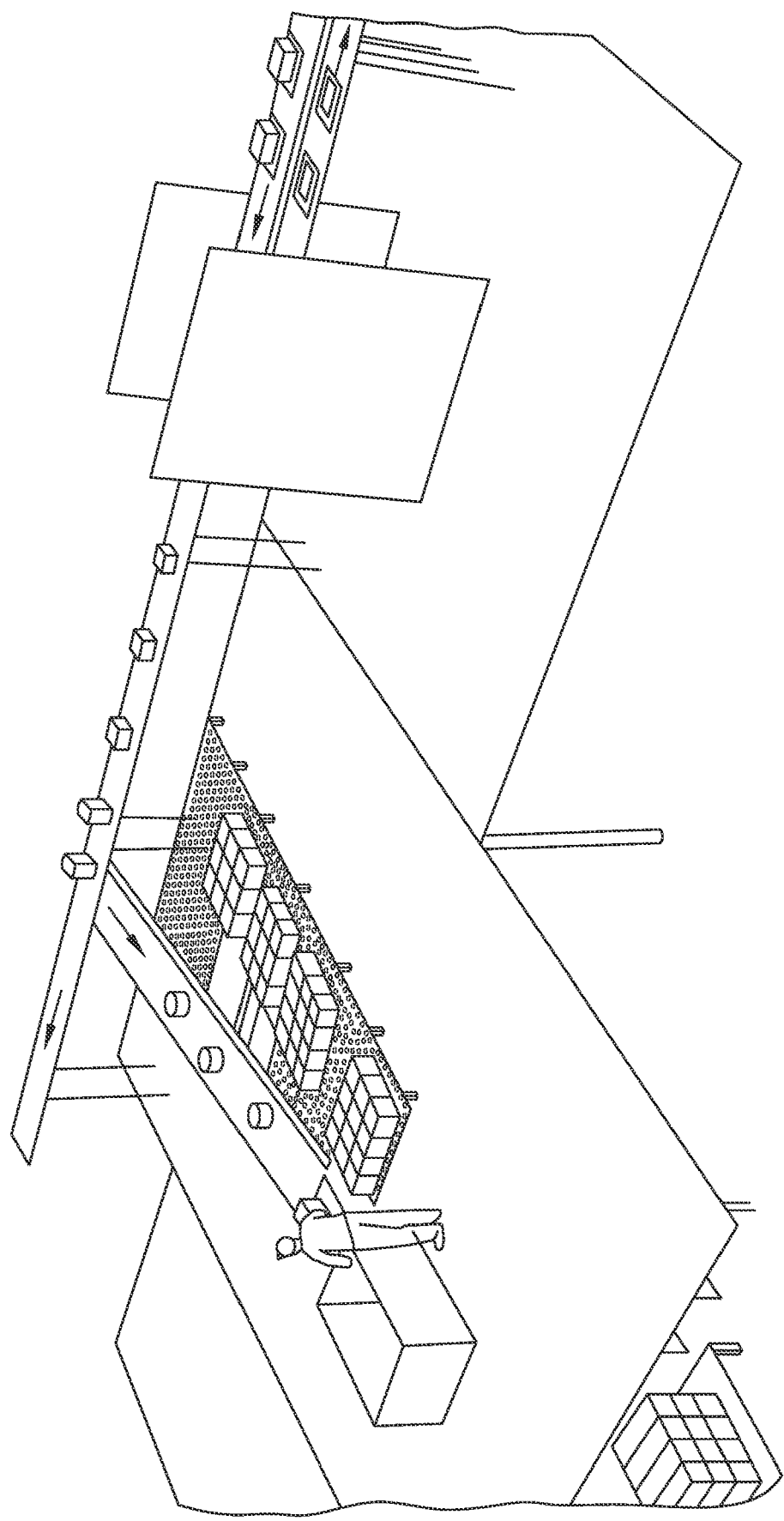
FIG. 15 is a schematic illustration of a conventional palletizer.

Referring also to FIG. 12, in one aspect, the controller 199C is configured to generate a time optimal trajectory motion of the pallet transports 310A, 310B for each index motion of the first and second pallet holders 310AH, 310BH holding the pallet layer loading and the pallet layer unloading respectively. In one aspect, the time optimal trajectory motion being defined by an acceleration profile described by a substantially sinusoidal curve 1200 with initial and terminal acceleration values of substantially zero. As an example, in one aspect, for inbound case units, with the pallet load in the pallet transfer zone (e.g., defined by the distance D described above) the forks T1, T2 of the first pallet transport 310A are inserted into the pallet (as described about) where the insertion takes about 1 second (in other aspects, may be more or less than 1 second) and the pallet is lifted from the second pallet transport 310B. The second pallet transport 310B returns the pallet holder 310BH to a level of the conveyor 350 for receipt of a next pallet load. Indexing of the pallet by the first pallet transport 310A after pallet transfer and indexing of the pallet by the second pallet transport 310B before pallet transfer may have the sinusoidal motion profile where the acceleration is zero at $t_1=0$ and at $t_2=$about 0.75 seconds (for an indexed move of about 6 to about 12 inches under operator commanded movement); while in other aspects the time interval between $t_1$ and $t_2$ may be any suitable time interval and the distance of travel of the holders 310AH, 310BH and the pallet held thereby may be any suitable distance as long as the acceleration is a sinusoidal profile (or similar thereto) having a zero acceleration at the beginning and the move and the end of the move. As described above, the pallet layers are indexed for decommissioning the layers at a transaction rate of about 1800 transactions per hour where each 100 case pallet is decommissioned in about 3 minutes as described above. Commissioning of the pallets occurs in substantially the reverse manner.

In accordance with one or more aspects of the disclosed embodiment an automated storage and retrieval system comprises:

a storage array of storage locations for case units, each storage location of which is arranged for storage of at least one case unit at each storage location;

an in-out case conveyor, in communication with the storage array, configured so as to bi-directionally transport the case units to and from the storage array effecting infeed of the case units into the storage array and output of case units from the storage array;

an in-out loaded pallet conveyor, connected to the storage array, and configured so as to bi-directionally transport loaded pallets in an input direction towards the storage array, and in a different output direction away from the storage array; and a palletizer-depalletizer cell connected to and disposed between the in-out case conveyor and the in-out loaded pallet conveyor, the palletizer-depalletizer cell having a cell frame and a bi-directional pallet transport system with more than one independently driven pallet transports each with a different pallet holder independently movable relative to the cell frame;

wherein the cell frame defines a common pallet layer interface arranged so that placement of case units commissioning a pallet layer loading a pallet, and removal of case units decommissioning a pallet layer unloading another pallet are both effected at the common pallet layer interface at a predetermined level of the cell frame defining a layer commission-decommission level respectively of the pallet layer loading and of the other pallet layer unloading, and wherein the pallet transports independently index a first pallet holder and a second pallet holder of the different pallet holders, each independently holding the pallet layer loading at the common pallet layer interface so that the pallet layer loading is held by the first pallet holder and the second pallet holder independent of each other, wherein each of the first and second different pallet holders independently hold the other pallet layer unloading at the common pallet layer interface so that the pallet layer unloading is held by the first pallet holder and the second pallet holder independent of each other, and the first and the second different pallet holders are indexed in a common direction relative to the cell frame so that the respective layer commission-decommission level is substantially constant, for both the pallet layer loading and the pallet layer unloading.

In accordance with one or more aspects of the disclosed embodiment the automated storage and retrieval system further comprises a controller communicatively coupled to the more than one independently driven pallet transports and configured to control movement thereof so that the first and second pallet holders are indexed in the common direction with the respective layer commission-decommission level substantially constant so that layer commissioning and decommissioning are respectively substantially continuous.

In accordance with one or more aspects of the disclosed embodiment the more than one independently driven pallet transports include a first lift defining the first pallet holder, and a second lift defining the second pallet holder, each of the first and second lifts being configured to bi-directionally index the first and second pallet holders independent of each other.

In accordance with one or more aspects of the disclosed embodiment the first lift is configured so as to index the pallet layer loading maintaining the respective layer commissioning-decommissioning level substantially constant at the predetermined level of the cell frame for each successive layer loaded onto the pallet layer loading.

In accordance with one or more aspects of the disclosed embodiment the first lift is configured so as to index the pallet layer unloading maintaining the layer commissioning-decommissioning level substantially constant at the predetermined level of the cell frame for each successive layer unloaded from the pallet layer unloading.

In accordance with one or more aspects of the disclosed embodiment the first lift is located above the second lift and at least one of the first lift and the second lift is indexed with respect to the other of the of the first lift and the second lift effecting pallet transfer therebetween.

In accordance with one or more aspects of the disclosed embodiment the controller includes operator command input providing semi-automatic control of at least one of a respective pallet transport, of the more than one independently driven pallet transports, of the first and second pallet holders indexing the pallet layer loading so as to maintain the layer commissioning-decommissioning level constant at the predetermined level, and wherein the controller is configured so as to automatically index the respective pallet transport of at least another of the first and second pallet holders effecting transfer of the pallet layer loading from the first pallet holder to the second pallet holder.

In accordance with one or more aspects of the disclosed embodiment the controller is configured to effect automatic transfer of the pallet layer loading from the first pallet holder to the second pallet holder in response to the operator command input initiating semi-automatic indexing of the at least one of the respective pallet transport of the first and second pallet holders.

In accordance with one or more aspects of the disclosed embodiment the controller is configured to effect automatic transfer of the pallet layer loading from the first pallet holder to the second pallet holder independent of the operator command input initiating semi-automatic indexing of the at least one of the respective pallet transport of the first pallet holder and the second pallet holder.

In accordance with one or more aspects of the disclosed embodiment the controller is configured so that the operator command input provides the semi-automatic control of the at least one of the respective pallet transport of the first and second pallet holders indexing the pallet layer unloading so as to maintain the layer commissioning-decommissioning level constant at the predetermined level, and wherein the controller is configured so as to automatically index the respective pallet transport of at least the other of the first and second pallet holders effecting transfer of the pallet layer unloading from the second pallet holder to the first pallet holder.

In accordance with one or more aspects of the disclosed embodiment the controller is configured to effect automatic transfer of the pallet layer unloading from the second pallet holder to the first pallet holder in response to the operator command input initiating semi-automatic indexing of the at least one of the respective pallet transport of the first pallet holder and the second pallet holder.

In accordance with one or more aspects of the disclosed embodiment the controller is configured to generate a time optimal trajectory motion of the more than one independently driven pallet transports for each index motion of the first and second pallet holders holding the pallet layer loading and the pallet layer unloading respectively, the time optimal trajectory motion being defined by an acceleration profile described by a substantially sinusoidal curve with initial and terminal acceleration values of substantially zero.

In accordance with one or more aspects of the disclosed embodiment the automated storage and retrieval system further comprises a controller communicably connected to the in-out case conveyor so that the in-out case conveyor bi-directionally transports the case units to and from the storage array at a predetermined case feed rate, and communicably connected to the palletizer-depalletizer cell so that the layer commissioning and decommissioning, which are respectively substantially continuous, matches the predetermined case feed rate.

In accordance with one or more aspects of the disclosed embodiment the automated storage and retrieval system further comprises a controller communicably connected to the in-out case conveyor so that the in-out case conveyor transports case units to output cases from the storage array at a predetermined case output rate respectively, and communicably connected to the palletizer-depalletizer cell so that the layer commissioning and decommissioning, which are respectively substantially continuous, matches the predetermined case output rate.

In accordance with one or more aspects of the disclosed embodiment the cell frame defines a loaded pallet transfer interface and a case transfer interface, the loaded pallet transfer interface being communicably connected to the in-out loaded pallet conveyor and the case transfer interface being communicably connected to the in-out case conveyor.

In accordance with one or more aspects of the disclosed embodiment the in-out case conveyor bi-directionally transports the case units to and from the case transfer interface dependent on a predetermined case transfer rate between the case transfer interface and the in-out case conveyor, and the layer commissioning and decommissioning, which are respectively substantially continuous, determine the predetermined case transfer rate.

In accordance with one or more aspects of the disclosed embodiment the in-out loaded pallet conveyor bi-directionally transport loaded pallets to and from the loaded pallet transfer interface dependent on a predetermined loaded pallet transfer rate between the loaded pallet transfer interface and the in-out loaded pallet conveyor, and the layer commissioning and decommissioning, which are respectively substantially continuous, determine the predetermined loaded pallet transfer rate.

In accordance with one or more aspects of the disclosed embodiment the more than one independently driven pallet transports are configured so as to bi-directionally index the first and second pallet holders independent of each other.

In accordance with one or more aspects of the disclosed embodiment the first and second pallet holders are arranged so that the pallet layer loading, held by each of the first and second pallet holders at the common pallet layer interface with the layer commissioning-decommissioning level substantially constant, is transferred between the first pallet holder to the second pallet holder.

In accordance with more aspects of the disclosed embodiment at least one of the first and second pallet holders is indexed with respect to the other of the of the first and second pallet holder effecting pallet transfer therebetween.

In accordance with one or more aspects of the disclosed embodiment both of the first and second pallet holders are indexed in opposite directions with respect to the cell frame effecting pallet transfer.

In accordance with one or more aspects of the disclosed embodiment the pallet layer loading transfer between the first pallet holder to the second pallet holder is effected with the pallet layer loading held static at the respective commission-decommission level.

In accordance with one or more aspects of the disclosed embodiment the first and second pallet holders are arranged so that the pallet layer unloading, held by each of the first and second pallet holders at the common pallet layer interface with the layer commissioning-decommissioning level substantially constant, is transferred between the first pallet holder to the second pallet holder.

In accordance with one or more aspects of the disclosed embodiment at least one of the first and second pallet holders is indexed with respect to the other of the of the first and second pallet holder effecting pallet transfer therebetween.

In accordance with one or more aspects of the disclosed embodiment the pallet layer unloading transfer between the first pallet holder to the second pallet holder is effected with the pallet layer unloading held static at the respective commission-decommission level.

In accordance with one or more aspects of the disclosed embodiment both of the first and second pallet holders are indexed in opposite directions with respect to the cell frame effecting pallet transfer.

In accordance with one or more aspects of the disclosed embodiment the palletizer-depalletizer cell defines an automation augmented manual palletizer-depalletizer cell of the automated storage and retrieval system, and the automated storage and retrieval system further comprises at least one automatic palletizer cell, and at least automatic depalletizer cell, coupled to the storage array, respectively defining an output path and an input path of case units from pallets to the storage array, and wherein the controller is configured to identify a predetermined condition that renders one of the at least one automatic palletizer cell or the at least one automatic depalletizer cell incompatible for respectively automatic palletizing or automatic depalletizing and in response to such identification generate a bypass path, bypassing the output or input path with the incompatible automatic palletizer cell or automatic depalletizer cell via the augmented manual palletizer-depalletizer cell.

In accordance with one or more aspects of the disclosed embodiment the predetermined condition identified by controller affecting incompatibility of the at least one automatic depalletizer includes one or more of an unstable inbound pallet, damaged inbound pallet wrap, case units in pallet layer being unsuitable for automatic depalletizing, inoperability of the at least one automatic depalletizer cell, inoperability of a depalletizer component and inoperability of the in-out case conveyor in an infeed direction.

In accordance with one or more aspects of the disclosed embodiment the predetermined condition identified by controller affecting incompatibility of the at least one automatic palletizer includes one or more of a determined mixed case pallet solution being identified as potentially unstable, the case units being unsuitable for automatic palletizing, inoperability of the at least one automatic palletizer cell, inoperability of a palletizer component and inoperability of the in-out case conveyor in an out-feed direction.

In accordance with one or more aspects of the disclosed embodiment the cell frame of the palletizer-depalletizer cell has an operator platform positioned proximate the common pallet layer interface and disposed for operator access effecting loading and unloading case units respectively commissioning and decommissioning pallet layers from the corresponding pallet layer loading and pallet layer unloading at the layer commission-decommission level.

In accordance with one or more aspects of the disclosed embodiment the palletizer-depalletizer cell has at least one bi-directional empty pallet storage lift connected to frame, where the at least one bi-directional empty pallet storage lift is communicably connected with the common pallet layer interface by an empty pallet transport.

In accordance with one or more aspects of the disclosed embodiment the cell frame defines a case transfer interface, the automated storage and retrieval system further comprising a controller and a case inspection station that is disposed at the case transfer interface, the case inspection station being connected to the controller, and being configured to inspect outbound case units for predetermined criteria including identification, shape conformance and damage, such that where the predetermined criteria are satisfied the case inspection station routes the outbound case units to the common pallet layer interface, and where the predetermined criteria are not satisfied the case inspection station routes the outbound case units to a rejection conveyor.

In accordance with one or more aspects of the disclosed embodiment the cell frame defines a case transfer interface, the automated storage and retrieval system further comprising a controller and a case inspection station that is disposed at the case transfer interface, the case inspection station being connected to the controller, and being configured to inspect inbound case units for predetermined criteria including identification, shape conformance and damage, such that where the predetermined criteria are satisfied the case inspection station routes the inbound case units to the in-out case conveyor, and where the predetermined criteria are not satisfied the case inspection station routes the inbound case units to a rejection conveyor.

In accordance with one or more aspects of the disclosed embodiment the automated storage and retrieval system further comprises a controller and a case mapper connected to the controller, the case mapper being configured to map case unit locations the common pallet layer interface, and determine positions of the case units being loaded commissioning the pallet layer.

In accordance with one or more aspects of the disclosed embodiment the automated storage and retrieval system further comprises a controller and wherein the palletizer-depalletizer cell includes a pallet inspection station connected to controller, the pallet inspection station being configured to identify one or more of damaged pallets, disfigured pallets and pallets that are unsuited for automatic depalletizing or palletizing.

In accordance with one or more aspects of the disclosed embodiment:

the more than one independently driven pallet transports include a first lift defining the first pallet holder, and a second lift defining the second pallet holder; and the palletizer-depalletizer cell includes a wrapper station adjacent the first lift and the second lift so that loaded pallets are transferred from the second lift to the wrapper station.

In accordance with one or more aspects of the disclosed embodiment the automated storage and retrieval system further comprises at least one case transfer unit disposed adjacent the common pallet layer interface, the at least one case transfer unit being configured to transfer at least one case unit from the common pallet layer interface to an operator work station.

In accordance with one or more aspects of the disclosed embodiment the automated storage and retrieval system further comprises at least one case transfer unit disposed adjacent the common pallet layer interface, the at least one case transfer unit being configured to transfer at least one case unit to the common pallet layer interface from an operator work station.

In accordance with one or more aspects of the disclosed embodiment the automated storage and retrieval system further comprises at least one case transfer unit disposed adjacent the common pallet layer interface, the at least one case transfer unit being configured to transfer an empty pallet from the common pallet layer interface to an empty pallet conveyor.

In accordance with one or more aspects of the disclosed embodiment the automated storage and retrieval system further comprises at least one case transfer unit disposed adjacent the common pallet layer interface, the at least one case transfer unit being configured to transfer an empty pallet to the common pallet layer interface from an empty pallet conveyor.

In accordance with one or more aspects of the disclosed embodiment an automation augmented, manually assisted, palletizer-depalletizer station comprises:

a frame forming a pallet layer interface that provides a common interface respectively with a pallet loading at the pallet layer interface and with a pallet unloading at the pallet layer interface, the common pallet layer interface being arranged so that placement of case units commissioning a pallet layer of the pallet loading, and removal of case units decommissioning a pallet layer of the pallet unloading are both effected at a predetermined level of the common pallet layer interface defining a layer commission-decommission level respectively of the pallet loading and the pallet unloading;

a first load pallet lift movably mounted to the frame and arranged to support respectively the pallet loading at the common pallet layer interface and the pallet unloading at the common pallet layer interface, the first load pallet lift being configured to index bi-directionally along a lift axis towards and away from the predetermined level so that the layer commission-decommission level is substantially constant at the predetermined level;

a second load pallet lift movably mounted to the frame and arranged to support respectively the pallet loading at the common pallet layer interface and the pallet unloading at the common pallet layer interface so that the respective pallet loading and pallet unloading is supported by the second load pallet lift independent of the first load pallet lift, and the respective pallet loading and pallet unloading is supported by the first load pallet lift independent of the first load pallet lift, and the second load pallet lift is configured to index bi-directionally along the lift axis, common to the first load pallet lift, towards and away from the predetermined level so that the layer commission-decommission level is substantially constant at the predetermined level; and a controller communicably connected to the first and second load pallet lifts to control movement of the first and second load pallet lifts, the controller including operator command input providing for semi-auto index control of at least one of the first and second load pallet lifts indexing the respective pallet loading and pallet unloading so as to maintain the layer commission-decommission level constant at the predetermined level, and the controller is configured so as to automatically index the first and second load pallet lifts relative to each other effecting automatic transfer of the respective pallet loading and unloading between the first and second load pallet lifts maintaining the layer commission-decommission level constant at the predetermined level.

In accordance with one or more aspects of the disclosed embodiment the controller is configured so that automatic transfer is effected substantially coincident with semi-automatically controlled indexing of the respective pallet loading and pallet unloading.

In accordance with one or more aspects of the disclosed embodiment the controller is configured so that another of the at least one of the first and second load pallet lifts is automatically positioned so that indexing of the at least one of the first and second load pallet lift under semi-automatic index control automatically effects transfer of the respective pallet loading and pallet unloading between the first and second load pallet lifts.

In accordance with one or more aspects of the disclosed embodiment on depalletization, the second load pallet lift indexes up semi-automatically, and as a pallet corresponding to the pallet unloading approaches a predetermined pallet transfer height, the controller pre-positions the first load pallet lift along one or more axes of motion relative to the pallet.

In accordance with one or more aspects of the disclosed embodiment the controller moves the first load pallet lift in a direction transverse to an indexing direction, in which the first and second load pallet lifts are indexed to effect transfer of the respective pallet loading and pallet unloading between the first and second load pallet lifts, to preposition the first load pallet lift under the pallet unloading so that in response to a next semi-automatic index command the first load pallet lift is indexed in the indexing direction to automatically pick the pallet, off of the second load pallet lift, and continues indexing in the indexing direction to maintain the layer commission-decommission level constant at the predetermined level, all in a common motion.

In accordance with one or more aspects of the disclosed embodiment the controller holds movement of the first load pallet lift in a direction transverse to an indexing direction, in which the first and second load pallet lifts are indexed to effect transfer of the respective pallet loading and pallet unloading between the first and second load pallet lifts, until a next semi-automatic index command so that movement of the first load pallet lift in the direction transverse to the indexing direction is effected automatically in response to the next semi-automatic index command with serial indexing of the first load pallet lift in the indexing direction that automatically picks the pallet, off of the second load pallet lift, and continues indexing in the indexing direction to maintain the layer commission-decommission level constant at the predetermined level, all in a common motion.

In accordance with one or more aspects of the disclosed embodiment on palletization, the first load pallet lift indexes down semi-automatically in an indexing direction, and as a pallet corresponding to the pallet loading approaches a predetermined pallet transfer height, the controller pre-positions the second load pallet lift by moving the second load pallet lift towards the first load pallet lift so that the pallet contacts and is substantially supported by the second load pallet lift.

In accordance with one or more aspects of the disclosed embodiment in response to a next semi-automatic indexing command, the controller moves the first load pallet lift in a direction transverse to an indexing direction, in which the first and second load pallet lifts are indexed to effect transfer of the respective pallet loading and pallet unloading between the first and second load pallet lifts, so that the first load pallet lift is removed from under the pallet loading to automatically pick the pallet, off of the first load pallet lift, and continues indexing the second load pallet lift in the indexing direction to maintain the layer commission-decommission level constant at the predetermined level, all in a common motion.

In accordance with one or more aspects of the disclosed embodiment the controller holds movement of the first load pallet lift in a direction transverse to an indexing direction, in which the first and second load pallet lifts are indexed to effect transfer of the respective pallet loading and pallet unloading between the first and second load pallet lifts, until a next semi-automatic index command so that movement of the first load pallet lift in the indexing direction is effected automatically in response to the next semi-automatic index command with serial movement of the first load pallet lift in the direction transverse to the indexing direction to remove the first load pallet lift from underneath the pallet loading.

In accordance with one or more aspects of the disclosed embodiment a method comprises:

providing a storage array of storage locations for case units, each storage location of which is arranged for storage of at least one case unit at each storage location;

bi-directionally transporting the case units, with an in-out case conveyor that is in communication with the storage array, to and from the storage array effecting infeed of the case units into the storage array and output of case units from the storage array;

bi-directionally transporting loaded pallets, with an in-out loaded pallet conveyor that is connected to the storage array, in an input direction towards the storage array, and in a different output direction away from the storage array; and providing a palletizer-depalletizer cell connected to and disposed between the in-out case conveyor and the in-out loaded pallet conveyor, the palletizer-depalletizer cell having a cell frame and a bi-directional pallet transport system with more than one independently driven pallet transports each with a different pallet holder independently movable relative to the cell frame, wherein the cell frame defines a common pallet layer interface arranged so that placement of case units commissioning a pallet layer loading a pallet, and removal of case units decommissioning a pallet layer unloading another pallet are both effected at the common pallet layer interface at a predetermined level of the cell frame defining a layer commission-decommission level respectively of the pallet layer loading and of the other pallet layer unloading; and independently indexing a first pallet holder and a second pallet of the different pallet holders, each independently holding the pallet layer loading at the common pallet layer interface so that the pallet layer loading is held by the first pallet holder and the second pallet holder independent of each other, wherein each of the first and second different pallet holders independently hold the other pallet layer unloading at the common pallet layer interface so that the pallet layer unloading is held by the first pallet holder and the second pallet holder independent of each other, and the first and the second different pallet holders are indexed in a common direction relative to the cell frame so that the respective layer commission-decommission level is substantially constant, for both the pallet layer loading and the pallet layer unloading.

In accordance with one or more aspects of the disclosed embodiment the method further comprises providing a controller communicatively coupled to the more than one independently driven pallet transports and configured to control movement thereof so that the first and second pallet holders are indexed in the common direction with the respective layer commission-decommission level substantially constant so that layer commissioning and decommissioning are respectively substantially continuous.

In accordance with one or more aspects of the disclosed embodiment the more than one independently driven pallet transports include a first lift defining the first pallet holder, and a second lift defining the second pallet holder, the method further comprising bi-directionally indexing the first and second pallet holders independent of each other.

In accordance with one or more aspects of the disclosed embodiment the method further comprises indexing the first lift so as to index the pallet layer loading maintaining the respective layer commissioning-decommissioning level substantially constant at the predetermined level of the cell frame for each successive layer loaded onto the pallet layer loading.

In accordance with one or more aspects of the disclosed embodiment the method further comprises indexing the first lift so as to index the pallet layer unloading maintaining the layer commissioning-decommissioning level substantially constant at the predetermined level of the cell frame for each successive layer unloaded from the pallet layer unloading.

In accordance with one or more aspects of the disclosed embodiment the first lift is located above the second lift, the method further comprising indexing at least one of the first lift and the second lift with respect to the other of the of the first lift and the second lift effecting pallet transfer therebetween.

In accordance with one or more aspects of the disclosed embodiment the method further comprises:

indexing the pallet layer loading so as to maintain the layer commissioning-decommissioning level constant at the predetermined level, where the controller includes operator command input providing semi-automatic control of at least one of a respective pallet transport, of the more than one independently driven pallet transports, of the first and second pallet holders; and automatically indexing the respective pallet transport of at least another of the first and second pallet holders effecting transfer of the pallet layer loading from the first pallet holder to the second pallet holder.

In accordance with one or more aspects of the disclosed embodiment the method further comprises, effecting, with the controller, automatic transfer of the pallet layer loading from the first pallet holder to the second pallet holder in response to the operator command input initiating semi-automatic indexing of the at least one of the respective pallet transport of the first and second pallet holders.

In accordance with one or more aspects of the disclosed embodiment the method further comprises effecting, with the controller, automatic transfer of the pallet layer loading from the first pallet holder to the second pallet holder independent of the operator command input initiating semi-automatic indexing of the at least one of the respective pallet transport of the first pallet holder and the second pallet holder.

In accordance with one or more aspects of the disclosed embodiment the controller is configured so that the operator command input provides the semi-automatic control of the at least one of the respective pallet transport of the first and second pallet holders indexing the pallet layer unloading so as to maintain the layer commissioning-decommissioning level constant at the predetermined level, the method further comprising automatically indexing, with the controller, the respective pallet transport of at least the other of the first and second pallet holders effecting transfer of the pallet layer unloading from the second pallet holder to the first pallet holder.

In accordance with one or more aspects of the disclosed embodiment the method further comprises effecting, with the controller, automatic transfer of the pallet layer unloading from the second pallet holder to the first pallet holder in response to the operator command input initiating semi-automatic indexing of the at least one of the respective pallet transport of the first pallet holder and the second pallet holder.

In accordance with one or more aspects of the disclosed embodiment the method further comprises effecting, with the controller, automatic transfer of the pallet layer unloading from the second pallet holder to the first pallet holder independent of the operator command input initiating semi-automatic indexing of the at least one of the respective pallet transport of the first pallet holder and the second pallet holder.

In accordance with one or more aspects of the disclosed embodiment the method further comprises generating, with the controller, a time optimal trajectory motion of the more than one independently driven pallet transports for each index motion of the first and second pallet holders holding the pallet layer loading and the pallet layer unloading respectively, the time optimal trajectory motion being defined by an acceleration profile described by a substantially sinusoidal curve with initial and terminal acceleration values of substantially zero.

In accordance with one or more aspects of the disclosed embodiment the method further comprises a controller communicably connected to the in-out case conveyor, the method further comprising bi-directionally transporting the case units, with the in-out case conveyor, to and from the storage array at a predetermined case feed rate, where the controller is communicably connected to the palletizer-depalletizer cell so that the layer commissioning and decommissioning, which are respectively substantially continuous, matches the predetermined case feed rate.

In accordance with one or more aspects of the disclosed embodiment the method further comprises a controller communicably connected to the in-out case conveyor, the method further comprising transporting, with the in-out case conveyor, case units to output cases from the storage array at a predetermined case output rate respectively, where the controller is communicably connected to the palletizer-depalletizer cell so that the layer commissioning and decommissioning, which are respectively substantially continuous, matches the predetermined case output rate.

In accordance with one or more aspects of the disclosed embodiment the cell frame defines a loaded pallet transfer interface and a case transfer interface, the loaded pallet transfer interface being communicably connected to the in-out loaded pallet conveyor and the case transfer interface being communicably connected to the in-out case conveyor.

In accordance with one or more aspects of the disclosed embodiment the method further comprises bi-directionally transporting, with the in-out case conveyor, the case units to and from the case transfer interface dependent on a predetermined case transfer rate between the case transfer interface and the in-out case conveyor, and the layer commissioning and decommissioning, which are respectively substantially continuous, determine the predetermined case transfer rate.

In accordance with one or more aspects of the disclosed embodiment the method further comprises bi-directionally transporting, with the in-out loaded pallet conveyor, loaded pallets to and from the loaded pallet transfer interface dependent on a predetermined loaded pallet transfer rate between the loaded pallet transfer interface and the in-out loaded pallet conveyor, and the layer commissioning and decommissioning, which are respectively substantially continuous, determine the predetermined loaded pallet transfer rate.

In accordance with one or more aspects of the disclosed embodiment the more than one independently driven pallet transports are configured so as to bi-directionally index the first and second pallet holders independent of each other.

In accordance with one or more aspects of the disclosed embodiment the first and second pallet holders are arranged so that the pallet layer loading, held by each of the first and second pallet holders at the common pallet layer interface with the layer commissioning level substantially constant, is transferred between the first pallet holder to the second pallet holder.

In accordance with one or more aspects of the disclosed embodiment at least one of the first and second pallet holders is indexed with respect to the other of the of the first and second pallet holder effecting pallet transfer therebetween.

In accordance with one or more aspects of the disclosed embodiment both of the first and second pallet holders are indexed in opposite directions with respect to the cell frame effecting pallet transfer.

In accordance with one or more aspects of the disclosed embodiment the pallet layer loading transfer between the first pallet holder to the second pallet holder is effected with the pallet layer loading held static at the respective commission-decommission level.

In accordance with one or more aspects of the disclosed embodiment the first and second pallet holders are arranged so that the pallet layer unloading, held by each of the first and second pallet holders at the common pallet layer interface with the layer decommissioning level substantially constant, is transferred between the first pallet holder to the second pallet holder.

In accordance more aspects of the disclosed embodiment at least one of the first and second pallet holders is indexed with respect to the other of the of the first and second pallet holder effecting pallet transfer therebetween.

In accordance with one or more aspects of the disclosed embodiment the pallet layer unloading transfer between the first pallet holder to the second pallet holder is effected with the pallet layer unloading held static at the respective commission-decommission level.

In accordance with one or more aspects of the disclosed embodiment both of the first and second pallet holders are indexed in opposite directions with respect to the cell frame effecting pallet transfer.

In accordance with one or more aspects of the disclosed embodiment the palletizer-depalletizer cell defines an automation augmented manual palletizer-depalletizer cell of the automated storage and retrieval system, and the automated storage and retrieval system further comprises at least one automatic palletizer cell, and at least automatic depalletizer cell, coupled to the storage array, respectively defining an output path and an input path of case units from pallets to the storage array, the method further comprising identifying, with the controller, a predetermined condition that renders one of the at least one automatic palletizer cell or the at least one automatic depalletizer cell incompatible for respectively automatic palletizing or automatic depalletizing and in response to such identification generating a bypass path, bypassing the output or input path with the incompatible automatic palletizer cell or automatic depalletizer cell via the augmented manual palletizer-depalletizer cell.

In accordance with one or more aspects of the disclosed embodiment the predetermined condition identified by controller affecting incompatibility of the at least one automatic depalletizer includes one or more of an unstable inbound pallet, damaged inbound pallet wrap, case units in pallet layer being unsuitable for automatic depalletizing, inoperability of the at least one automatic depalletizer cell, inoperability of a depalletizer component and inoperability of the in-out case conveyor in an infeed direction.

In accordance with one or more aspects of the disclosed embodiment the predetermined condition identified by controller affecting incompatibility of the at least one automatic palletizer includes one or more of a determined mixed case pallet solution being identified as potentially unstable, the case units being unsuitable for automatic palletizing, inoperability of the at least one automatic palletizer cell, inoperability of a palletizer component and inoperability of the in-out case conveyor in an out-feed direction.

In accordance with one or more aspects of the disclosed embodiment the method further comprises effecting loading and unloading case units, with an operator platform of the cell frame of the palletizer-depalletizer cell that is positioned proximate the common pallet layer interface and disposed for operator access, respectively commissioning and decommissioning pallet layers from the corresponding pallet layer loading and pallet layer unloading at the layer commission-decommission level.

In accordance with one or more aspects of the disclosed embodiment the palletizer-depalletizer cell has at least one bi-directional empty pallet storage lift connected to frame, where the at least one bi-directional empty pallet storage lift is communicably connected with the common pallet layer interface by an empty pallet transport.

In accordance with one or more aspects of the disclosed embodiment the cell frame defines a case transfer interface, the automated storage and retrieval system further comprising a controller and a case inspection station that is disposed at the case transfer interface, the case inspection station being connected to the controller, the method further comprising inspecting, with the case inspection station, outbound case units for predetermined criteria including identification, shape conformance and damage, such that where the predetermined criteria are satisfied the case inspection station routes the outbound case units to the common pallet layer interface, and where the predetermined criteria are not satisfied the case inspection station routes the outbound case units to a rejection conveyor.

In accordance with one or more aspects of the disclosed embodiment the cell frame defines a case transfer interface, the automated storage and retrieval system further comprising a controller and a case inspection station that is disposed at the case transfer interface, the case inspection station being connected to the controller, the method further comprising inspecting, with the case inspection station, inbound case units for predetermined criteria including identification, shape conformance and damage, such that where the predetermined criteria are satisfied the case inspection station routes the inbound case units to the in-out case conveyor, and where the predetermined criteria are not satisfied the case inspection station routes the inbound case units to a rejection conveyor.

In accordance with one or more aspects of the disclosed embodiment the method further comprises a controller and a case mapper connected to the controller, the method further comprising, mapping, with the case mapper, case unit locations at the common pallet layer interface, and determining positions of the case units being loaded commissioning the pallet layer.

In accordance with one or more aspects of the disclosed embodiment the method further comprises a controller and wherein the palletizer-depalletizer cell includes a pallet inspection station connected to controller, the method further comprising identifying, with the pallet inspection station, one or more of damaged pallets, disfigured pallets and pallets that are unsuited for automatic depalletizing or palletizing.

In accordance with one or more aspects of the disclosed embodiment a method comprises:

providing a frame forming a pallet layer interface that provides a common interface respectively with a pallet loading at the pallet layer interface and with a pallet unloading at the pallet layer interface, the common pallet layer interface being arranged so that placement of case units commissioning a pallet layer of the pallet loading, and removal of case units decommissioning a pallet layer of the pallet unloading are both effected at a predetermined level of the common pallet layer interface defining a layer commission-decommission level respectively of the pallet loading and the pallet unloading;

providing a first load pallet lift movably mounted to the frame and arranged to support respectively the pallet loading at the common pallet layer interface and the pallet unloading at the common pallet layer interface, the first load pallet lift being configured to index bi-directionally along a lift axis towards and away from the predetermined level so that the layer commission-decommission level is substantially constant at the predetermined level;

providing a second load pallet lift movably mounted to the frame and arranged to support respectively the pallet loading at the common pallet layer interface and the pallet unloading at the common pallet layer interface so that the respective pallet loading and pallet unloading is supported by the second load pallet lift independent of the first load pallet lift, and the respective pallet loading and pallet unloading is supported by the first load pallet lift independent of the first load pallet lift, and the second load pallet lift is configured to index bi-directionally along the lift axis, common to the first load pallet lift, towards and away from the predetermined level so that the layer commission-decommission level is substantially constant at the predetermined level; and controlling movement of the first and second load pallet lifts with a controller communicably connected to the first and second load pallet lifts, the controller including operator command input providing for semi-auto index control of at least one of the first and second load pallet lifts indexing the respective pallet loading and pallet unloading so as to maintain the layer commission-decommission level constant at the predetermined level, and the controller is configured so as to automatically index the first and second load pallet lifts relative to each other effecting automatic transfer of the respective pallet loading and unloading between the first and second load pallet lifts maintaining the layer commission-decommission level constant at the predetermined level.

In accordance with one or more aspects of the disclosed embodiment the method further comprises effecting, with the controller, automatic transfer substantially coincident with semi-automatically controlled indexing of the respective pallet loading and pallet unloading.

In accordance with one or more aspects of the disclosed embodiment the method further comprises automatically positioning, with the controller, another of the at least one of the first and second load pallet lifts so that indexing of the at least one of the first and second load pallet lift under semi-automatic index control automatically effects transfer of the respective pallet loading and pallet unloading between the first and second load pallet lifts.

In accordance with one or more aspects of the disclosed embodiment the on depalletization, the second load pallet lift indexes up semi-automatically, and as a pallet corresponding to the pallet unloading approaches a predetermined pallet transfer height, the controller pre-positions the first load pallet lift along one or more axes of motion relative to the pallet.

In accordance with one or more aspects of the disclosed embodiment the method further comprises moving, with the controller, the first load pallet lift in a direction transverse to an indexing direction, in which the first and second load pallet lifts are indexed to effect transfer of the respective pallet loading and pallet unloading between the first and second load pallet lifts, to preposition the first load pallet lift under the pallet unloading so that in response to a next semi-automatic index command the first load pallet lift is indexed in the indexing direction to automatically pick the pallet, off of the second load pallet lift, and continues indexing in the indexing direction to maintain the layer commission-decommission level constant at the predetermined level, all in a common motion.

In accordance with one or more aspects of the disclosed embodiment the method further comprises holding movement, with the controller, of the first load pallet lift in a direction transverse to an indexing direction, in which the first and second load pallet lifts are indexed to effect transfer of the respective pallet loading and pallet unloading between the first and second load pallet lifts, until a next semi-automatic index command so that movement of the first load pallet lift in the direction transverse to the indexing direction is effected automatically in response to the next semi-automatic index command with serial indexing of the first load pallet lift in the indexing direction that automatically picks the pallet, off of the second load pallet lift, and continues indexing in the indexing direction to maintain the layer commission-decommission level constant at the predetermined level, all in a common motion.

In accordance with one or more aspects of the disclosed embodiment on palletization, the first load pallet lift indexes down semi-automatically in an indexing direction, and as a pallet corresponding to the pallet loading approaches a predetermined pallet transfer height, the controller pre-positions the second load pallet lift by moving the second load pallet lift towards the first load pallet lift so that the pallet contacts and is substantially supported by the second load pallet lift.

In accordance with one or more aspects of the disclosed embodiment in response to a next semi-automatic indexing command, moving, with the controller, the first load pallet lift in a direction transverse to an indexing direction, in which the first and second load pallet lifts are indexed to effect transfer of the respective pallet loading and pallet unloading between the first and second load pallet lifts, so that the first load pallet lift is removed from under the pallet loading to automatically pick the pallet, off of the first load pallet lift, and continues indexing the second load pallet lift in the indexing direction to maintain the layer commission-decommission level constant at the predetermined level, all in a common motion.

In accordance with more aspects of the disclosed embodiment the method further comprises holding movement, with the controller, of the first load pallet lift in a direction transverse to an indexing direction, in which the first and second load pallet lifts are indexed to effect transfer of the respective pallet loading and pallet unloading between the first and second load pallet lifts, until a next semi-automatic index command so that movement of the first load pallet lift in the indexing direction is effected automatically in response to the next semi-automatic index command with serial movement of the first load pallet lift in the direction transverse to the indexing direction to remove the first load pallet lift from underneath the pallet loading.

It should be understood that the foregoing description is only illustrative of the aspects of the disclosed embodiment. Various alternatives and modifications can be devised by those skilled in the art without departing from the aspects of the disclosed embodiment. Accordingly, the aspects of the disclosed embodiment are intended to embrace all such alternatives, modifications and variances that fall within the scope of the appended claims. Further, the mere fact that different features are recited in mutually different dependent or independent claims does not indicate that a combination of these features cannot be advantageously used, such a combination remaining within the scope of the aspects of the invention.

What is claimed is:

1. An automated storage and retrieval system comprising:
   a storage array of storage locations for case units, each storage location of which is arranged for storage of at least one case unit at each storage location;

an out case conveyor, in communication with the storage array, configured so as to transport the case units to the storage array effecting infeed of the case units into the storage array;

an in loaded pallet conveyor, connected to the storage array, and configured so as to transport loaded pallets in an input direction towards the storage array; and a depalletizer cell connected to and disposed between the out case conveyor and the in loaded pallet conveyor, the depalletizer cell having a cell frame and a lift;

wherein the cell frame defines an elevated robotic pallet layer interface located over the in loaded pallet conveyor, the in loaded pallet conveyor being communicably coupled by the lift to the elevated robotic pallet layer interface so that removal of mixed case units decommissioning a mixed case pallet layer unloading a mixed case pallet indexed by the lift is effected with the elevated robotic pallet layer interface over the in loaded pallet conveyor.

2. The automated storage and retrieval system of claim 1, wherein the elevated robotic pallet layer interface is disposed so as to remove the mixed case units and decommission the mixed case pallet layer substantially at a predetermined level of the cell frame defining a layer decommission level at a substantially elevation over the in loaded pallet conveyor.

3. The automated storage and retrieval system of claim 1, wherein the elevated robotic pallet layer interface includes a robot arranged to engage and remove the mixed case units from the mixed case pallet.

4. The automated storage and retrieval system of claim 1, wherein the depalletizer cell defines an automation augmented manual depalletizer cell of the automated storage and retrieval system, and the out case conveyor, coupled to the storage array, defines an input path of case units from pallets to the storage array, wherein the automated storage and retrieval system further comprises a controller configured to identify a predetermined condition that renders the depalletizer cell incompatible for automatic depalletizing and in response to such identification generate a bypass path, bypassing the input path with the incompatible automatic depalletizer cell via the augmented manual depalletizer cell.

5. The automated storage and retrieval system of claim 4, wherein the predetermined condition identified by the controller affecting incompatibility of the depalletizer includes one or more of an unstable inbound pallet, damaged inbound pallet wrap, case units in pallet layer being unsuitable for automatic depalletizing, inoperability of the depalletizer cell, inoperability of a depalletizer component and inoperability of the out case conveyor in an infeed direction.

6. The automated storage and retrieval system of claim 1, wherein the cell frame of the depalletizer cell has an operator platform positioned proximate the elevated robotic pallet layer interface and disposed for operator access effecting unloading case units decommissioning pallet layers from the mixed case pallet layer unloading at the layer decommission level.

7. The automated storage and retrieval system of claim 1, wherein the cell frame defines a case transfer interface, the automated storage and retrieval system further comprising a controller and a case inspection station that is disposed at the case transfer interface, the case inspection station being connected to the controller, and being configured to inspect inbound case predetermined units for criteria including identification, shape conformance and damage, such that where the predetermined criteria are satisfied the case inspection station routes the inbound case units to the out case conveyor, and where the predetermined criteria are not satisfied the case inspection station routes the inbound case units to a rejection conveyor.

8. The automated storage and retrieval system of claim 1, further comprising a controller and wherein the depalletizer cell includes a pallet inspection station connected to controller, the pallet inspection station being configured to identify one or more of damaged pallets, disfigured pallets and pallets that are unsuited for automatic depalletizing.

9. The automated storage and retrieval system of claim 1, further comprising at least one case transfer unit disposed adjacent the elevated robotic pallet layer interface, the at least one case transfer unit being configured to transfer at least one case unit from the elevated robotic pallet layer interface to an operator work station.

10. The automated storage and retrieval system of claim 1, further comprising at least one case transfer unit disposed adjacent the elevated robotic pallet layer interface, the at least one case transfer unit being configured to transfer an empty pallet from the elevated robotic pallet layer interface to an empty pallet conveyor.

11. A method for infeeding mixed case pallets in an automated storage and retrieval system comprising:

providing a storage array of storage locations for case units, each storage location of which is arranged for storage of at least one case unit at each storage location;

effecting infeed of the case units into the storage array with an out case conveyor, in communication with the storage array, for transporting the case units to the storage array;

providing an in loaded pallet conveyor, connected to the storage array, for transporting loaded pallets in an input direction towards the storage array;

providing a depalletizer cell connected to and disposed between the out case conveyor and the in loaded pallet conveyor, the depalletizer cell having a cell frame and a lift defining an elevated robotic pallet layer interface; and effecting, with the elevated robotic pallet layer interface communicably coupled to and located over the in loaded pallet conveyor, removal of mixed case units decommissioning a mixed case pallet layer unloading a mixed case pallet indexed by the lift.

12. The method of claim 11, wherein the elevated robotic pallet layer interface is disposed so as to remove the mixed case units and decommission the mixed case pallet layer substantially at a predetermined level of the cell frame defining a layer decommission level at a substantially elevation over the in loaded pallet conveyor.

13. The method of claim 11, wherein the elevated robotic pallet layer interface includes a robot arranged to engage and remove the mixed case units from the mixed case pallet.

14. The method of claim 11, wherein the depalletizer cell defines an automation augmented manual depalletizer cell of the automated storage and retrieval system, and the out case conveyor, coupled to the storage array, defines an input path of case units from pallets to the storage array, wherein the method further comprises with identifying, a controller, a predetermined condition that renders the depalletizer cell incompatible for automatic depalletizing and in response to such identification generate a bypass path, bypassing the input path with the incompatible automatic depalletizer cell via the augmented manual depalletizer cell.

15. The method of claim 14, wherein the predetermined condition identified by the controller affecting incompatibility of the depalletizer includes one or more of an unstable inbound pallet, damaged inbound pallet wrap, case units in pallet layer being unsuitable for automatic depalletizing, inoperability of the depalletizer cell, inoperability of a depalletizer component and inoperability of the out case conveyor in an infeed direction.

16. The method of claim 11, further comprising effecting unloading case units decommissioning pallet layers from the mixed case pallet layer unloading at the layer decommission level with an operator platform of the depalletizer cell positioned proximate the elevated robotic pallet layer interface and disposed for operator access.

17. The method of claim 11, wherein the cell frame defines a case transfer interface, the method further comprising inspect, with a controller and a case inspection station connected to the controller and disposed at the case transfer interface, inbound case units for predetermined criteria including identification, shape conformance and damage, such that where the predetermined criteria are satisfied the case inspection station routes the inbound case units to the out case conveyor, and where the predetermined criteria are not satisfied the case inspection station routes the inbound case units to a rejection conveyor.

18. The method of claim 11, further comprising identifying, with a controller and a pallet inspection station connected to controller, one or more of damaged pallets, disfigured pallets and pallets that are unsuited for automatic depalletizing.

19. The method of claim 11, further comprising at least one case transfer unit disposed adjacent the elevated robotic pallet layer interface, the at least one case transfer unit being configured to transfer at least one case unit from the elevated robotic pallet layer interface to an operator work station.

20. The method of claim 11, further comprising at least one case transfer unit disposed adjacent the elevated robotic pallet layer interface, the at least one case transfer unit being configured to transfer an empty pallet from the elevated robotic pallet layer interface to an empty pallet conveyor.

* * * * *